United States Patent
Kawanishi

(10) Patent No.: US 9,465,167 B2
(45) Date of Patent: Oct. 11, 2016

(54) OPTICAL-FIBER-SPLICED PORTION REINFORCING HEATING DEVICE

(71) Applicant: Fujikura Ltd., Koto-ku, Tokyo (JP)

(72) Inventor: Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/000,497

(22) Filed: Jan. 19, 2016

(65) Prior Publication Data
US 2016/0202416 A1    Jul. 14, 2016

Related U.S. Application Data

(60) Division of application No. 14/600,731, filed on Jan. 20, 2015, now Pat. No. 9,274,281, which is a continuation of application No. PCT/JP2014/058371, filed on Mar. 25, 2014.

(30) Foreign Application Priority Data

Mar. 25, 2013    (JP) .................................. 2013-063014

(51) Int. Cl.
*G02B 6/255*    (2006.01)
*H05B 1/02*    (2006.01)

(52) U.S. Cl.
CPC ........... *G02B 6/2558* (2013.01); *G02B 6/2551* (2013.01); *H05B 1/023* (2013.01); *G02B 6/2553* (2013.01); *G02B 6/2555* (2013.01)

(58) Field of Classification Search
CPC  G02B 6/2551; G02B 6/2553; G02B 6/2555; G02B 6/2558
See application file for complete search history.

(56) References Cited

U.S. PATENT DOCUMENTS

| | | |
|---|---|---|
| 6,190,057 B1 | 2/2001 | Osaka et al. |
| 6,437,299 B1 | 8/2002 | Watanabe et al. |
| 7,040,818 B2 | 5/2006 | Sato |

(Continued)

FOREIGN PATENT DOCUMENTS

| | | |
|---|---|---|
| AU | 2006235914 A1 | 1/2007 |
| CN | 1209556 A | 3/1999 |

(Continued)

OTHER PUBLICATIONS

Communication dated Feb. 23, 2016 from the European Patent Office in counterpart application No. 14775919.5.

(Continued)

*Primary Examiner* — Daniel Petkovsek
(74) *Attorney, Agent, or Firm* — Sughrue Mion, PLLC

(57) ABSTRACT

An optical-fiber-spliced portion reinforcing heating device of the invention includes: a pair of clamps that respectively grasp a coated portion of an optical fiber, the optical fiber including a fusion-spliced portion, the fusion-spliced portion being coated with a sleeve, the coated portion being exposed from the sleeve; at least two or more heaters that are arranged to face each other so as to sandwich the sleeve; a first force-applying member that presses at least one of the paired clamps so as to apply a tension to the optical fiber; and a second force-applying member that applies a pressing force to at least one or more of the heaters via the sleeve by use of one of an elastic member and a magnetic member in accordance with control of a drive source, the heaters being arranged to face each other with the sleeve interposed therebetween.

6 Claims, 30 Drawing Sheets

(56) References Cited

U.S. PATENT DOCUMENTS

| | | |
|---|---|---|
| 7,699,540 B2 | 4/2010 | Miyamori et al. |
| 8,950,955 B2 | 2/2015 | Fukuda et al. |
| 9,274,281 B2 * | 3/2016 | Kawanishi .......... G02B 6/2558 |
| 2002/0148827 A1 | 10/2002 | Watanabe et al. |
| 2005/0123253 A1 | 6/2005 | Sato |
| 2006/0280417 A1 | 12/2006 | Sato et al. |
| 2013/0119044 A1 | 5/2013 | Gynnild |
| 2015/0185419 A1 | 7/2015 | Kawanishi |

FOREIGN PATENT DOCUMENTS

| | | |
|---|---|---|
| CN | 102365207 A | 2/2012 |
| CN | 202548383 U | 11/2012 |
| EP | 2 407 808 A1 | 1/2012 |
| JP | 62-158405 A | 10/1987 |
| JP | 62-158405 U | 10/1987 |
| JP | 63-199204 U | 12/1988 |
| JP | 02-193105 A | 7/1990 |
| JP | 09-021926 A | 1/1997 |
| JP | 10-332979 A | 12/1998 |
| JP | 2000-321462 A | 11/2000 |
| JP | 3293594 B2 | 6/2002 |
| JP | 3337874 B2 | 10/2002 |
| JP | 2004-042317 A | 2/2004 |
| JP | 2005-148278 A | 6/2005 |
| JP | 2005-321644 A | 11/2005 |
| JP | 2006-343528 A | 12/2006 |
| JP | 4165375 B2 | 10/2008 |
| JP | 2010-217271 A | 9/2010 |
| JP | 2010-249887 A | 11/2010 |
| WO | 2010111325 A1 | 9/2010 |

OTHER PUBLICATIONS

Communication dated Feb. 3, 2016 from the Korean Intellectual Property Office in counterpart application No. 10-2015-7001608.
Communication dated Nov. 20, 2015 from the US Patent and Trademark Office in counterpart U.S. Appl. No. 14/600,731.
ARCMaser FSM-100 series, Aug. 2012, http://www.fujikura.co.jp/products/data/FSM-100-J.pdf.
Optical fusion splicing device Small core line-of-site single fiber optical fiber fusion splicing device FSM-60S, 2007, http://www.fujikura.co.jp/products/tele/o_f_splicers/td70005.html.
International Search Report of PCT/JP2014/058371, dated Jun. 24, 2014. [PCT/ISA/210].
Communication dated Feb. 10, 2015, issued by the Japan Patent Office in corresponding Japanese Application No. 2014-520424.
Communication dated Jun. 24, 2014, issued by the Japan Patent Office in corresponding Japanese Application No. 2014-520425.
Communication dated Jun. 5, 2015, issued by the Korean Intellectual Property Office in corresponding Korean Application No. 10-2015-7001608.
Communication dated May 28, 2015, issued by the State Intellectual Property Office of the People's Republic of China in corresponding Chinese Application No. 201480001829.1.
Communication dated Nov. 11, 2014, issued by the Japan Patent Office in corresponding Japanese Application No. 2014-520425.
International Search Report of PCT/JP2014/058370, dated Jun. 24, 2014. [PCT/ISA/210].
Notice of Reasons for Rejection for Japanese Patent Application No. 2014-520425, dated Jun. 24, 2014.
Communication dated Mar. 15, 2016 from U.S. Patent & Trademark Office in counterpart U.S. Appl. No. 15/000,721.
Communication dated Mar. 22, 2016 from European Patent Office in counterpart Application No. 14776315.5.
Communication dated Apr. 11, 2016 from U.S. Patent & Trademark Office in counterpart U.S. Appl. No. 14/656,094.

* cited by examiner

OPTICAL-FIBER-SPLICED PORTION REINFORCING HEATING DEVICE

CROSS REFERENCE TO RELATED APPLICATIONS

This is a divisional application of U.S. Ser. No. 14/600,731 filed Jan. 20, 2015, issued as U.S. Pat. No. 9,274,281 B2, which is a Continuation of PCT Patent Application No. PCT/JP2014/058371, filed Mar. 25, 2014, whose priority is claimed on Japanese Patent Application No. 2013-063014 filed on Mar. 25, 2013, the contents of which are hereby incorporated by reference.

BACKGROUND OF THE INVENTION

The present invention relates to an optical-fiber-spliced portion reinforcing heating device.

DESCRIPTION OF THE RELATED ART

Generally, when optical fibers are fusion-spliced, the following work sequence is carried out.
(1) An optical fiber is extracted from an optical fiber cable.
(2) A resin coating (front end) that coats the extracted optical fiber is removed by a removing tool of an optical fiber coating.
(3) After the coating is removed from the front end, scraps of the resin coating remain on a surface of a glass (bare optical fiber) of the optical fiber, and the scraps are removed by a cloth or a paper moistened with alcohol.
(4) The clean optical fiber is cut by an optical fiber cutter.
(5) The cut optical fibers are fusion-spliced by an optical fiber fusion splicer.
(6) The post-fusion-spliced optical fiber is covered with a heat-shrinkable reinforcement sleeve and is heat-reinforced by a heater of a fusion splicer.
(7) The heat-reinforced optical fiber is accommodated in a storage tray of a spliced portion storage case.

In the above-described step (6), the outer side of the sleeve used to reinforce the optical fiber spliced portion is formed of a heat shrinkable tube, a hot melt disposed inside thereof is molded at the circumference of the optical fiber, and the spliced portion is thereby protected.

The sleeve formed by the outer heat shrinkable tube and the inner hot melt is heat-shrinkable depending on various coating diameters of the optical fiber.

Additionally, as a result of heat-shrinking the sleeve at substantially the center in the longitudinal direction thereof at first, the sleeve is molded while extruding air inside the sleeve from the sleeve center to the outside thereof.

The optical fiber spliced portion that is reinforced by the above-described sleeve also has a function of blocking an external substance such as moisture which adversely affects an optical fiber.

Between the outer heat shrinkable tube and the inner hot melt, a stainless-steel tensile strength member is inserted into the sleeve in advance in the case of a single-core optical fiber and a glass tensile strength member is inserted into the sleeve in advance in the case of a multi-core ribbon, and a structure that resists bending or tension is thereby realized.

Moreover, shrinking can be carried out at high speed such as approximately 30 seconds by use of an optical-fiber-spliced portion reinforcing heating device which is conventionally mounted on an optical fiber fusion splicer.

In order to heat-shrink a sleeve, in recent years, polyimide film heaters are used which are adhesively attached to a metal sheet and serve as a heater provided on an optical-fiber-spliced portion reinforcing heating device (hereinbelow, may be referred to as a reinforcing heating device); and a heater is proposed as an example having single flat sheet heater into which two or more heaters circuit patterns are implanted (for example, refer to Japanese Patent No. 3293594, hereinafter referred to as Patent Document 1 and refer to Japanese Unexamined Patent Application, First Publication No. 2010-249887, hereinafter referred to as Patent Document 2).

As mentioned above, generally, a plurality of heater circuit patterns are implanted into a flat sheet heater.

Furthermore, a technique of working and heating a flat sheet heater in a U-shape is also proposed (for example, refer to Japanese Patent No. 4165375, hereinafter referred to as Patent Document 3).

Furthermore, generally, in order to prevent a sleeve from being positionally displaced from an optical fiber spliced portion when tension is applied to an optical fiber from the outside before heat shrinking of the sleeve, a clamp is provided at a reinforcing heating device.

As such clamp, a clamp provided with a tension applying mechanism is known, and by using this, an optical fiber is prevented from going slack in the sleeve.

If the sleeve shrinks in a state in which the optical fiber has a slack, stress remains in the optical fiber inside the sleeve, there is a concern that the long-term reliability of the optical fiber is degraded; particularly, in the reinforcing heating device that reinforces a ribbon by heating, the clamp is an essential and necessary configuration to prevent arrayed bare optical fibers from coming in contact with each other.

If tension is not applied to the fiber, the optical fibers adjacent to each other shrink in a state of being in contact with each other, damaging both optical fibers, and therefore, the long-term reliability of the optical fiber is decreased.

In order to solve the aforementioned problems, a reinforcing heating device used for multi-core tape fibers is proposed, in which clamps are arranged at both sides of the heater in the longitudinal direction of the optical fiber, one of the clamps is configured to slidably move in the longitudinal direction of the optical fiber, and a compression coil spring is provided (for example, refer to Japanese Unexamined Patent Application, First Publication No. 2000-321462, hereinafter referred to as Patent Document 4).

In a constitution of Patent Document 4, a tension is applied to an optical fiber by use of a clamp in the sequence described below.

In a first method, an optical fiber is set in a state in which right and left clamps are opened, the movable left clamp is only closed, subsequently, the optical fiber is pulled in the right direction, and the right clamp is closed in a state in which a compression coil spring is contracted.

At this time, the shrinkage of the compression coil spring is designed to generate optimal tension in the optical fiber at the position at which the movable left clamp is brought into contact with the right end of the movable range, and the optimal tension of the compression coil spring is always applied to the optical fiber.

Additionally, in a second method, the left side face of a movable clamp is pressed in the right direction with the finger in a state in which right and left clamps are opened, shrinkage of a compression coil spring is designed to cause an optical fiber to generate an optimal tension at the position with which the left clamp is brought into contact in the right direction.

Thereafter, the optical fiber is set to the clamp in a state of being pressed with the finger, the movable left clamp and the fixed right clamp are closed.

Subsequently, by removing the finger from the movable left clamp, an optimal tension due to the compression coil spring is always applied to the optical fiber.

However, the method disclosed in the above-mentioned Patent Document 4, in a state after the optical fiber is set to the clamp without slack by pulling it with the finger and the right and left clamps are closed, a forward movable range that allows the movable left clamp to further move toward the heater side does not remain almost, and a backward movable range is only ensured in this state.

In above-described state, in the case of applying an excessive lateral pressure to the optical fiber, there is a problem in that a residual tensile force that causes the long-term reliability of the optical fiber to be significantly deteriorated is applied to the optical fiber or the optical fiber is immediately broken.

Furthermore, instead of the aforementioned compression coil spring, application of a tension to an optical fiber by utilizing a magnetic force is proposed (refer to, for example, Japanese Patent No. 3337874, hereinafter referred to as Patent Document 5).

In FIG. 1 or the like shown in Patent Document 5, a right clamp is movable and a left clamp is fixed.

The movable clamp is generally pressed onto a heater side by a tension coil spring.

Subsequently, when the optical fiber is grasped (clamped) and the lid of the heater is closed, a repulsion force is generated between magnets, and a tension is applied to the optical fiber.

Because of this, complicated steps such as two methods disclosed in Patent Document 4 are not necessary, and the tension is automatically applied to the optical fiber by only closing the clamp or the lid.

However, in the technique disclosed in Patent Document 5, similarly, the optical fiber is set to the clamp without slack by pulling it with the finger, a movable range that allows the movable clamp to further move toward the heater side hardly remains in a state after the right and left clamps are closed, and a backward movable range is only ensured in this state.

In above-described state, in the case of applying an excessive lateral pressure to the optical fiber, there is a problem in that a residual tensile force that causes the long-term reliability of the optical fiber to be significantly deteriorated is applied to the optical fiber or the optical fiber is immediately broken.

In addition, generally, for a reinforcing heating device used for a single-core optical fiber, a device that is provided with a mechanism applying tension does not almost exist.

The reason is that, adjacent optical fibers are in contact with each other in the case of a single-core optical fiber, and therefore, in most cases, in order to reduce the cost of the device, it is not provided therefor.

That is, such mechanism applying tension to an optical fiber is mainly mounted on a reinforcing heating device used for a multi-core optical fiber.

Here, in the case of shrinking the sleeve in a state in which a tension is applied to the optical fiber, a residual tension remains in the optical fiber.

In the case of a normally-used optical fiber having the surface which is not damaged, a long-term reliability is not degraded under a residual tension of 100 gf or less. Conventionally, it is recommended for the residual tension of an optical fiber to be less than or equal to 100 gf (for example, refer to Japanese Unexamined Patent Application, First Publication No. H10-332979, hereinafter referred to as Patent Document 6).

However, a fusion-spliced optical fiber may be damaged due to the work operation therefor. Therefore, in the case where, for example, a tension is 200 gf under a rupture evaluation test after the optical fibers are spliced, it is recommended to be less than or equal to 30 gf.

Generally, in the case of splicing optical fibers, the amount of time of fusion-splicing is less than or equal to 10 seconds; however, an amount of time of 25 seconds or more is required for heat shrinking.

For example, it is believe to take 40 seconds to connect an optical fiber to a reinforcing heating device or to remove the optical fiber therefrom.

Generally, dozens of optical fibers are provided in one optical fiber cable, so, it takes approximately 1 hour to splice together ninety-six optical fibers (96 fibers×40 seconds=3840 seconds 1 hour). Thus, it takes 1 hour only to carry out an operation of heat-reinforcing sleeve in order to splice one cable, and shortening of heat shrinking time is important.

Generally, in a device which heat-reinforce an optical fiber spliced portion, as a result of pressing a sleeve onto a heater and thereby deforming the sleeve, it is possible to shorten the heating time by heating the sleeve in a state in which the area of contact between the heater and the sleeve increases and the heat is easily transmitted.

Hitherto, a plurality of techniques of shortening the heating time as a result of positively causing the heater to come into contact with the sleeve are proposed.

Here, in the aforementioned Patent Document 6, a method of pressing a heater onto a sleeve by use of a compression coil spring and of always maintaining the contact state is described.

In Patent Document 6, a mechanism is provided which absorbs a tension by use of a compression coil spring when the tension is applied to an optical fiber by pressing by a heater.

Moreover, in this constitution, as a result of providing the left slide clamp and the compression coil spring, a tension is applied to an optical fiber so as to prevent occurrence of a slack thereof in a manner similar to a conventional heating device.

However, in the left slide clamp of Patent Document 6, the backward movable range explained above is ensured; however, a forward movable range is not provided.

In the case where an allowable residual tension of an optical fiber is 10 to 100 gf, the total pressing force due to a heater is required to be less than or equal to 10 to 100 gf.

In the case where, for example, a tension is 200 gf under a rupture evaluation test after the optical fibers are spliced, the allowable tension is less than or equal to approximately 30 gf, and the pressing force due to a heater is required to be less than or equal to 30 gf.

As will be described later, there is a problem in that the sleeve cannot be sufficiently deformed in 30 gf.

Even if, a pressing force of several hundreds of gf is applied to the heater at the side surface thereof, a compression coil spring that applies a tension of 30 gf thereto is unconscionably and quickly shrunk, a forcible tension of several hundreds of gf is applied to the optical fiber, and there is a problem in that the long-term reliability of the optical fiber after reinforcement is degraded.

As a result, in Patent Document 6, it is not possible to increase the pressing force of the heater to be greater than the allowable residual tension of the optical fiber.

Here, a method of always maintaining the contact between the heater and the sleeve by causing a hard core provided in the sleeve to be in close contact with a magnet is proposed (for example, refer to Japanese Unexamined Patent Application, First Publication No. 2010-217271, hereinafter referred to as Patent Document 7).

However, in the method of Patent Document 7, the hard core inside the sleeve and the heater are attracted to each other due to the magnet; however, there is a problem in that, in the sleeve structure, a pressing force to deform the entire sleeve by squashing cannot be applied thereto.

For this reason, the contact between the heater and the sleeve can be maintained; however, the effect of increasing the contact area thereof can hardly be obtained.

Furthermore, in the case where the hard core is made of glass, it does not function.

Additionally, in the case of using a permanent magnet, since the magnet is disposed near the heater, there is a problem of degradation in magnetic force which is due to a high temperature.

In other case, a constitution is proposed which serves as a device of heat-reinforcing an optical fiber spliced portion, includes: a means of driving a heater by use of using a motor or the like; and a means of detecting that the heater moves forward to a predetermined position, i.e., a position where the sleeve is shrunk, and is configured to retreat after the heater moves forward to the sleeve position and the heater reaches a predetermined position (for example, refer to Japanese Unexamined Patent Application, First Publication No. 2004-042317, hereinafter referred to as Patent Document 8).

According to Patent Document 8, two heaters press the sleeve, the area of contact between the sleeve and the heater increases, and it is possible to speed up the heat shrinking of the sleeve.

Particularly, the heat conduction efficiency due to the heater becomes higher, it is possible to shorten the heat shrinking time of the sleeve.

According to this system, it is possible to sufficiently deform the sleeve.

The inventor intensively researched how degree of the pressing force is applied to the sleeve so as to be deformed in order to shorten the heat shrinking time to be shortest; it is apparent that the pressing force of 500 gf to press the sleeve by the heater is required when the sleeve is heat-shrunk.

As shown in the chart of FIG. 30, as the pressing force of the sleeve becomes higher, the contact area between the heater and the sleeve increases, and the shrinking time of the sleeve becomes short.

FIG. 30 is a chart showing a case where a commonly-used sleeve of 60 mm which is used for single core is sandwiched between two heaters and heating is carried out at a temperature of 230° C. of both two heaters where one of the heaters is fixed and the other of the heaters is movable.

It is understood from this chart that, when the pressing force exceeds 500 gf, the pressing effect decreases, the shrinking time of the sleeve is not much shorter.

In addition, the aforementioned changing point of approximately 500 gf varies with the sleeve structure. Particularly, in the case of a commonly-used sleeve of 60 mm which is used for single core, the variation in the shrinking time reduces when the pressing force exceeds approximately 500 gf.

However, in the technique disclosed in Patent Document 8, there is problems described below.

Firstly, there is a first problem due to pressure of the sleeve by movement control of a heater.

The heater moves forward by a motor through a micrometer, it is necessary for the amount of the forward movement and the forward velocity thereof to control depending on a state in which a sleeve is contracted.

However, various kinds of sleeve are used, the amount of forward movement and the forward velocity vary depending on, for example, difference in the diameter or the material thereof.

Furthermore, a contractile rate of the sleeve varies depending on an outdoor temperature or a voltage of a built-in battery.

In addition, in the longitudinal direction of the sleeve, generally, the contractile rate of the center portion thereof is different from that of the outer-edge portion thereof.

Consequently, in the case where the heater excessively moves forward, an excessive pressure reaches the optical fiber provided thereinside, and the optical fiber is thereby damaged.

Alternatively, if the forward movement of the heater is delayed, a gap occurs between the heater and the sleeve, there is also a problem in that the sleeve is not shrunk in a shorter amount of time.

In order to make the pressing force of the heater constant, it is necessary to press the heater onto the sleeve by use of an elastic member. In the disclosure of Patent Document 8, a heater is pressed onto a sleeve by use of an elastic member and a cam.

More specifically, Patent Document 8 also discloses the constitution in which the cam is disposed between right-and-left arranged heaters, each heater is pressed by the elastic member such as a spring, and the heater is pressed onto a heat shrinkable sleeve by rotating the cam using a motor.

Hereinbelow, while pressing two heaters by spring as described above, a system of driving the heater by the cam inserted therebetween will be described with reference to FIG. 32 states (a) to (c).

FIG. 32 state (a) shows a state shortly after a sleeve 312 is set between two heaters 321 and 322 and before heating is started.

In the drawing, an optical fiber 311 provided inside the sleeve 312 is located on the center line S indicated by a dashed-dotted line.

Moreover, the position of the optical fiber 311 is held and fixed by clamps which are positioned in front of and at the rear side of the heaters 321 and 322 and not shown in the figure.

Subsequently, as shown in FIG. 32 state (b), a cam 323 rotates, the two heaters 321 and 322 are pressed onto the sleeve 312 by forces of compression coil springs 324 and 325, and heating of the heaters 321 and 322 is thereby started.

In the drawing, the cam 323 does not come into contact with movable tables 321A and 322A, and the sleeve 312 is pressed by the forces of the compression coil springs 324 and 325.

At this time, as long as the position of the optical fiber 311 is located on the center line S indicated by a dashed-dotted line, an excessive tension is not applied to the optical fiber 311.

Next, as it is in this state, the sleeve 312 shrinks, thereafter being completely shrunk, and heating reinforcement is completed. In this situation, if the position of the optical fiber 311 does not displace from the center line S as described above, an excessive tension is not applied to the optical fiber 311.

However, as a practical matter, the pressing forces of the right-and-left arranged compression coil springs 324 and 325 in the drawing are not the same as each other, the sleeve 312 does not stay on the center line S, and it is difficult for the two compression coil springs 324 and 325 to be always located at the same position while being continuously balanced for a long period of time.

For example, as shown in FIG. 32 state (c), in a general state, the compression coil springs 324 and 325 are located near the side of any one thereof due to a difference in force between the compression coil springs.

In the state shown in FIG. 32 state (c), the movable table 321A that is disposed at the left side in the drawing is brought into butt-contact with the left-side housing and stopped.

For this reason, in FIG. 32 state (c), the position of the optical fiber 311 is displaced from the center line S; furthermore, since the optical fiber 311 is fixed by the clamp which is not shown in the figure, if the above-mentioned slight displacement occurs, the excessive tensions of the compression coil springs 324 and 325 are applied to the optical fiber 311.

In the technique disclosed in Patent Document 8, there is a second problem in that an excessive pressing force is applied to the optical fiber.

The force of approximately 500 gf by which the sleeve is pressed is extremely larger than the tension of approximately 30 gf which can be applied to the above-described post-fusion-spliced optical fiber, this force is two or more times the tension of 200 gf under the rupture evaluation test, and therefore, there is a concern that the optical fiber is broken at the moment at which the pressing force is applied thereto.

Even if breaking does not occur, the long-term reliability of the optical fiber is degraded.

In the technique disclosed in Patent Document 8, there is a third problem in that a mechanism that applies a tension to the optical fiber is necessary.

In the method of pressing both sides of the sleeve 312 as described above, before performing the pressing by the heaters 321 and 322, it is necessary for the sleeve 312 to be in the state of being suspended from the optical fiber 311 to which a tension is applied in advance.

However, as shown in FIG. 33 views (a) and (b), in a case where the clamps 326 and 327 grasps the optical fiber 311 in a state in which a tension is not applied to the optical fiber, slack of the optical fiber 311 occurs immediately after clamping, and the position of the sleeve 312 is displaced downward.

In the foregoing case, as shown in FIG. 33 views (a) and (b), the sleeve 312 is not pressed at a proper position by the heaters 321 and 322, there is a concern that the work operation therefor is completed in a state in which shrinkage is not completed.

As a countermeasure against this case, it is thought that the heaters 321 and 322 are configured to be longer in the vertical direction thereof in consideration of the case where the position of the sleeve 312 is displaced downward; however, as the heaters 321 and 322 are larger in size, the heat capacity thereof increases, and there is a problem in that the rate of temperature increase decreases.

As a method of removing such slack of the above-mentioned optical fiber, it is required that a fixed tension is applied to a clamp grasping the optical fiber by use of, for example, an elastic member such as a spring or a magnetic member such as a magnet.

That is, in the two method described in the explanation of the above-described Patent Document 4, the method of using a magnetic force described in Patent Document 5, the method of Patent Document 6, it is necessary to apply a tension to the optical fiber.

In the technique disclosed in Patent Document 8, there is a fourth problem due to the size of the device.

By using a micrometer or a screw mechanism as a system of driving the heater, it is possible to provide a pressing force exceeding 500 gf.

However, since a fusion splicer that splices optical fibers is used on above a telegraph pole or in a narrow space such as a narrow manhole and since it is necessary to splice optical fibers having even a shorter excess length, a reduction in device size is required.

Because of this, in the case where two motors and two micrometers or two screw mechanisms are provided inside such fusion splicer, the device size increases, and there is a problem in that it is not suitable to a work operation environment or it is possible to splice optical fibers having a shorter excess length.

As a result, a fusion splicer provided with a drive mechanism obtaining the above-mentioned pressing force is not put to practical use.

Even in the case of using any technique described in the aforementioned Patent Documents 4, 5, and 6 in order to apply a tension to an optical fiber, since the movable clamp cannot move forward to the direction of the heater after the optical fiber is clamped, as a result, the movable clamp cannot absorb this tension when a large tension is applied to the optical fiber by the pressure of the heater.

Accordingly, it is not possible to remove the tension that is excessively applied to the optical fiber, there is a problem causing breaking of the optical fiber or degradation in long-term reliability thereof.

That is, in a conventional reinforcing heating device, due to the problem of the long-term reliability of the optical fiber, the sleeve cannot be pressed so as to be deformed.

By use of the technique described in the above-described Patent Document 8, it is possible to realize that a sleeve is pressed by the force exceeding a tension under a rupture evaluation test; however, a variety of mechanism elements as well as a motor is necessary, as a result, the device becomes larger in size.

That is, in a conventional reinforcing heating device, due to a limitation in device size, the sleeve cannot be pressed so as to be deformed.

SUMMARY OF THE INVENTION

The invention was made with respect to the above-described problems and has an object to provide an optical-fiber-spliced portion reinforcing heating device which prevents an excessive tension from being applied to an optical fiber and thereby prevents the optical fiber from being broken or prevents the long-term reliability thereof from being degraded, which has a high level of handleability in addition to prevention of the device from being larger in size, and which can heat-shrink a sleeve in a short amount of time.

In order to solve the aforementioned problem, the invention provides an optical-fiber-spliced portion reinforcing heating device characterized to include: a pair of right and left clamps that respectively grasp one portion of a coated portion of an optical fiber and the other portion thereof, the coated portion being exposed from a sleeve, where optical fibers are fusion-spliced at which the coated portion is removed and a coating-removed portion of a fusion-spliced portion and the coated portion of the optical fibers are covered with the sleeve; at least two or more heaters that are arranged to face each other so as to sandwich the optical fiber or the sleeve; a first force-applying member that presses at least one of the clamps so as to apply a tension to the optical fiber by use of one of an elastic member and a magnetic member; and a second force-applying member that applies a pressing force to at least one or more of the heaters via the sleeve by use of one of an elastic member and a magnetic member in accordance with control of a drive source, the heaters being arranged to face each other with the sleeve interposed therebetween, wherein a pressing force that is to be applied to the sleeve by the second force-applying member is set to be greater than a tension that is to be applied to the optical fiber by the first force-applying member, and in a state in which a tension is applied to the optical fiber by the first force-applying member, one of the clamps applying the tension is configured so that a backward movable range in a direction away from the heaters in the longitudinal direction of the optical fiber is ensured, a forward movable range that allows movement to the heater side is ensured, and the clamp moves in a direction in which a tension that is applied to the optical fiber as a result of pressing the sleeve by the heaters and by the second force-applying member is diminished.

In the aforementioned configuration, a configuration may also be adopted in which one of the heaters that are arranged so as to face each other with the sleeve interposed therebetween is movable and the other thereof is fixed.

In the aforementioned configuration, a configuration may also be adopted in which a pressing force that is to be applied to the sleeve by the heaters exceeds the tension of the fusion-spliced portion of the optical fiber under a rupture evaluation test.

In the aforementioned configuration, a configuration may also be adopted in which the heaters have pressing faces that face each other with the sleeve interposed therebetween are arranged in a substantially vertical direction, a tensile strength member is consistently arranged in a substantially downward direction by utilizing a weight of the tensile strength member that is inserted into the inside of the sleeve, and the direction of the sleeve is thereby constant.

In the aforementioned configuration, a configuration may also be adopted in which after heating of the sleeve is completed, the heaters are immediately separated from the sleeve, heat-transfer to the sleeve is interrupted, and the sleeve is thereby rapidly cooled by introduction of external air into the periphery of the sleeve.

In the aforementioned configuration, a configuration may also be adopted in which, before the optical fiber is grasped, in a state in which one of the clamps moves separately from the heaters by the first force-applying member and comes into contact with a backward movement stopper and a movable range is ensured only in a forward movement direction, in a state in which the paired right and left clamps grasp the optical fiber and a tension is not applied to the optical fiber, immediately after the optical fiber is grasped, or at the time of starting of pressing drive with respect to the sleeve by the heaters, or before or after the time of the starting of the pressing drive, the backward movement stopper is retracted, in a state in which the tension is applied to the optical fiber, the forward movable range of one of the clamps is ensured in addition to the backward movable range, and thereafter the heaters press the sleeve.

In the aforementioned configuration, a configuration may also be adopted in which, before the optical fiber is grasped, from a state in which one of the clamps is separated from the heaters by the first force-applying member and is in contact with a backward movement stopper to a state in which the clamp moves forward until coming into contact with a forward movement stopper and is maintained, in a state in which the paired right and left clamps grasp the optical fiber and a tension is not applied to the optical fiber, immediately after the optical fiber is grasped, or at the time of starting of pressing drive with respect to the sleeve by the heaters, or before or after the time of the starting of the pressing drive, one of the clamps is released from the contacting state with respect to the forward movement stopper and the forward movement stopper is retracted, in a state in which the tension is applied to the optical fiber, a forward movable range is ensured in addition to a backward movable range of one of the clamps, and thereafter, the heaters press the sleeve.

In the aforementioned configuration, a configuration may also be adopted in which, before the optical fiber is grasped, in a state in which an applied force in a backward movement direction away from the heaters is applied to one of the clamps by the first force-applying member and in a state in which one of the clamps is stopped at a position away from an end of a movable range thereof by a third force-applying member formed of an elastic member or a magnetic member which is used to move one of the clamps in a forward movement direction, in a state in which the paired right and left clamps grasp the optical fiber and a tension is not applied to the optical fiber, immediately after the optical fiber is grasped, or at the time of starting of pressing drive with respect to the sleeve by the heaters, or before or after the time of the starting of the pressing drive, in a state in which the paired right and left clamps apply a tension to the optical fiber as a result of decreasing an applied force of one of the clamps in the forward movement direction by the third force-applying member, as a result of increasing an applied force in the backward movement direction by the first force-applying member, or as a result of retracting the third force-applying member, a forward movable range is ensured in addition to a backward movable range of one of the clamps, and thereafter, the heaters press the sleeve.

In the aforementioned configuration, a configuration may also be adopted in which both the paired right and left clamps are movable back and forth in the longitudinal direction of the optical fiber, before the optical fiber is grasped, in a state in which one of the clamps is separated from the heaters by the first force-applying member and is in contact with a backward movement stopper and a movable range is ensured only in the forward movement direction and in a state in which the other of clamps moves forward to the heater side and is stopped before the optical fiber is grasped, in a state in which the paired right and left clamps grasp the optical fiber and a tension is not applied to the optical fiber, the other of clamps starts to move in a backward movement direction away from the heater side, one of the clamps moves in a forward movement direction which is due to a tension transmitted through the optical fiber, movement of the other of clamps is stopped at a position away from an end of a movable range of one of the clamps, therefore, in a state in which the tension is applied to the optical fiber, a forward movable range is ensured in addition to a backward movable range of one of the clamps, and thereafter, the heaters press the sleeve.

In the aforementioned configuration, a configuration may also be adopted in which, before the optical fiber is grasped, in a state in which one of the clamps is separated from heaters by the first force-applying member and is in contact with a backward movement stopper and a movable range is ensured only in the forward movement direction and in a state in which the paired right and left clamps grasp the optical fiber and a tension is not applied to the optical fiber, the heaters press the sleeve by a pressing force by the second force-applying member which is greater than a tension that is to be applied to the optical fiber by the first force-applying member, as a result of moving the optical fiber in a pressing direction which is due to movement of the sleeve or deformation of the sleeve after starting of the press, one of the clamps is drawn to a forward movement direction by a tension due to movement of the optical fiber, one of the clamps is configured so as to be stopped at a position away from an end of a movable range, therefore, in a state in which a tension is applied to the optical fiber by the first force-applying member, a forward movable range is ensured in addition to a backward movable range of one of the clamps, and thereafter, the heaters heat the sleeve.

Additionally, the invention provides an optical-fiber-spliced portion reinforcing heating device characterized to include: a pair of right and left clamps that respectively grasp one portion of a coated portion of an optical fiber and the other portion thereof, the coated portion being exposed from a sleeve, where optical fibers are fusion-spliced at which the coated portion is removed and a coating-removed portion of a fusion-spliced portion of the optical fibers is covered with the sleeve; a fifth force-applying member that is provided on at least one of the clamps that are arranged to face each other with the optical fiber interposed therebetween, sandwiches the optical fiber by use of one of an elastic member and a magnetic member, and applies a pressing force thereto; a first cam mechanism that is driven to rotate by controlling a motor; a mechanism that controls to grasp the optical fiber by the clamps and by the pressing force of the fifth force-applying member due to displacement of the first cam mechanism; at least two or more heaters that are arranged to face each other so as to sandwich the optical fiber or the sleeve; a second force-applying member that applies a pressing force to at least one or more of the heaters via the sleeve by use of one of an elastic member and a magnetic member, the heaters being arranged to face each other with the sleeve interposed therebetween; a third cam mechanism that is disposed on the camshaft on which the first cam mechanism is provided or is disposed on the other camshaft parallel to the camshaft, and is driven to rotate by controlling the motor; and a mechanism that controls to press the sleeve by the heaters and by the pressing force of the second force-applying member due to displacement of the third cam mechanism; wherein the same motor controls the clamps and the heaters by the force of each of the force-applying members and by the first and third cam mechanisms.

In the aforementioned configuration, a configuration may also be adopted in which, in two or more cam mechanisms used in the first cam mechanism and the third cam mechanism which are rotationally driven by the same motor, a rotating drive force by the drive source is reduced by determining a timing of combining a positive driving that needs a rotary drive torque and a negative driving that receives a torque to be diminished.

In the aforementioned configuration, a configuration may also be adopted in which, in at least one of two or more cam mechanisms used in the first cam mechanism and the third cam mechanism, an auxiliary movable member is disposed on the opposite side of each operation member with the camshaft interposed therebetween, each operation member is coupled to the auxiliary movable member by use of one of an elastic member and a magnetic member, a rotary drive torque of each cam mechanism is reversed from positive driving to negative driving as a result of displacing the auxiliary movable member instead of the operation member in accordance with a motion of each cam mechanism, and the positive driving and the negative driving are thereby combined and diminished in the two or more cam mechanisms.

In the aforementioned configuration, a configuration may also be adopted in which, regarding the paired right and left clamps and the heaters, one of them is movable, and the other of them is fixed.

In the aforementioned configuration, a configuration may also be adopted which includes: a first force-applying member that presses at least one of the clamps so as to apply a tension to the optical fiber by use of one of an elastic member and a magnetic member; a second cam mechanism that is disposed on the camshaft that is the same camshaft as those of the first cam mechanism and the third cam mechanism or is disposed on the other camshaft parallel to the camshaft, and is driven to rotate by controlling a motor; and a mechanism in which displacement of the second cam mechanism controls a tension of the optical fiber which is due to a tension of the first force-applying member of the clamps, wherein the same motor controls the clamps, the tension mechanism, and the heaters by a force of each of the force-applying members and by the first to third cam mechanisms.

In the aforementioned configuration, a configuration may also be adopted which further includes: a position limiting member that is configured of a forward movement stopper or a backward movement stopper, which limits a forward movable range or a backward movable range of at least one of the paired right and left clamps; a fifth cam mechanism that is to be rotationally driven by the motor control, the cam mechanism being disposed on the same camshaft as those of the first to third cam mechanisms or disposed on the other camshaft parallel to the camshaft; and a mechanism in which displacement of the fifth cam mechanism controls movement of the position limiting member, wherein the same motor controls the clamps, the tension mechanism, the heaters, and the position limiting member by the first to third and fifth cam mechanisms.

In the aforementioned configuration, a configuration may also be adopted which further includes: the first force-applying member that limits a forward movable range or a backward movable range of at least one of the paired right and left clamps or the third force-applying member that applies a tension in an opposite direction relative to the first force-applying member; a sixth cam mechanism that is disposed on the same camshaft as those of the first to third cam mechanisms or disposed on the other camshaft parallel to the camshaft and that is to be rotationally driven by the motor control; and a mechanism in which displacement of the sixth cam mechanism controls an applied force of the first force-applying member or the third force-applying member to be stronger or to be weaker, wherein the same motor controls the clamps, the tension mechanism, the heaters, and the first or the third force-applying members by the first to third and the sixth cam mechanisms.

In the aforementioned configuration, a configuration may also be adopted which includes: a lid that opens and closes the optical-fiber-spliced portion reinforcing heating device; a sixth force-applying member that applies a force of closing the lid thereto by use of one of an elastic member and a magnetic member; a fourth cam mechanism that is disposed on the same camshaft as those of the first to third cam mechanisms or disposed on the other camshaft parallel to the camshaft; and a mechanism in which displacement of the fourth cam mechanism controls opening or closing of the lid by an applied force of the sixth force-applying member, wherein the same motor controls the clamps, the tension mechanism, the heaters, and the lid by the force-applying members and by the first to fourth and sixth cam mechanisms.

In the aforementioned configuration, a configuration may also be adopted in which at least any of the clamps, the tension mechanism, the heaters, and the lid is configured by a lever-shaped member that rotationally moves around a rotation support parallel to the optical fiber and the sleeve or is provided at a lever-shaped member.

In the aforementioned configuration, a configuration may also be adopted in which a coil spring is used in the second force-applying member that presses the heaters, the paired right and left clamps, the force-applying member that grasps the optical fiber, and the force-applying member of the lid, and the rotation support is arranged on the same axis as that of the coil spring.

In the aforementioned configuration, a configuration may also be adopted in which the camshaft is arranged among the rotation support that is disposed under a device, the paired right and left clamps that are disposed above a device, the heaters, and the lid.

Furthermore, in the aforementioned configuration, the invention provides an optical-fiber-spliced portion reinforcing heating device characterized in that a pressing force that is to be applied to the sleeve by the second force-applying member is set to be greater than a tension that is to be applied to the optical fiber by the first force-applying member, and in a state in which a tension is applied to the optical fiber by the first force-applying member, one of the clamps applying the tension is configured so that a backward movable range in a direction away from the heaters in the longitudinal direction of the optical fiber is ensured, a forward movable range that allows movement to the heater side is ensured, and the clamp moves in a direction in which a tension that is applied to the optical fiber as a result of pressing the sleeve by the heaters and by the second force-applying member is diminished.

The invention provides an optical-fiber-spliced portion reinforcing heating device including: a pair of right and left clamps that respectively grasp one portion of a coated portion of an optical fiber and the other portion thereof, the coated portion being exposed from a sleeve, where optical fibers are fusion-spliced at which the coated portion is removed and a coating-removed portion of a fusion-spliced portion and the coated portion of the optical fibers are covered with the sleeve; a fifth force-applying member that is provided on at least one of the clamps that are arranged to face each other with the optical fiber interposed therebetween, sandwiches the optical fiber by use of one of an elastic member and a magnetic member, and applies a pressing force thereto; a first cam mechanism that is driven to rotate by controlling a motor; a mechanism that controls to grasp the optical fiber by the clamps and by the pressing force of the fifth force-applying member due to displacement of the first cam mechanism; at least two or more heaters that are arranged to face each other so as to sandwich the optical fiber or the sleeve; a second force-applying member that applies a pressing force to at least one or more of the heaters via the sleeve by use of one of an elastic member and a magnetic member, the heaters being arranged to face each other with the sleeve interposed therebetween; a third cam mechanism that is disposed on a camshaft on which the first cam mechanism is provided or is disposed on the other camshaft parallel to the camshaft, and is driven to rotate by controlling the motor; and a mechanism that controls to press the sleeve by the heaters and by the pressing force of the second force-applying member due to displacement of the third cam mechanism; wherein the same motor controls a force of each of the force-applying members with respect to the clamps and the heaters by the first and third cam mechanisms.

In the aforementioned configuration, a configuration may also be adopted in which, in two or more cam mechanisms used in the first cam mechanism and the third cam mechanism which are rotationally driven by the same motor, a rotating drive force by the drive source is reduced by determining a timing of combining a positive driving that needs a rotary drive torque and a negative driving that receives a torque to be diminished.

In the aforementioned configuration, a configuration may also be adopted in which, in at least one of two or more cam mechanisms used in the first cam mechanism and the third cam mechanism, an auxiliary movable member is disposed on the opposite side of each operation member with the camshaft interposed therebetween, each operation member is coupled to the auxiliary movable member by use of one of an elastic member and a magnetic member, a rotary drive torque of each cam mechanism is reversed from positive driving to negative driving as a result of displacing the auxiliary movable member instead of each operation member in accordance with a motion of each cam mechanism, and the positive driving and the negative driving are thereby combined and diminished in the two or more cam mechanisms.

In the aforementioned configuration, a configuration may also be adopted in which, regarding the paired right and left clamps and the heaters, one of them is movable, and the other of them is fixed.

In the aforementioned configuration, a configuration may also be adopted which includes: a first force-applying member that presses at least one of the clamps so as to apply a tension to the optical fiber by use of one of an elastic member and a magnetic member; and a mechanism that controls pull of the optical fiber, which is due to tensions of the clamps by the first force-applying member, based on operation of grasping the optical fiber by the clamps or operation of pressing the sleeve by the heaters, wherein the same motor controls the clamps or the heaters by the force of each of the force-applying members by use of the first and third cam mechanisms and control the tension mechanism by operating the controlled clamps or the controlled heaters.

In the aforementioned configuration, a configuration may also be adopted which includes: a first force-applying member that presses at least one of the clamps so as to apply a tension to the optical fiber by use of one of an elastic member and a magnetic member; a position limiting member that is configured of a forward movement stopper or a backward movement stopper, which limits a forward movable range or a backward movable range of at least one of the paired right and left clamps; a second cam mechanism that is to be rotationally driven by the motor control, the second cam mechanism being disposed on the same camshaft as those of the first and third cam mechanisms or disposed on the other camshaft parallel to the camshaft; a mechanism in which displacement of the second cam mechanism controls pull of the optical fiber, which is due to tensions of the clamps by the first force-applying member; and a mechanism in which displacement of the second cam mechanism controls movement of the position limiting member, wherein the same motor controls the clamps and the heaters by the first to third cam mechanisms.

In the aforementioned configuration, a configuration may also be adopted which includes: a first force-applying member that presses at least one of the clamps so as to apply a tension to the optical fiber by use of one of an elastic member and a magnetic member; a third force-applying member that presses to apply a tension in an opposite direction relative to the first force-applying member; a sixth cam mechanism that is to be rotationally driven by the motor control, the second cam mechanism being disposed on the same camshaft as those of the first and third cam mechanisms or disposed on the other camshaft parallel to the camshaft; and a mechanism in which displacement of the sixth cam mechanism controls an applied force of the first force-applying member or the third force-applying member, wherein each of the first and third force-applying members presses at least one of the clamps so as to apply a tension to the optical fiber by use of one of an elastic member and a magnetic member, and the same motor controls the clamps, the heaters, and the applied force controller by the first, third, and sixth cam mechanisms.

In the aforementioned configuration, a configuration may also be adopted which includes: a lid that opens and closes the optical-fiber-spliced portion reinforcing heating device; a sixth force-applying member that applies a force of closing the lid thereto by use of one of an elastic member and a magnetic member; a fourth cam mechanism that is disposed on the same camshaft as those of the first and third cam mechanisms or disposed on the other camshaft parallel to the camshaft; and a mechanism in which displacement of the fourth cam mechanism controls the lid to be opened or closed by an applied force of the sixth force-applying member, wherein the same motor controls the clamps, the heaters, and the lid by the force of each of the force-applying members and by the first to fourth cam mechanisms.

In the aforementioned configuration, a configuration may also be adopted in which at least any of the clamps, the heaters, and the lid is configured by a lever-shaped member that rotationally moves around a rotation support parallel to the optical fiber and the sleeve or is provided at a lever-shaped member.

In the aforementioned configuration, a configuration may also be adopted in which a coil spring is used in the second force-applying member that presses the heaters, the paired right and left clamps, the force-applying member that grasps the optical fiber, and the force-applying member of the lid, and the rotation support is arranged on the same axis as that of the coil spring.

In the aforementioned configuration, a configuration may also be adopted in which the camshaft is arranged among the rotation support that is disposed under a device, the paired right and left clamps that are disposed above a device, the heaters, and the lid.

In the aforementioned configuration, a configuration may also be adopted in which a pressing force that is to be applied to the sleeve by the second force-applying member is set to be greater than a tension that is to be applied to the optical fiber by the first force-applying member, and in a state in which a tension is applied to the optical fiber by the first force-applying member, one of the clamps applying the tension is configured so that a backward movable range in a direction away from the heaters in the longitudinal direction of the optical fiber is ensured, a forward movable range that allows movement to the heater side is ensured, and the clamp moves in a direction in which a tension that is applied to the optical fiber as a result of pressing the sleeve by the heaters and by the second force-applying member is diminished.

Effects of the Invention

According to the optical-fiber-spliced portion reinforcing heating device of the invention, as a result of removing an excessive tension that is to be applied to the optical fiber when the sleeve is sandwiched between heaters and is heat-shrunk, breaking of the optical fiber or degradation in long-term reliability is prevented, and a device is prevented from being larger in size.

Consequently, it is possible to heat-shrink the sleeve in a shorter amount of time with a high level of reliability, and an optical-fiber-spliced portion reinforcing heating device having a high level of handleability can be realized.

DETAILED DESCRIPTION OF THE INVENTION

Hereinafter, an optical-fiber-spliced portion reinforcing heating device according to a preferred embodiment related to the invention is adopted, and each constitution thereof will be described in detail with reference to drawings.

<Optical Fiber Fusion Splicer>

Figure 1:
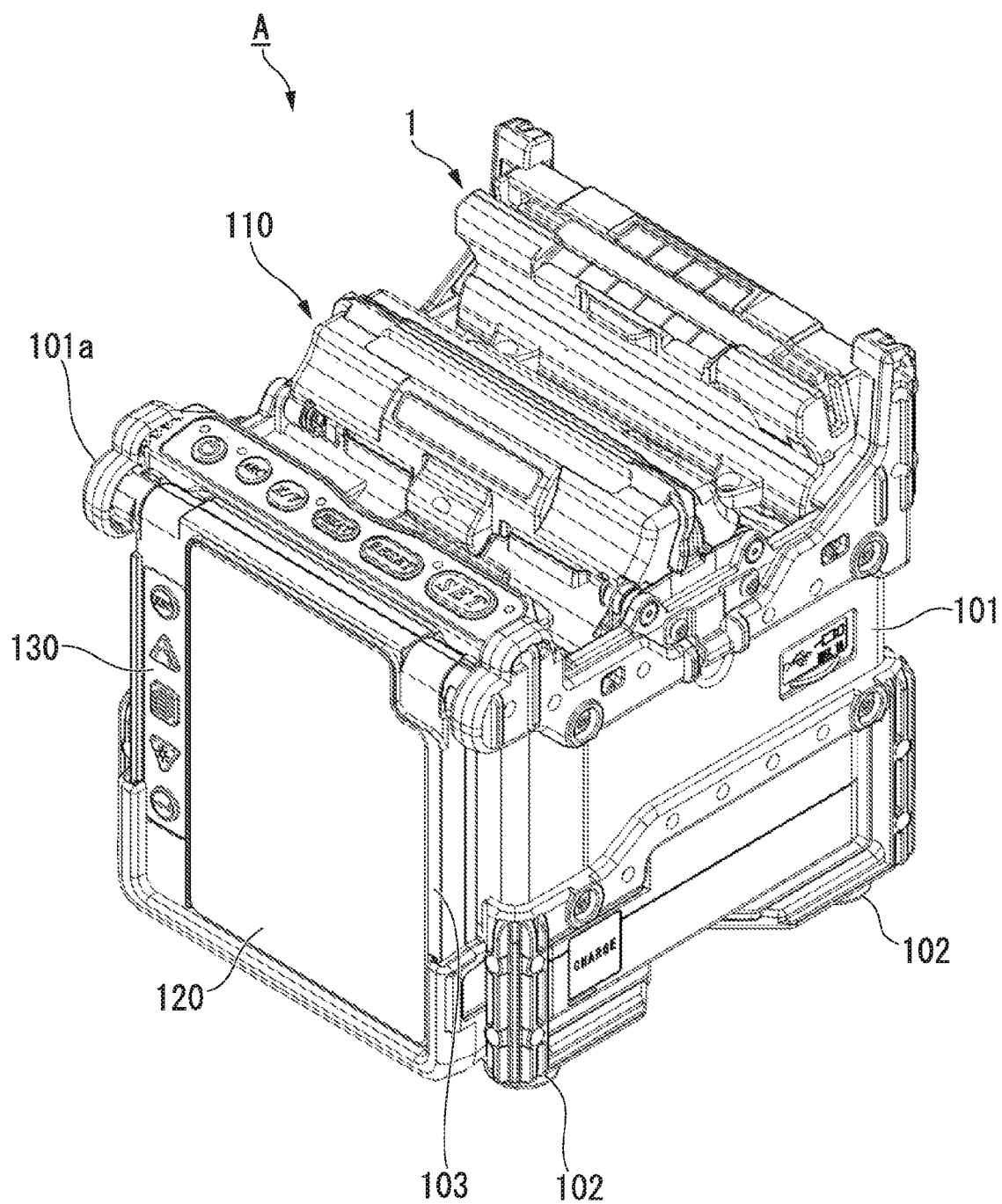
FIG. 1 is a perspective view showing an external appearance of an example of a fusion splicer that is provided with an optical-fiber-spliced portion reinforcing heating device according to an embodiment of the invention.

FIG. 1 shows an example of a fusion splicer including an optical-fiber-spliced portion reinforcing heating device 1 according to the invention.

Figure 2:
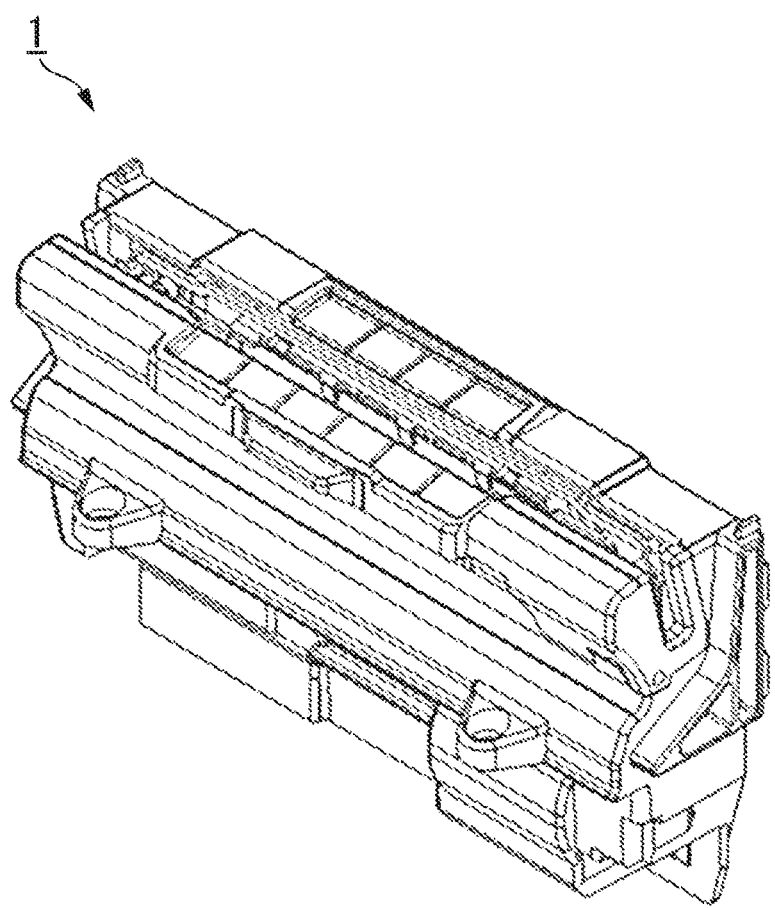
FIG. 2 is a perspective view showing an external appearance of an example of the optical-fiber-spliced portion reinforcing heating device according to the embodiment of the invention.

The fusion splicer A shown in FIG. 1 includes: a fusion splicing unit 110 that carries out fusion splicing an optical fiber; and the optical-fiber-spliced portion reinforcing heating device 1 (reinforcing heating device) that is used to heat shrink a reinforcement sleeve that covers the fusion-spliced optical fiber (also refer to FIG. 2).

Moreover, the fusion splicer A is provided with an indicator 120 that displays a variety of information or the like for an operator, an operation unit 130 that is used to set, for example, conditions, or the like in addition to the aforementioned reinforcing heating device 1 and the fusion splicing unit 110.

Furthermore, in the fusion splicer A shown as an example in the drawing, a built-in device (not shown in the figure), for example, a means, a controller, or the like, which is used to comprehensively drive them in addition to the reinforcing heating device 1 or the fusion splicing unit 110 are arranged in a substantially cube-shaped body part 101.

In addition, a plurality of legs 102 (four legs are shown in the drawing as an example and part of them is not shown in the figure) are provided under the body part 101.

Various display system such as liquid crystal, organic EL, or electric light may be adopted as the indicator 120.

Furthermore, the fusion splicer A is provided with a movable panel 103 at the fore side of the body part 101, and the indicator 120 or the operation unit 130 is disposed above the panel 103.

The panel 103 is coupled to the body part 101 via a rotation shaft 101a in the horizontal direction is provided at the upper portion of the body part 101 and can allow the indicator 120 to be directed to an optional direction in a predetermined angle range by movement of the panel 103, which is not particularly shown in the figure.

The operator can move the panel 103 so that the indicator 120 is in an easily viewable direction.

Figure 3:
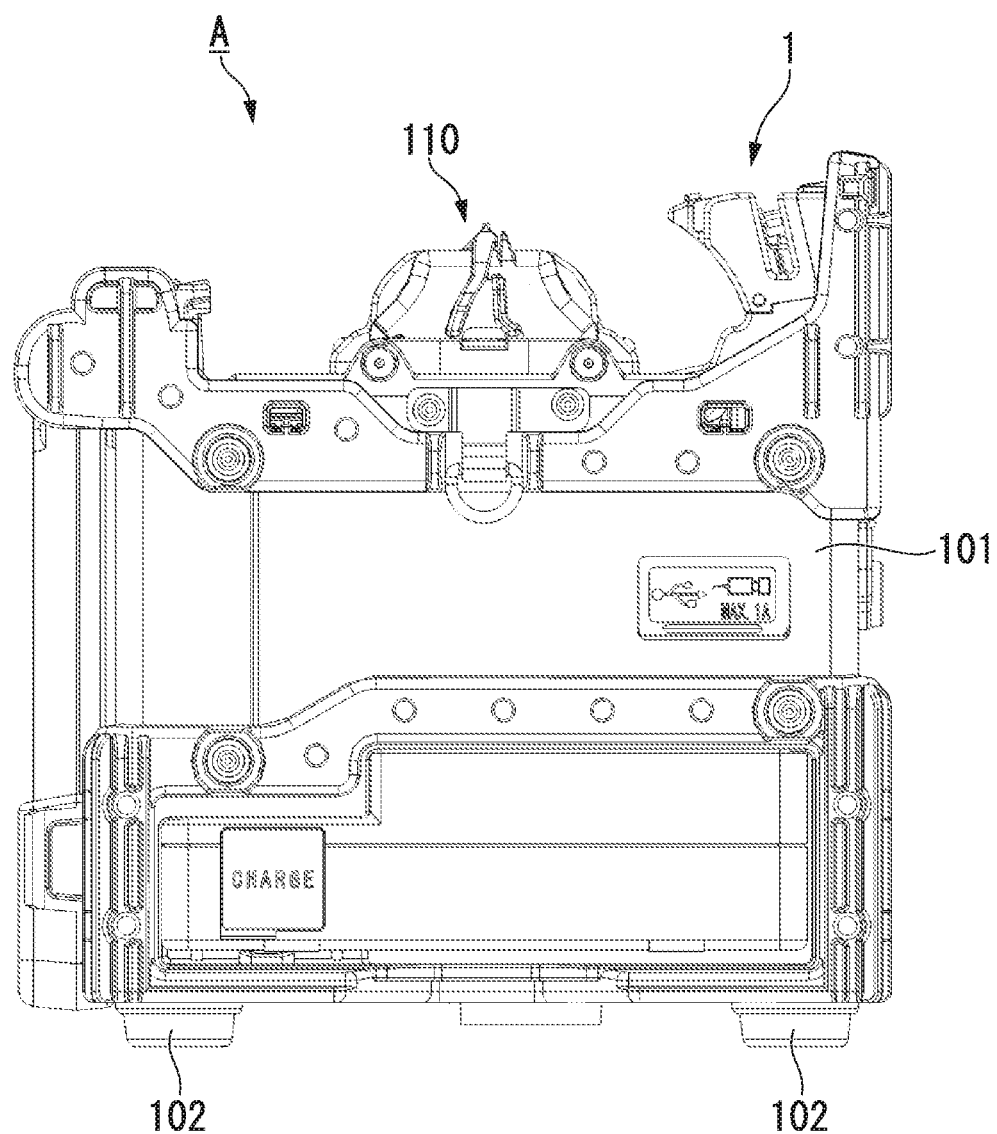
FIG. 3 is a side view showing an external appearance of an example of a fusion splicer that is provided with an optical-fiber-spliced portion reinforcing heating device according to the embodiment of the invention.

In the example as shown in the perspective view shown in FIG. 1 and the side view shown in FIG. 3, the reinforcing heating device 1 is arranged at the position which is a rear side of the fusion splicer A, and the fusion splicing unit 110 is disposed in front of the reinforcing heating device 1.

Here, regarding front, back, left, and right in the explanation in the embodiment, in the situation where an operator uses the fusion splicer A including the above-mentioned reinforcing heating device 1, the side that faces the operator is referred to as the front side (the left side in FIG. 3), the rear side of the fusion splicer A as seen from the operator is referred to as the back side (the right side in FIG. 3), and the right and the left of the operator are referred to as the right and the left.

<Sleeve Used to Reinforce an Optical Fiber Spliced Portion>

Figure 5:
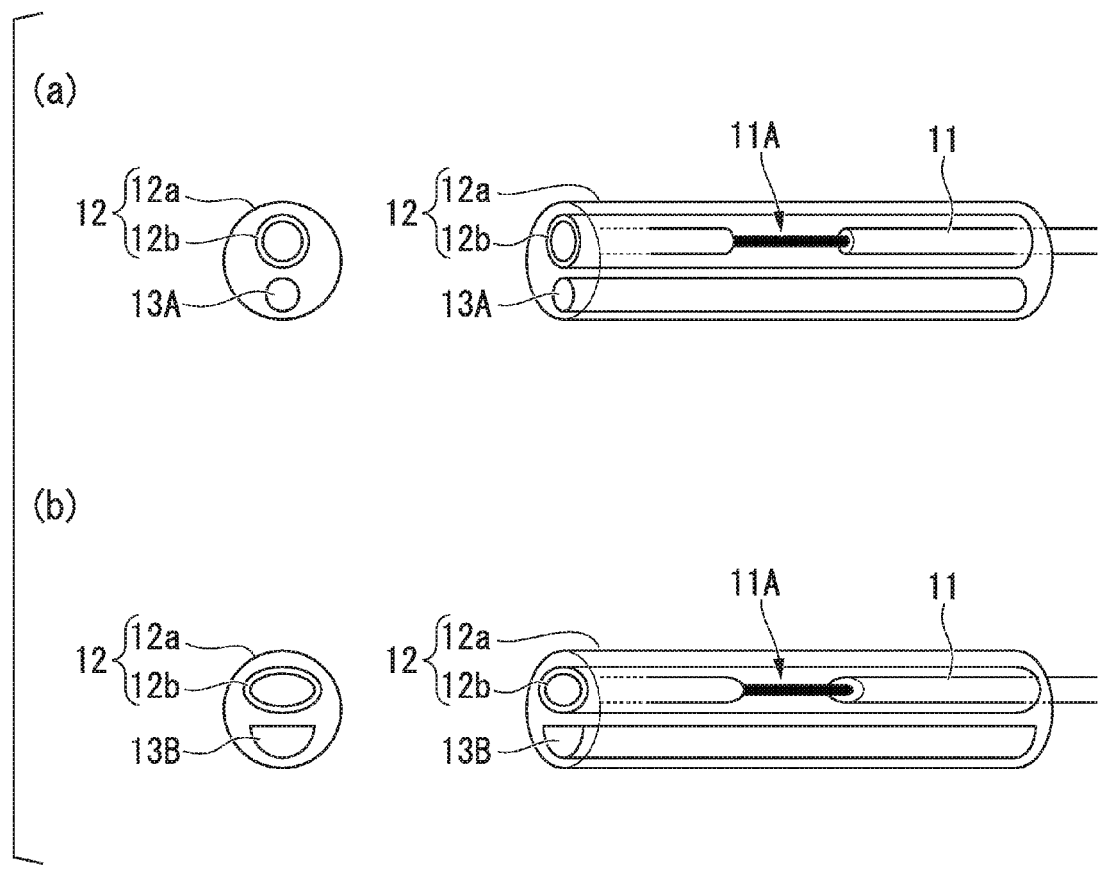
FIG. 5 is a schematic view showing an example of a sleeve that is used to reinforce an optical fiber spliced portion and is to be heat-shrunk by use of the optical-fiber-spliced portion reinforcing heating device according to the embodiment of the invention.

As shown in FIG. 5 cases (a) and (b), a sleeve 12 that is heat-shrunk by the reinforcing heating device 1 according to the invention and reinforces an optical fiber spliced portion is provided so as to cover tensile strength members 13A and 13B and an optical fiber 11 (spliced portion 11A) at the position of the spliced portion 11A where the optical fibers 11 are fusion-spliced to each other.

Generally, the foregoing sleeve 12 is called by various names such as an optical fiber reinforcement member, a heat shrinkable tube, a heat shrinkable sleeve, a reinforcement sleeve, and all of them have a common function.

Particularly, in FIG. 5 cases (a) and (b), for convenience, the same reference numeral is added to all sleeves.

As shown in an example in FIG. 5 case (a), in the case where the sleeve 12 is used for a single-core optical fiber spliced portion, an inner tube 12b that is formed of a cylindrical hot melt tube and is in a state of covering the spliced portion 11A of the optical fiber 11 and a tensile strength member 13A that is formed of a cylindrical hard core made of a SUS or the like are arranged inside an outer tube 12a formed of a heat shrinkable tube.

Furthermore, as shown in FIG. 5 case (b), in a state in which the sleeve 12 is used for a spliced portion of a multi-core optical fiber (multi-core ribbon), an inner tube 12b that is formed of an elliptic cylindrical hot melt tube and is in a state of covering the spliced portion 11A of the optical fiber 11 and a tensile strength member 13B that is formed of a semicircular-column shaped hard core made of glass or the like are arranged inside an outer tube 12a formed of a heat shrinkable tube.

Here, as the reason that a glass hard core shown in FIG. 5 case (b) is used as the tensile strength member 13B that is inserted into the sleeve 12 for reinforcement of the spliced portion of the multi-core optical fiber, the reason described below is adopted.

Generally, in a fusion splicer, an optical fiber is subjected to a tensile test after the optical fibers are spliced, and the reliability thereof (for example, the presence or absence of damages to glass) is thereby evaluated.

In the case of a single-core optical fiber, even in cases where a degree of elasticity is large and an inexpensive SUS is used as a tensile strength member, since the reliability thereof is evaluated by the tensile test, it is possible to determine if it is appropriate.

However, in the case of a multi-core ribbon optical fiber, since a tension is only applied to one fiber that is shortest in the multi-core optical fibers, it is not possible to presume that the reliability thereof is ensured.

Consequently, for reinforcement of the spliced portion of the multi-core optical fiber, a glass material having a low degree of elasticity similar to that of an optical fiber is used as tensile strength member; however, it is a little expensive.

Particularly, hereinafter, in order to provide a clear understanding, the outer tube and the inner tube are simply referred to as the sleeve 12 without discriminating them, and additionally drawings are explained is the same way.

<Optical-Fiber-Spliced Portion Reinforcing Heating Device>

First Embodiment

Hereinafter, an optical-fiber-spliced portion reinforcing heating device according to a first embodiment of the invention will be described in details mainly using schematic views shown in FIGS. 5 to 17.

In other cases, the configurations which are not shown in schematic views of FIGS. 5 to 17 will be described using a breakaway view shown in FIG. 4 or the like which is illustrated in a second embodiment according to the invention.

Additionally, configurations that are common to those of a reinforcing heating device according to a second embodiment, which will be particularly described later, will be suitably described with reference to FIG. 4 or the like in this embodiment; in addition, even where placements or the like of configurations of embodiments are different from each other, elements having the same function may be represented by the same reference numerals in the description.

Furthermore, each of drawings which will be referred in the explanation described below schematically illustrates a reinforcing heating device. Therefore, positional relationships of the drawings may be different from each other in the horizontal direction or the vertical direction in the drawings.

Figure 6:
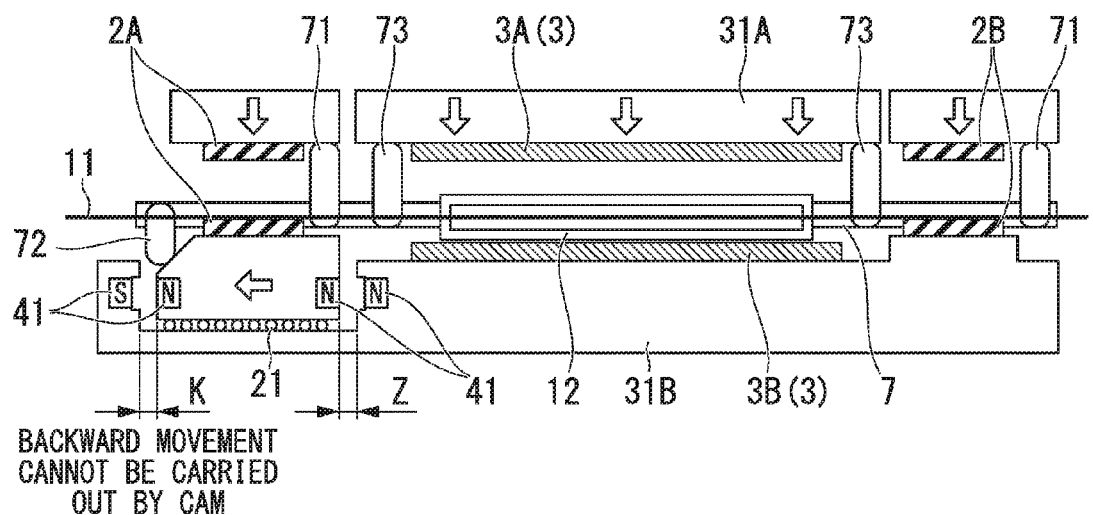
FIG. 6 is a schematic view illustrating an example of an operation of the optical-fiber-spliced portion reinforcing heating device according to the embodiment of the invention.

As shown in FIG. 6 or the like (also, partially refer to FIG. 4), the reinforcing heating device 1 according to the embodiment includes: a pair of right and left clamps 2 (2A, 2B) grasp one portion of the coated portion exposed from the sleeve 12 and the other portion thereof where the optical fibers 11 are fusion-spliced to each other at which a coated portion is removed and a coating-removed portion and the coated portion of the fusion spliced portion 11A of the optical fiber 11 are covered with the sleeve 12; two heaters 3 (3A, 3B) that are disposed so as to face each other so as to sandwich the optical fiber 11 or the sleeve 12; a first force-applying member 41 that presses at least one of the clamps 2, for example, the clamp 2A shown in the drawing so as to apply a tension to the optical fiber 11 by use of one of an elastic member and a magnetic member; and a second force-applying member 42 that applies a pressing force to at least one or more of the paired heaters 3A and 3B by use of one of an elastic member and a magnetic member with the sleeve 12 interposed therebetween in accordance with control of a motor 6 serving as a drive source where the heaters are arranged opposite to each other with the sleeve 12 interposed therebetween.

Moreover, in the reinforcing heating device 1, the pressing force with respect to the sleeve 12 by the second force-applying member 42 is set to be greater than the tension to the optical fiber 11 by the first force-applying member 41, in a state in which a tension is applied to the optical fiber 11 by the first force-applying member 41, a backward movable range K is ensured in a direction in which one clamp 2A that applies a tension thereto moves separately from the heaters 3 in the longitudinal direction of the optical fiber 11, and a forward movable range Z is ensured in which the clamp can move to the heater side 3.

Consequently, in the reinforcing heating device 1, the clamp 2A is configured to move in the direction in which the tension that is to be applied to the optical fiber 11 as a result of pressing the sleeve 12 by the heaters 3 and by the second force-applying member 42 is diminished.

Furthermore, the reinforcing heating device 1 is provided with a lid 10 that carries out opening and closing of the inside of device when the optical fiber 11 is set to this reinforcing heating device.

Additionally, each of the above-mentioned structures is attached to a housing 5 or accommodated in the inside of the housing 5.

In addition, the sleeve 12 may cover a coating-removed portion and a coated portion of the optical fiber 11 or only cover the coating-removed portion.

As shown in FIG. 6 or the like, the clamps 2 (2A, 2B) are a pair of right and left clamps which are constituted of the clamp 2A that grasps one of the optical fiber 11 and the clamp 2B that grasps the other of the optical fiber 11.

The clamps 2 are configured to be able to sandwich and grasp (clamp) the optical fiber 11 by use of a force-applying member such as a torsion coil spring or a double torsion spring (for example, a force-applying member of 2a shown in FIG. 34) and are placed at both sides of the heaters 3 in the longitudinal direction of the optical fiber 11 shown as an example in the drawing.

Additionally, as shown in FIG. 6 or the like, the clamp 2A that is one of the right and left clamps 2 that are arranged to form a pair thereof is configured to be openable and closable and the clamp 2B that is the other thereof is configured to be the same.

Furthermore, one of the clamps 2 slidably moves in the longitudinal direction of the optical fiber 11 and the clamp 2A is configured to be able to apply a tension to the optical fiber 11 by use of the first force-applying member 41 formed of a permanent magnet as an example shown in FIG. 6 or the like.

The clamps 2 are provided for preventing the displacement between the position of the sleeve 12 and the position of the spliced portion 11A of the optical fiber 11 in the case where a tension is applied to the optical fiber 11 before heat shrinking is carried out, generally, the clamps are located at two positions, that is, at both sides of the heaters 3.

Figure 29:
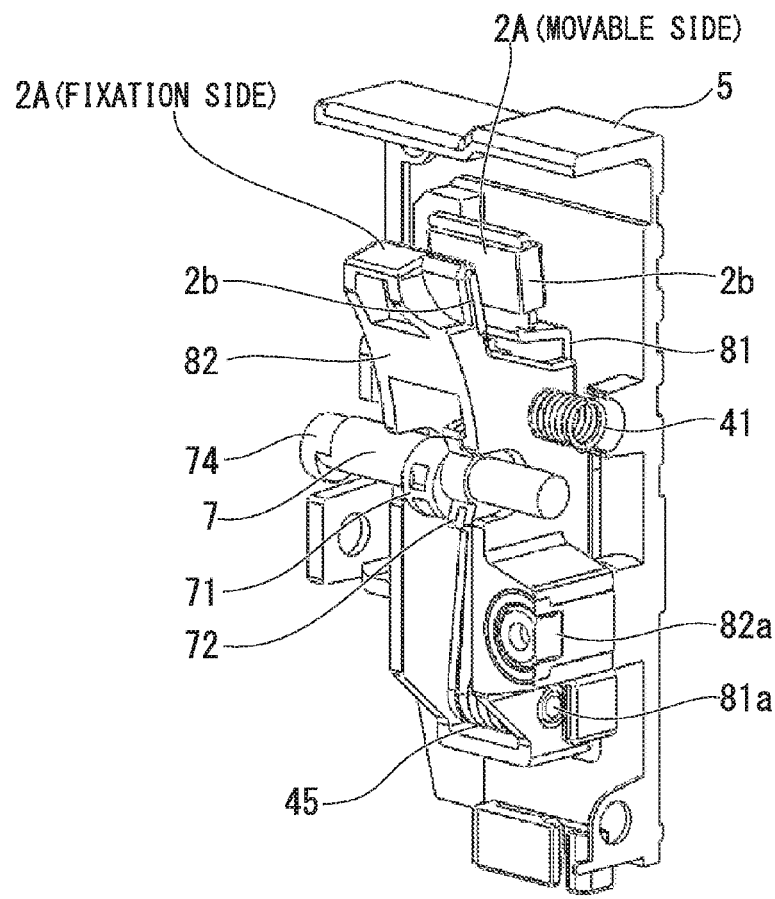
FIG. 29 is a breakaway view partially illustrating the relevant part of the optical-fiber-spliced portion reinforcing heating device according to the embodiment of the invention.

Moreover, a grasping rubber which is used to directly grasp the optical fiber 11 and is not shown in FIG. 6 or the like is provided on the surface of each of the paired right and left clamps 2A and 2B (refer to FIG. 29).

The heaters 3 (3A, 3B) is used to press and heat-shrink the sleeve 12 and is generally referred to as a name such as a heater, a heat generation unit, a heat generation source, a heat generation body, a heat source, a heating section, a heating source, a heating member, or the like.

The heaters 3 serving as two heaters 3A and 3B are opposed and arranged so as to sandwich the optical fiber 11 or the sleeve 12 and are thereby configured to be able to sandwich and press the sleeve 12 so that one heater 3A is configured to be openable and closable and the heater 3B is fixed.

Figure 4:
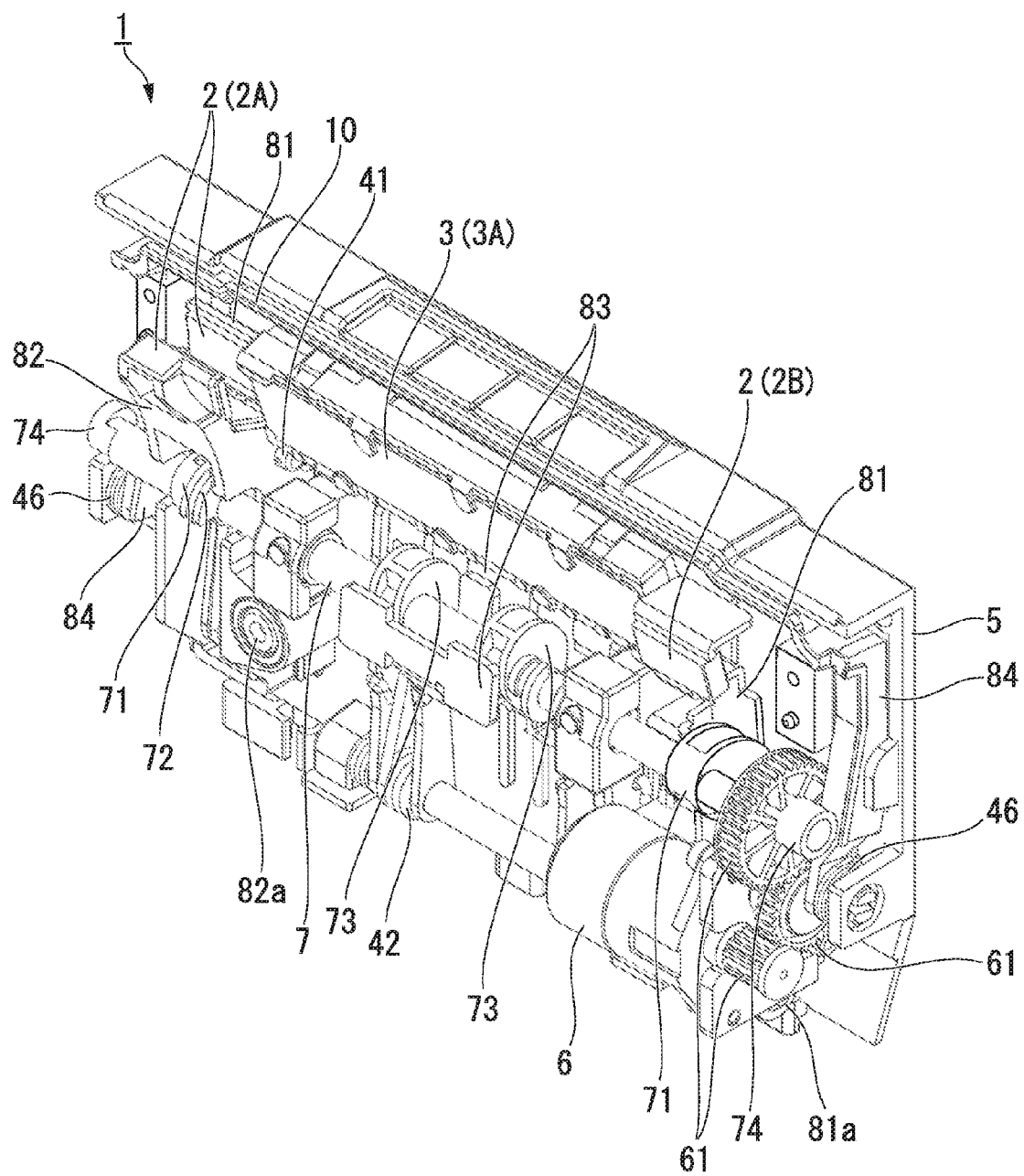
FIG. 4 is a breakaway view illustrating an example of the inner structure of the optical-fiber-spliced portion reinforcing heating device according to the embodiment of the invention.

Furthermore, the openable-and-closable heater 3A is configured to press the sleeve 12 in a direction in which the sleeve is sandwiched and pressed by the second force-applying member 42 configured by a double torsion spring as shown in FIG. 4.

In addition, as shown in FIG. 6 or the like as an example, the two heaters 3A and 3B are attached to surfaces of heater attachment bases 31A and 31B, respectively.

The heaters 3 are not particularly shown in the figure; however, generally, it is preferable to use a plurality of heater circuit patterns.

Furthermore, a polyimide film heater that is adhesively attached to a metal sheet as well as a ceramic heater that is adhesively attached to a metal sheet is preferably used as the heaters 3 as an example since the entire surface of them can be subjected to folding.

In this case, a configuration can be adopted in which, for example, two, three, or more circuit patterns formed of a polyimide film heater are implanted into a plate-shaped metal sheet.

In the embodiment, a configuration is adopted which sandwiches the sleeve 12 by only driving one heater 3A; however, it is not limited to this, for example, a further powerful pressing force can also be generated by driving both two heaters.

However, in the case of driving both two heaters, since there is a concern that the mechanism thereof becomes complicated and cost increases, it is not preferable in any way.

Moreover, even in the structure that drives only one heater 3A such as the embodiment, since a sufficient pressing force with respect to the sleeve 12 is obtained and there is also an advantage described below, the above-mentioned configuration is preferably adopted.

Firstly, in the case where one heater 3A is only openable and closable, since a drive mechanism of the other heater 3B is not necessary and an elastic member such as a heater attachment base which will be particularly described later or a double torsion spring that is used to press the sleeve 12 is not necessary at this position, it is possible to reduce the number of parts and the cost therefor.

Furthermore, it is possible to reduce the displacement from the center line S of the optical fiber 11 when the heaters 3 presses the sleeve 12.

The reason is that, the other heater 3B is fixed, as compared with a case where both heaters are openable and closable, it is not necessary for the applied forces of the elastic members to be balanced, particularly when the sleeve 12 is set adjacent to the fixed-side heater 3B, it is possible to minimize the displacement of the optical fiber 11.

In details, as a result of providing the optical fiber 11 and the sleeve 12 shown in FIG. 6 to be adjacent to the fixed-side heater 3B such that, for example, the sleeve 12 comes into contact therewith and grasping the optical fiber 11 by the clamps 3 in this state, it is possible to minimize the displacement of the optical fiber 11 during pressing thereof by the heaters 3.

At this time, when heat-shrinkage of the sleeve 12 begins, the positions of the optical fiber 11 and the sleeve 12 gradually move to the fixed-side heater 3B.

Subsequently, when the sleeve 12 is completely heat-shrunk, it is not possible to avoid the position of the optical fiber 11 from being displaced from the center line S to the other heater 3B.

However, in this case, the displacement of the optical fiber 11 is a substantially half of the diameter of the sleeve 12, substantially, which is a degree of decrease in the diameter due to the heat shrinkage.

Additionally, in the embodiment, similar to the case of the reinforcing heating device shown in FIG. 4 as an example, with respect to the above-mentioned paired heaters 3 and the paired right and left clamps 2, it is possible to carry out opening and closing by driving one heater 3A and opening and closing by driving one clamp 2A by use of the same camshaft 7 (on the same axis) by the motor 6 that is the same drive source.

In the case of adopting the foregoing configuration, the effect is obtained that a sequence of control such as grasping and removing of the optical fiber 11 by opening and closing by use of the pair of right and left clamps 3, control of a tension that is to be applied to the optical fiber 11, and heat shrinking of the sleeve 12 by pressing by the pair of heaters 3 becomes easy.

In addition, in the embodiment, as shown in FIGS. 6 to 11, a drive control of operations of opening and closing the paired right and left clamps 2A and 2B is carried out by a first cam mechanism 71 that is provided in the camshaft 7, and a drive control of one heater 3A that is configured to be openable and closable is carried out by a third cam mechanism 73.

Furthermore, in the embodiment, a second cam mechanism 72 that is provided in the camshaft 7 is configured to function as a backward movement stopper that restricts a movement of one clamp 2A in a backward direction where the clamp slidably moves in the longitudinal direction of the optical fiber 11.

In the invention, the cam mechanism may be simply referred to as a "cam" or "cam member".

Moreover, as described above, one clamp 2A is pressed by the first force-applying member 41 that is configured by an elastic member such as a spring, a rubber, or a sponge, or a magnetic member such as a permanent magnet or an electromagnet in the longitudinal direction of the optical fiber 11 and in the backward movement direction, and is configured to be able to apply a tension to the optical fiber 11.

Consequently, the embodiment provides the backward movable range K in which a slack of the optical fiber 11 is removed and the forward movable range Z in which, even in the case where an excessive tension is applied to the optical fiber 11 by pressing one heater 3A, the tension can be absorbed.

Furthermore, in the reinforcing heating device 1, the paired right and left clamps 2A and 2B or one heater 3A does not carry out grasping, opening, and closing operations or a pressing operation by a driving power that is directly transmitted through the above-mentioned motor 6 or each cam mechanism, and each force-applying member that is configured by an elastic member such as a spring, a rubber, or a sponge, or a magnetic member such as a permanent magnet or an electromagnet presses the optical fiber 11 or the sleeve 12.

Particularly, a double torsion spring is used as the second force-applying member 42 that presses one heater 3A in the example shown in FIG. 4, and a torsion coil spring is used as a fifth force-applying member 45 that presses the openable-and-closable side of the paired right and left clamps 2A and 2B in the example shown in FIG. 29.

(Example of Operation of Reinforcing Heating Device)

As described above, in the reinforcing heating device 1 described in the embodiment, an applied force of the second force-applying member 42 that presses one heater 3A is set to a large pressing force such that, when the sleeve 12 is pressed by the second force-applying member 42 and the heater 3A, the applied force causes the optical fiber 11 to be displaced from the central axis line S (refer to FIG. 12 or the like) of the optical fiber 11 pulled by the first force-applying member 41.

Additionally, in a state in which a tension is applied to the optical fiber 11 by the first force-applying member 41, the backward movable range K is ensured in a direction in which one clamp 2A that applies a tension thereto moves separately from the heaters 3 in the longitudinal direction of the optical fiber 11, and the forward movable range Z is ensured in which the clamp can move to the heater side 3.

Furthermore, the clamp 2A is configured to move in the direction in which the tension that is to be applied to the optical fiber 11 as a result of pressing the sleeve 12 by the heaters 3 and by the second force-applying member 42 is diminished.

Steps in the case of heat-shrinking the sleeve 12 in a state of coating the spliced portion 11A of the optical fiber 11 by use of the reinforcing heating device 1 provided with the aforementioned configuration and effects that can diminish and remove a tension will be described below with reference to mainly FIGS. 4, and 6 to 11.

FIGS. 6 to 11 are schematic views showing the situations as seen from the upper side of the reinforcing heating device 1.

Particularly, in order to provide a clear understanding, part of configuration shown in FIGS. 6 to 11 is omitted with respect to the breakaway view shown in FIG. 4, and the same configurations are applied in the explanation below.

As shown in FIG. 6, the optical fiber 11 is inserted into the sleeve 12, the camshaft 7 is disposed at the lower side of the optical fiber 11 (a deep direction in the drawing).

Two heaters 3A and 3B that is used to press the sleeve 12 are are disposed at a substantially center portion shown in FIG. 6, the rear side thereof (the upper side of FIG. 6) is driven as an openable-and-closable heater 3A, and the front side thereof (the lower side of FIG. 6) is a fixed-side heater 3B.

Regarding the paired right and left clamps 2A and 2B, the rear side thereof (the upper side of FIG. 6) is driven as an openable-and-closable clamp, and the front side thereof (the lower side of FIG. 6) is a fixed clamp.

One clamp 2A can slidably move in the longitudinal direction of the optical fiber 11 by a slide mechanism 21 that is configured by, for example, a bearing or the like.

In the drawing shown as an example, the slide mechanism 21 is provided on the clamp that is in front of the clamp 2A, and the configuration in which slide movement is possible is realized while the front and rear sides thereof coordinately move.

Moreover, in the drawing shown as an example, the first force-applying member 41 is provided by disposing the total four magnets (magnetic member) near the slide mechanism 21 provided at one clamp 2A, the clamp 2A is in a state of being pulled in the left direction in the drawing, that is, in the backward movement direction in which it is possible to apply a tension to the optical fiber 11.

As described above, this tension is a weak force such as several tens of gf.

On the other hand, a strong force such as several hundreds of gf is applied to each of the openable-and-closable side of the paired right and left clamps 2A and 2B and one heater 3A by the fifth force-applying member 45 (refer to FIG. 29) and the second force-applying member 42; however, they are in a state of being opened by pressure of the first cam mechanism 71 the third cam mechanism 73 which are provided in the camshaft 7 in FIG. 6.

Additionally, the cam mechanisms such as the first cam mechanism 71, the third cam mechanism 73, and the like are different from each other in configuration.

Figure 7:
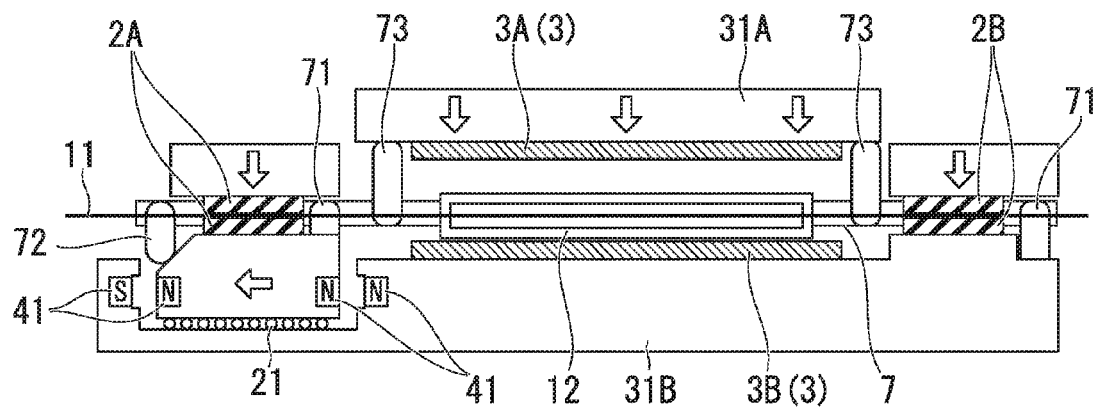
FIG. 7 is a schematic view illustrating an example of an operation of the optical-fiber-spliced portion reinforcing heating device according to the embodiment of the invention.

Next, as shown in FIG. 7, when the camshaft begins to rotate, firstly, the openable-and-closable clamp of the paired right and left clamps 2A and 2B is closed, and the first cam mechanism 71 and the paired right and left clamps 2A and 2B are in a non-contact state.

As stated above, since the first cam mechanism 71 and the openable-and-closable side of the paired right and left clamps 2A and 2B are in a non-contact state, the paired right and left clamps 2A and 2B grasp the optical fiber 11 by a pressing force of several hundreds of gf by the fifth force-applying member 45.

Figure 8:
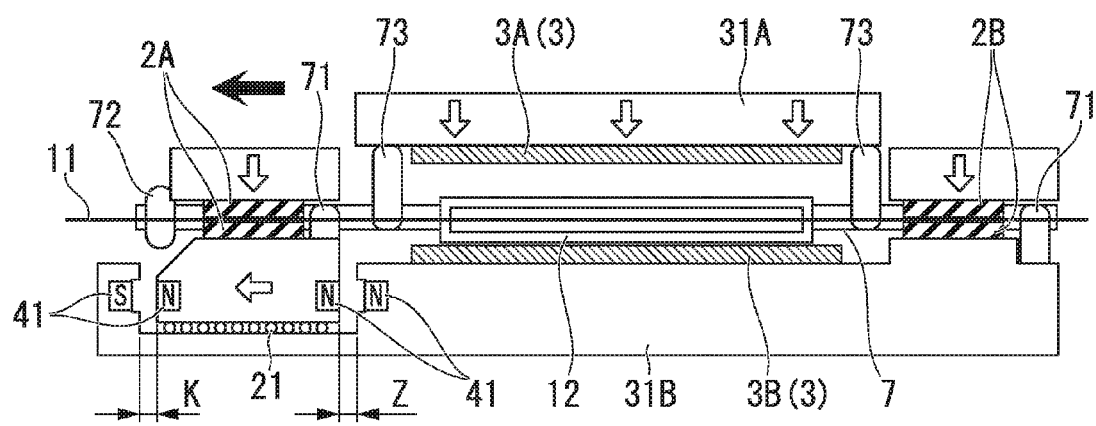
FIG. 8 is a schematic view illustrating an example of an operation of the optical-fiber-spliced portion reinforcing heating device according to the embodiment of the invention.

Subsequently, as shown in FIG. 8, when the camshaft 7 further rotates, the second cam mechanism 72 that is positioned close to one clamp 2A and both the fixed-side and the openable-and-closable side of one clamp 2A are in a non-contact state, the entire one clamp 2A is movable in the backward movement direction (the left side in the drawing), and therefore, a tension due to the first force-applying member 41 is applied to the optical fiber 11.

At this time, a slack of the optical fiber 11, that is, the lowering of the position of the sleeve 12 in the vertical direction thereof, can be removed by slide movement of one clamp 2A in the backward movement direction.

Here, the backward movable range K occurs and is ensured in addition to the forward movable range Z in one clamp 2A.

Consequently, one clamp 2A is in a state of being capable of moving back and forth in the longitudinal direction of the optical fiber 11.

Because of this, it is possible to control a tension to be constant in a state in which a slack of the optical fiber 11 does not occur.

Figure 9:
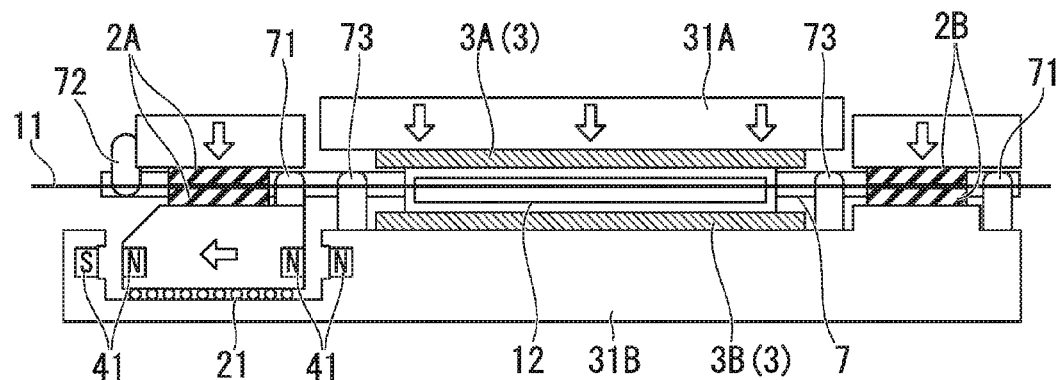
FIG. 9 is a schematic view illustrating an example of an operation of the optical-fiber-spliced portion reinforcing heating device according to the embodiment of the invention.

After that, as shown in FIG. 9, the camshaft 7 further rotates, the third cam mechanism 73 does not comes into contact with the heater attachment base 31A, and the sleeve 12 is sandwiched between two heaters 3A and 3B that are disposed on surfaces of the heater attachment bases 31A and 31B and is in a state of being pressed by a pressing force of several hundreds of gf by the second force-applying member 42.

In this state, the rotation of the camshaft 7 is stopped.

In such a state, an operation of heat shrinking the sleeve 12 begins by two heaters 3A and 3B.

Figure 10:
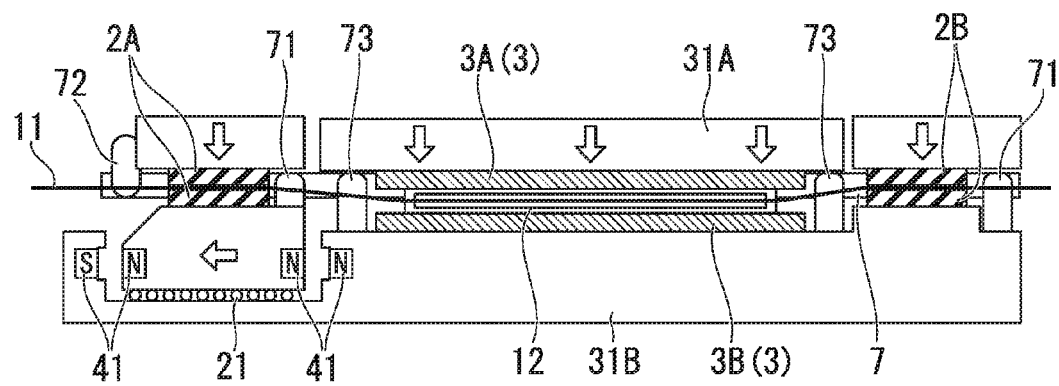
FIG. 10 is a schematic view illustrating an example of an operation of the optical-fiber-spliced portion reinforcing heating device according to the embodiment of the invention.

Before long, as shown in FIG. 10, shrinkage of the sleeve 12 is completed.

At this time, during shrinkage of the sleeve 12, the sleeve 12 and the optical fiber 11 move in the direction of the other heater 3B while being pressed by a force of several hundreds of gf. However, since one clamp 2A slidably moves in the forward movement direction (the right side in the drawing), a tension that is to be applied to the optical fiber 11 can be maintained constant such as several tens of gf.

The amount of time for heating the sleeve 12 in a pressing state as shown in FIG. 10 varies depending on the kinds of sleeve 12.

For this reason, in advance, an operator specifies the kinds of sleeve in a heating controller which is not shown in the figure.

As the heating controller performs a control of extension or shortening of the heating time which is due to an outdoor temperature or a battery voltage based on the specified information according to the kinds of sleeve, shrinkage of the sleeve 12 is carried out at an optimal temperature (generally, 200 to 240° C.) and for an optimal heating time.

This is a typical example of heating control.

After heating by the two heaters 3 is carried out for an optimal time, the heating by the heaters 3 are stopped.

Figure 11:
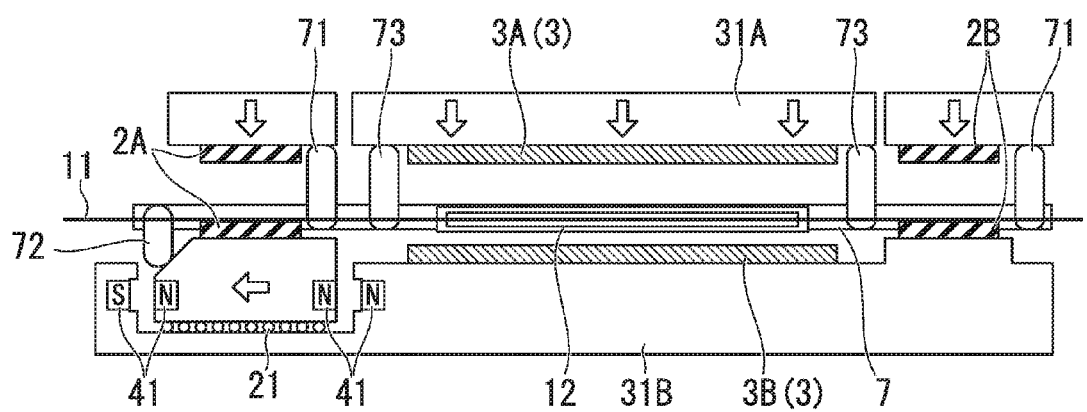
FIG. 11 is a schematic view illustrating an example of an operation of the optical-fiber-spliced portion reinforcing heating device according to the embodiment of the invention.

Subsequently, as shown in FIG. 11, as the camshaft 7 further rotates, the openable-and-closable side of the paired right and left clamps 2A and 2B is opened by the first cam mechanism 71, the optical fiber 11 is released from a grasping state.

Moreover, as the heater attachment base 31A to which one heater 3A is attached is opened by pressure of the third cam mechanism 73, the sleeve 12 is separated from the two heaters 3A and 3B and is in a state of being released from pressure.

Furthermore, in order to shorten the amount of time of heating the sleeve by the reinforcing heating device, shortening of the cooling time is also of importance.

As the sleeve 12 moves separately from the heaters 3, heat transfer of remaining heat of the heaters 3 to the sleeve 12 is blocked; furthermore, as a cold air flows into the internal side of the reinforcing heating device 1, it is possible to rapidly cool down the sleeve 12 having a high temperature which is due to heating.

Additionally, as a result of adopting a constitution that is provided with a small fan or the like, a cold air is effectively introduced thereinto from outside, and it is possible to further reduce the cooling time.

In the embodiment, as a result of ensuring the backward movable range K of one clamp 2A serving as a slide movable side as described above, even in a case where the optical fiber 11 is set (grasped) so as to have a slack, a tension is applied to the optical fiber 11, and it is possible to eliminate the slack.

Accordingly, the sleeve 12 is not displaced downward in, for example, the vertically downward direction, the sleeve 12 is held by the heater 3A near a substantially center thereof and can be efficiently heated.

Moreover, as a result of ensuring the forward movable range Z of one clamp 2A, even where the optical fiber 11 receives a large pressure from the heater 3, one clamp 2A moves in a forward movement direction, and therefore, it is possible to protect the optical fiber 11 while an excessive tension is not applied thereto.

In addition, the invention is not limited to the aforementioned example.

For example, a plurality of heater circuits which are configured by a ceramic heater may be implanted into the two heaters 3A and 3B, or a film heater may also be adopted, and furthermore, a constitution using a metal heat-transfer plate to which such heater circuits are attached may also be adopted.

Furthermore, a constitution in which a plurality of heater circuits are provided on both two heaters 3A and 3B may also be adopted, or a constitution in which it is provided on only one side thereof may also be adopted.

Moreover, one heater 3A is only driven in the constitution of the embodiment; however, a constitution in which both two heaters 3A and 3B are driven may also be adopted.

In addition, a method of driving a heater is not particularly limited, for example, a slide drive unit may be adopted, and a rotational slide system in which a fulcrum point is located at the position that is far from the heater portion may also be adopted as an example shown in FIG. 4 or the like.

Additionally, the second force-applying member 42 that presses one heater 3A may use a repulsion force by a magnet (magnetic member) or may use a torsion coil spring or the like as an example shown in FIG. 4 or the like.

Furthermore, in the case where an electromagnet is used as the second force-applying member 42, the electrical current that is applied to the electromagnetic coil is a drive source, and a constitution which controls an applied force by the electromagnet in accordance with the applied current and presses one heater 3A may also be adopted.

Also, the slide portion of a slide movable clamp is not particularly limited. As shown in FIG. 6 or the like, the left clamp 2A may also be configured to be only slide-movable or both the paired right and left clamps 2A and 2B may also be configured to be slide-movable.

In addition, a slide mechanism of the slide movable clamp is not particularly limited. For example, a slide drive unit using an expensive bearing shown in FIG. 6 or the like may also be adopted or a rotational slide system in which a fulcrum point is located at the position that is far from the clamp may also be adopted as an example shown in FIG. 4 or the like.

Furthermore, the first force-applying member 41 that presses the slide portion of the slide movable clamp by a force for applying a tension to the optical fiber 11 is not particularly limited. A magnet (magnetic member) as shown in FIG. 6 or the like may also be used, or an elastic member such as a compression coil spring may also be used.

Additionally, the openable-and-closable portions of the paired right and left clamps 2A and 2B is not particularly limited, the front side thereof or the rear side thereof may be only opened and closed, and both the front and back sides may also be opened and closed.

Moreover, the fifth force-applying member 45 (refer to FIG. 29) providing a force that grasps the optical fiber 11 at the openable-and-closable sides of the paired right and left clamps 2A and 2B is not particularly limited; and the member may use a repulsion force by a magnet (magnetic member) or may use a torsion coil spring or the like as an example shown in FIG. 4 or the like.

Additionally, each cam mechanism is not also particularly limited to this, as described above, a constitution in which a plurality of cam mechanisms are provided on the same the camshaft 7 and on the same axis may also be adopted, or a constitution in which a plurality of axes are provided using a plurality of camshafts may also be adopted.

Furthermore, the cam mechanism is not only limited to the above, a forward-and-rearward drive mechanism using, for example, a screw mechanism (including a micrometer), a magnetic force drive mechanism that turns on or off an electromagnet, a drive mechanism using a lever and a solenoid, or the like may be used.

(Other Example of Operation of Reinforcing Heating Device)

Next, one modified example according to the embodiment will be described.

Figure 12:
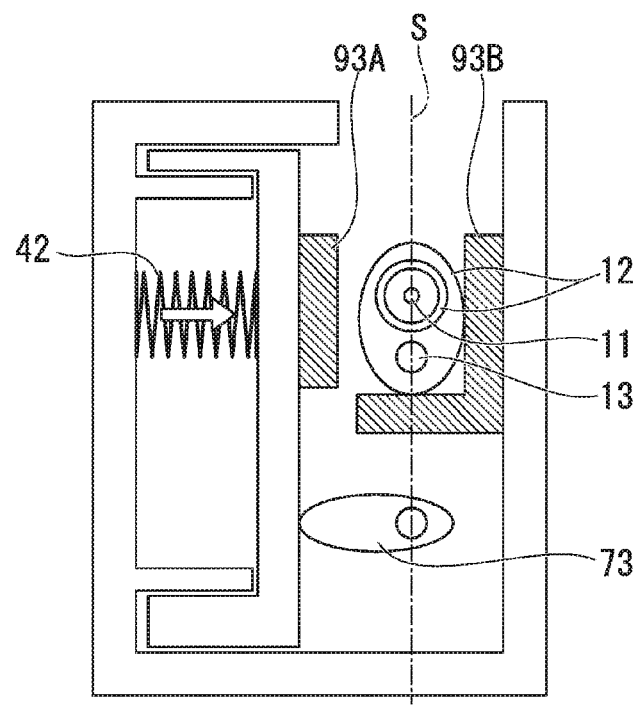
FIG. 12 is a schematic cross-sectional view illustrating the other example of the optical-fiber-spliced portion reinforcing heating device according to the embodiment of the invention.
Figure 13:
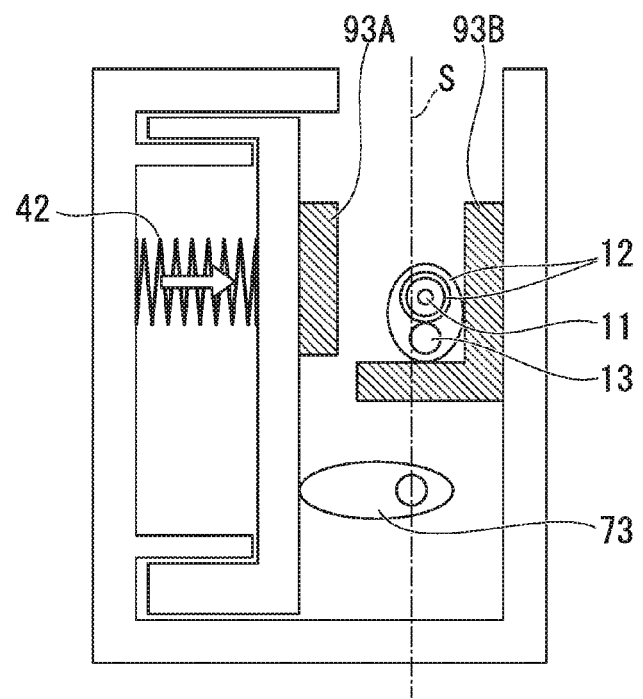
FIG. 13 is a schematic cross-sectional view illustrating the other example of the optical-fiber-spliced portion reinforcing heating device according to the embodiment of the invention.

In the embodiment, in order to prevent the lowering of the sleeve 12 in the vertically downward direction which is due to a slack of the optical fiber 11 as examples shown in FIGS. 12 and 13, a configuration of at least one of the two heaters may be configured to have an L-shape in cross section which shown as an example in the drawing.

In an example shown in the drawing, a fixed-side heater 93B of two heaters 93A and 93B is formed in an L-shape. FIGS. 12 and 13 show the case where a sleeve 12 having a large diameter is provided and the case where a sleeve 12 having a small diameter is provided, respectively.

In the case of the foregoing configurations, there are disadvantages that the heat capacity increases as the heater becomes larger, and a rate of temperature increase thereby becomes low, or in the case where the sleeve 12 having a small diameter is disposed as shown in FIG. 13 as an example, the position of the sleeve 12 becomes low, and heating cannot be carried out at the center of the heater.

However, as a result of adopting the heater structure shown in FIGS. 12 and 13, it is also possible to omit the first cam mechanism 71 in the constitution of the reinforcing heating device as illustrated in FIGS. 4 and 6 to 11, and a simplified structure can be achieved.

In other cases, as a configuration for preventing the sleeve 12 from lowering, not only the aforementioned heater which is formed in an L-shape but also a constitution in which, for example, a metal sheet formed in an L-shape is provided may be adopted.

As stated above, it is not necessary for the L-shaped constitution to be applied to part of the heater, and the constitution may be a member that is independent from the heater.

Steps in the case where the above-mentioned constitution that prevent the optical fiber 11 from lowering is adopted and effects of diminishing and reducing the strong pressing force by the heaters will be described with reference to mainly FIGS. 14 to 17 that show schematic views (also refer to FIG. 4).

A reinforcing heating device shown in FIGS. 14 to 17 is different from the aforementioned reinforcing heating device shown in FIGS. 6 to 11 in that a cam mechanism (the second cam mechanism 72) that restricts one clamp 2A from moving in the backward movement direction is not present and in that, since this cam mechanism is not provided, one clamp 2A comes into contact with a stopper 51 in the backward movement direction in an initial state, and a backward movable range is not provided.

In addition, in the drawing shown as an example, for convenience of explanation, an L-shaped heater is not shown in the figure (refer to FIGS. 12 and 13).

Figure 14:
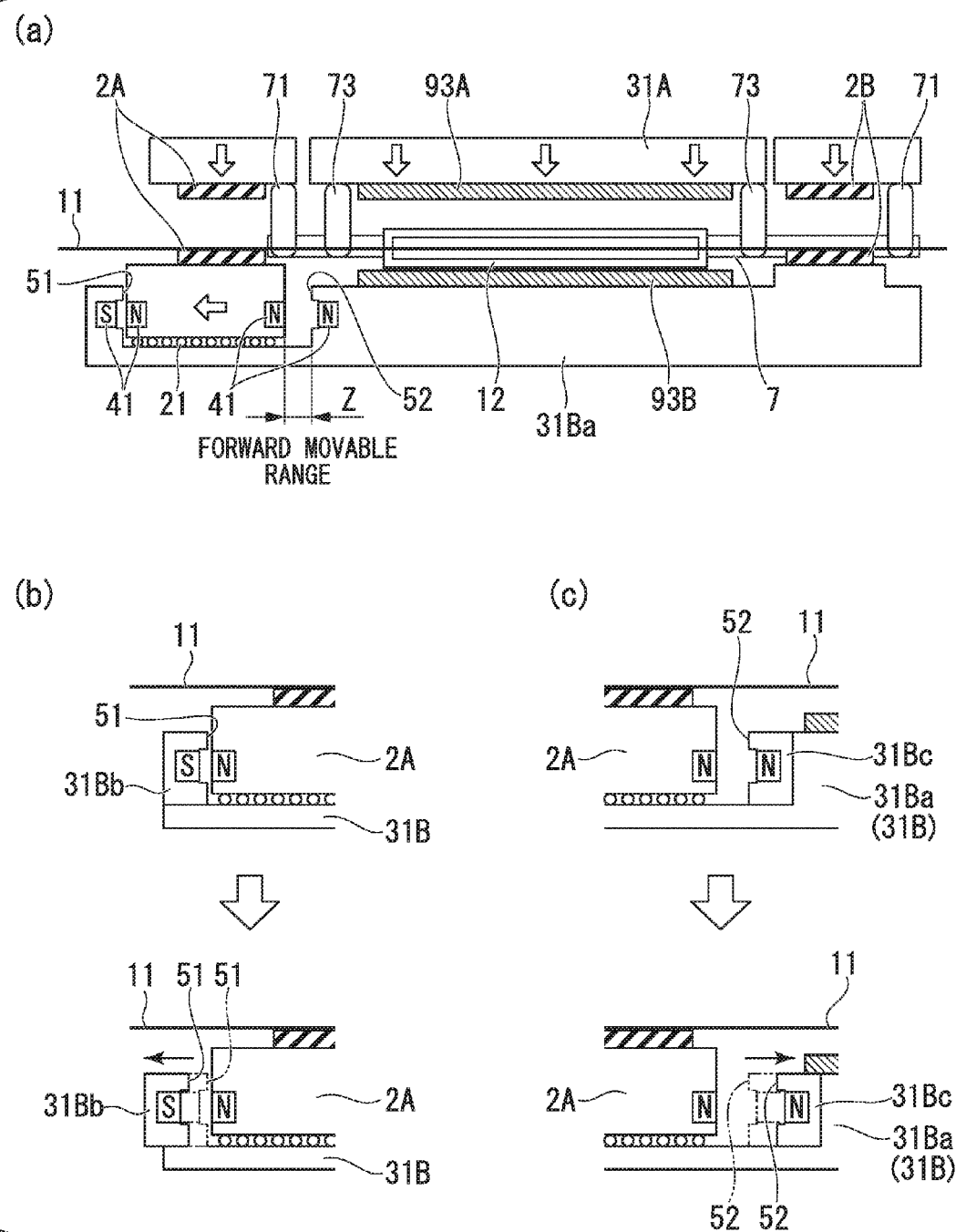
FIG. 14 view (a) is a schematic view illustrating the other example of an operation of the optical-fiber-spliced portion reinforcing heating device according to the embodiment of the invention. View (b) is a schematic view showing a structure including a retractable backward movement stopper. View (c) is a schematic view showing a structure including a retractable forward movement stopper.

First of all, as shown in FIG. 14, the optical fiber 11 having a spliced portion that is covered with the sleeve 12 is inserted between the paired right and left clamps 2A and 2B.

Figure 15:
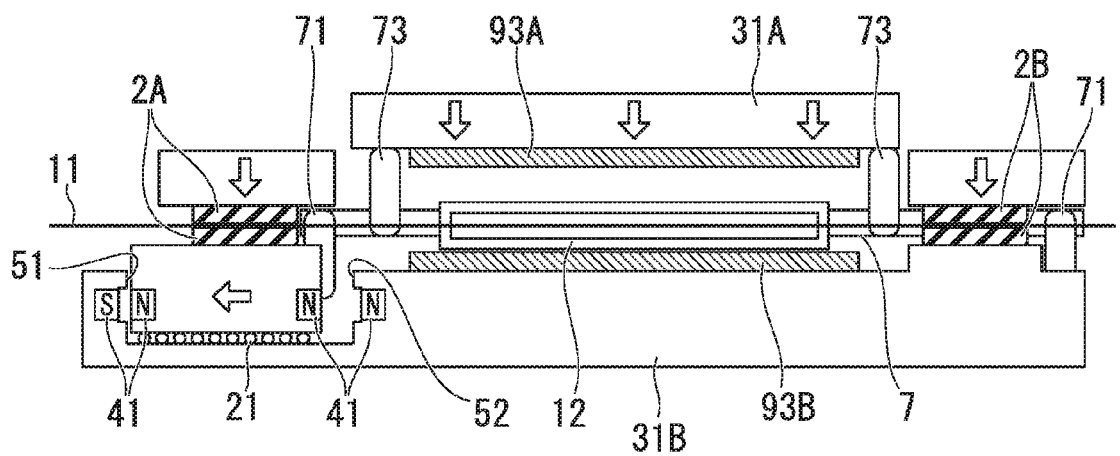
FIG. 15 is a schematic view illustrating the other example of an operation of the optical-fiber-spliced portion reinforcing heating device according to the embodiment of the invention.

Subsequently, as shown in FIG. 15, rotation of the camshaft 7 is started, the openable-and-closable clamp of the paired right and left clamps 2A and 2B is closed, the first cam mechanism 71 and the paired right and left clamps 2A and 2B are in a non-contact state, and the clamps 2A and 2B grasp the optical fiber 11 by a pressing force of several hundreds of gf.

At this time, the sleeve 12 is supported by the fixed-side heater 93B which is configured to have an L-shape and is not particularly shown in the figure, and the sleeve is held on the surface of the heater at a substantially proper position for heating.

In contrast, in this state, a slack of the optical fiber 11 remains.

Figure 16:
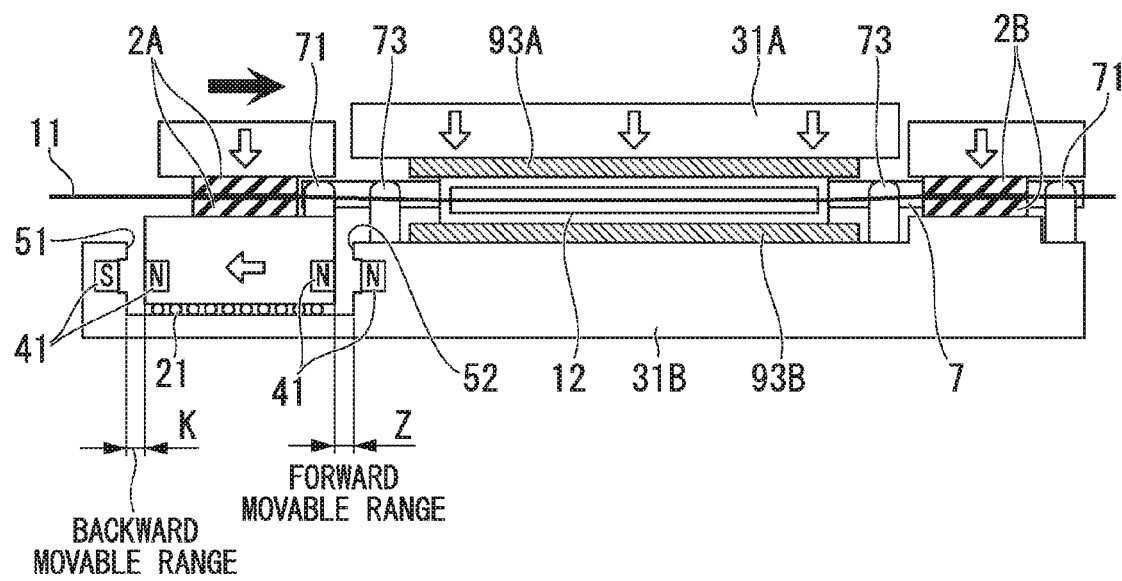
FIG. 16 is a schematic view illustrating the other example of an operation of the optical-fiber-spliced portion reinforcing heating device according to the embodiment of the invention.

Next, as shown in FIG. 16, when the camshaft 7 further rotates, the sleeve 12 is pressed by the openable-and-closable heater 93A before being heated, the sleeve moves to the fixed-side heater 93B, and the optical fiber 11 also moves in accordance with this.

Alternatively, the sleeve 12 is deformed after the start of heating by the heaters 93A and 93B, and the optical fiber 11 also moves in accordance with this.

According to the above-mentioned operation, a slack of the optical fiber 11 is removed, and one clamp 2A slidably moves in the forward movement direction in a form in which the optical fiber 11 is pulled.

Therefore, as shown in the drawing, the backward movable range K in addition to the forward movable range Z is ensured in one clamp 2A.

For this reason, since one clamp 2A is in a state of being capable of moving forth and back in the longitudinal direction of the optical fiber 11, a tension can be controlled to be constant in a state in which a slack is not present in the optical fiber 11.

The later steps after the above are the same as in the case of the above explanation with reference to FIGS. 6 to 11 and an operation of shrinking the sleeve 12 by heating by use of the heaters 93A and 93B is carried out.

Figure 17:
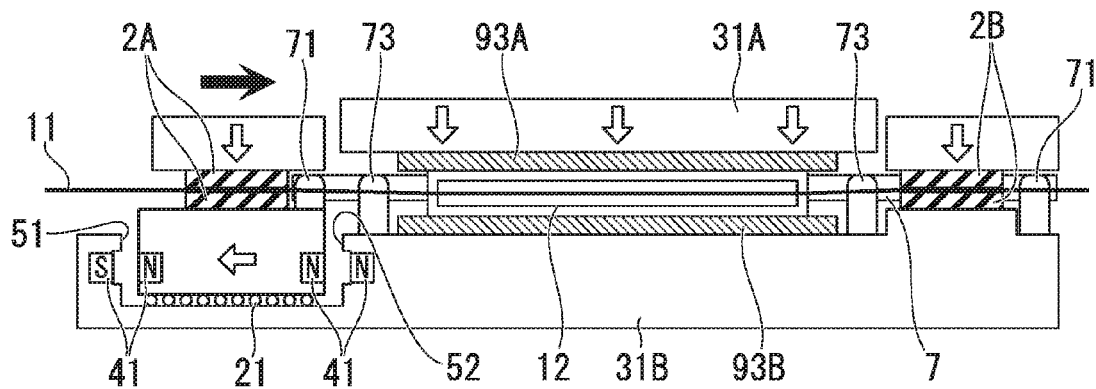
FIG. 17 is a schematic view illustrating the other example of an operation of the optical-fiber-spliced portion reinforcing heating device according to the embodiment of the invention.

Next, the shrinkage of the sleeve 12 is completed as shown in FIG. 17, the optical fiber 11 is pressed by a force of several hundreds of gf in accordance with the shrinkage of the sleeve 12 and moves to the fixed-side heater 93B; however, as one clamp 2A slidably moves in the forward movement direction, a tension that is applied to the optical fiber 11 can be maintained constant such as several tens of gf.

Additionally, in the modified example, steps of driving and releasing of the openable-and-closable clamp of the paired right and left clamps 2A and 2B and the openable-and-closable heater 93A, a cooling step after heating, or the like are the same as the above, and are omitted here.

Other Modified Example

Hereinbelow, the other modified example of the embodiment will be described.

Hereinbelow, explanation will be described below with reference to FIGS. 4 to 17.

In the embodiment, in the aforementioned configuration shown in FIG. 6 or the like, the pressing force with respect to the sleeve 12 which is due to the two heaters 3A and 3B may be a pressing force exceeding a tension under a rupture evaluation test of the spliced portion 11A at which the optical fiber 11 is fusion-spliced.

Here, a strength of the optical fiber fusion splicer portion under the rupture evaluation test is generally approximately 200 gf whereas a pressing force of the second force-applying member is approximately 500 gf.

In the embodiment, since the constitution that can control the above-described tension is provided, it is possible to cause the pressing force with respect to the sleeve 12 to exceed a break tensile of the spliced portion 11A of the optical fiber 11.

By means of this structure, it is possible to press the sleeve 12 by a sufficient force.

Moreover, the rupture evaluation test of the spliced portion, which is described in the invention and at which optical fibers are fusion-spliced, is a method of measuring a break tensile of the optical fiber spliced portion, generally, is represented as a proof test force, and is used as a common indicator that represents connectivity of an optical fiber fusion splicer.

For example, in a fusion splicer having a wide range proof test force, the tension thereof is in the range of 200 to 250 gf (refer to Internet website; http://www.fujikura.co.jp/products/tele/o_f_splicers/td70005.html, http://www.fujikura-.co.jp/products/data/FSM-100-J.pdf, or the like).

In addition, in the above-mentioned constitution of the embodiment, it is more preferable that the pressing faces of the two heaters 3A and 3B which faces each other so as to sandwich the sleeve 12 be arranged in a substantially vertical direction and the tensile strength member 13 be always arranged in a substantially downward direction by utilizing the weight of the tensile strength member 13 that is inserted into the sleeve 12 from the point where the direction of the sleeve 12 can be consistent such that the sleeve is in the position graphically shown in, for example, FIGS. 5 (a) and (b).

Particularly, "substantially vertical" means that it is substantially vertical to a horizontal plane.

The pressing face that is arranged in a substantially vertical direction may be a surface that intersects with, for example, the horizontal plane by an angle of 90°±10°.

The pressing face may be a surface that intersects with, for example, the horizontal plane at an angle of 90°±30°.

In the embodiment, a backward movement stopper that restricts a movement of the clamp in the backward movement direction may be provided and the backward movement stopper may be configured to be retractable.

As shown in FIGS. 14 to 17, a backward movement stopper 51 may be used as the backward movement stopper.

A heater attachment base 31B shown in FIG. 14 views (a) and (b) has a back wall 31Bb that faces a back surface of the clamp 2A (fixed-side).

The back wall 31Bb is movable in a front-back direction with respect to the other portion of the heater attachment base 31B.

The backward movement stopper 51 is provided on a front surface of the back wall 31Bb.

As shown in FIG. 14 view (a), firstly, before the optical fiber 11 is grasped, one clamp 2A moves separately from the heater 3 by the first force-applying member 41 and comes into contact with the backward movement stopper 51, a movable range is ensured only in the forward movement direction.

In a state in which the paired right and left clamps 2A and 2B grasp the optical fiber 11 and a tension is not applied to the optical fiber 11, immediately after the optical fiber 11 is grasped, or at the time of starting of pressing drive with respect to the sleeve 12 by the heater 3, or before or after the time of the starting of the pressing drive, the backward movement stopper 51 is retracted.

In order to retract the backward movement stopper 51, the back wall 31Bb is only necessary to move in the backward movement direction (in a direction away from the clamp 2A).

Because of this, in a state in which a tension is applied to the optical fiber 11, after the backward movable range in addition to the forward movable range of one clamp 2A is ensured, it is possible to press the sleeve 12 by the heater 3.

In other cases, a constitution that allows the backward movement stopper to retract is not limited to the example shown in the drawing.

For example, a constitution that allows the backward movement stopper 51 to be removed from the other portion of the heater attachment base 31B may also be adopted.

In this case, the above retraction is possible by removing the backward movement stopper 51.

In the embodiment, a forward movement stopper that restricts a movement of the clamp 2A in the forward movement direction may be provided and the forward movement stopper may be configured to be retractable.

In FIG. 14 view (a), reference numeral 52 represents the forward movement stopper.

The heater attachment base 31B shown in FIG. 14 views (a) and (c) has a front wall 31Bc on an attachment base 31Ba that faces a front surface of the clamp 2A (fixed side).

The front wall 31Bc is movable in a front-back direction with respect to the other portion of the heater attachment base 31B.

The forward movement stopper 52 is provided on a back surface of the front wall 31Bc.

Firstly, before the optical fiber 11 is grasped, from a state in which one clamp 2A is separated from the heaters 3 by the first force-applying member 41 and is in contact with a backward movement stopper to a state in which the clamp moves forward until coming into contact with a forward movement stopper and is maintained, in a state in which the paired right and left clamps 2A and 2B grasp the optical fiber 11 and a tension is not applied to the optical fiber 11, immediately after the optical fiber 11 is grasped, or at the time of starting of pressing drive with respect to the sleeve 12 by the heaters 3, or before or after the time of the starting of the pressing drive, one clamp 2A is released from the contacting state with respect to the forward movement stopper and the forward movement stopper is retracted.

In the drawing shown as an example, in order to retract the forward movement stopper 52, the front wall 31Bc is only necessary to move in the forward movement direction (in a direction away from the clamp 2A).

Because of this, it is possible to provide a structure in which, in a state in which a tension is applied to the optical fiber 11, after the forward movable range in addition to the backward movable range of one clamp 2A is ensured, the sleeve 12 is pressed by the hater 3.

Additionally, the second cam mechanism 72 that is the same as the above may be used as the forward movement stopper, and a structure using the backward movement stopper 51 that is shown in FIGS. 14 to 17 and is formed in the housing 5 may be adopted as the backward movement stopper.

Reference numeral 52 represents the forward movement stopper.

In the case of using a cam mechanism as the forward movement stopper, it is possible to retract the forward movement stopper by rotating the cam mechanism.

Furthermore, a configuration that is removed from the other portion of the heater attachment base 31B may be adopted as the forward movement stopper 52.

In this case, the retraction is possible by removing the forward movement stopper 52.

Alternatively, a configuration described below may be adopted in the embodiment.

Firstly, before the optical fiber 11 is grasped, in a state in which an applied force in a backward movement direction away from the heater 3 is applied to one clamp 2A by the first force-applying member 41 and in a state in which one clamp 2A is stopped at the position away from an end of a movable range thereof by a third force-applying member (not shown in the figure) formed of an elastic member or a magnetic member which is used to allow one clamp 2A to move in a forward movement direction or a third force-applying member that allows one clamp 2A to move in a forward movement direction, in a state in which the paired right and left clamps 2A and 2B grasp the optical fiber 11 and a tension is not applied to the optical fiber 11, immediately after the optical fiber 11 is grasped, or at the time of starting of pressing drive with respect to the sleeve 12 by the heaters 3, or before or after the time of the starting of the pressing drive, an applied force of one of the clamps in the forward movement direction decreases by the third force-applying member, an applied force in the backward movement direction increases by the first force-applying member, or the third force-applying member is retracted.

Consequently, in a state in which the paired right and left clamps 2A and 2B apply a tension to the optical fiber 11, after the forward movable range Z in addition to the backward movable range K of one clamp 2A is ensured, a constitution may be adopted which presses the sleeve 12 by the heaters 3.

Here, as a method of controlling the applied force of the first force-applying member 41 or the third force-applying member that is not shown in the figure to be stronger or weaker, in the case of using a magnetic member in each force-applying member, for example, a method of controlling a current value that is to be applied to an electromagnet or a method of moving the position of a permanent magnet.

In addition, in the case of using an elastic member in each force-applying member, for example, a method of moving one end of the spring serving as an elastic member is adopted.

For example, in a state in which one end of a spring is used as a fixed end, where the other end thereof is in contact with a clamp, and where the clamp is pressed by an elastic force of the compressed spring, as a result of compressing the spring so that one end of the spring moves in a direction of approaching the other end thereof, it is possible to increase the applied force.

Moreover, as a result of releasing the compression so that one end of the spring moves in a direction away from the other end thereof, it is possible to weaken the applied force.

Alternatively, a configuration described below may be adopted in the embodiment.

Firstly, both the paired clamps 2A and 2B which are not particularly shown in the figure are movable back and forth in the longitudinal direction of the optical fiber 11, in a state in which one clamp 2A moves separately from the heater 3 by the first force-applying member 41 and comes into contact with the backward movement stopper (refer to reference numeral 51 show in FIG. 14 or the like) before the optical fiber 11 is grasped, in a state in which a movable range is ensured only in the forward movement direction, and in a state in which the other clamp 2B moves forward to the heater side 3 before the optical fiber 11 is grasped, the paired right and left clamps 2A and 2B grasp the optical fiber 11, and the optical fiber 11 is in a state in which a tension is not applied thereto.

Thereafter, the other clamp 2B is started to move in the backward movement direction away from the heater side 3, one clamp 2A moves in a forward movement direction by the tension via the optical fiber 11, the movement of the other clamp 2B is stopped at the position away from the end of the movable range of one clamp 2A, therefore, in a state in which a tension is applied to the optical fiber 11, after the forward movable range Z in addition to the backward movable range K of one clamp 2A is ensured, a constitution may be adopted in which the heater 3 presses the sleeve 12.

Alternatively, a configuration described below may be adopted in the embodiment.

Firstly, before the optical fiber 11 is grasped, in a state in which one clamp 2A is separated from the heaters 3 by the first force-applying member 41 and is in contact with a backward movement stopper (refer to reference numeral 51 shown in FIG. 14 or the like) and a movable range is ensured only in the forward movement direction and in a state in which the paired right and left clamps 2A and 2B grasp the optical fiber 11 and a tension is not applied to the optical fiber 11, the heaters 3 press the sleeve 12 by a pressing force by the second force-applying member 42 which is greater than a tension that is to be applied to the optical fiber 11 by the first force-applying member 41.

In addition, a configuration may also be adopted in which, as a result of moving the optical fiber 11 in a pressing direction which is due to movement of the sleeve 12 or deformation of the sleeve 12 after starting of the press, one clamp 2A is drawn to a forward movement direction by a tension due to movement of the optical fiber 11, one clamp 2A is configured so as to be stopped at a position away from an end of a movable range, therefore, in a state in which a tension is applied to the optical fiber 11 by the first force-applying member 41, a forward movable range Z is ensured in addition to a backward movable range K of one clamp 2A, and thereafter, the heaters 3 heat the sleeve 12.

A configuration described below may be adopted in the embodiment.

Particularly, identical reference numerals are used for the elements which are described above, and the detailed explanations thereof are omitted here.

Figure 34:
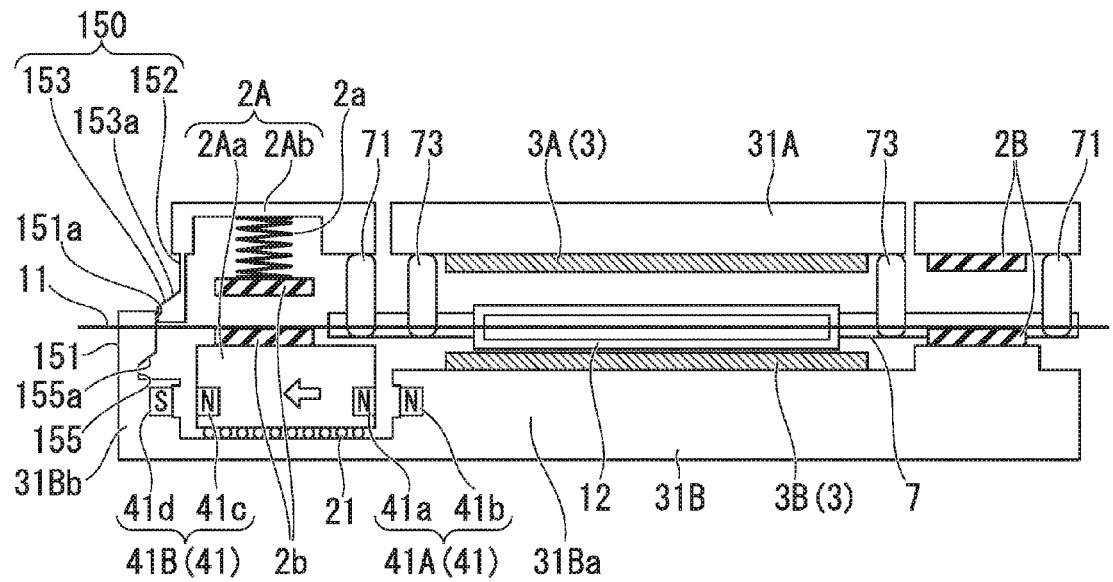
FIG. 34 is a schematic view illustrating the other example of the optical-fiber-spliced portion reinforcing heating device according to the embodiment of the invention.

A reinforcing heating device shown in FIG. 34 is different from the reinforcing heating device shown in FIGS. 6 to 11 in that a cam mechanism (the second cam mechanism 72) that restricts one clamp 2A from moving in the backward movement direction is not present, in that a protrusion 150 is formed at the openable-and-closable side 2Ab of the clamp 2A, and in that a control wall 151 is provided on the heater attachment base 31B.

The protrusion 150 of the openable-and-closable side 2Ab includes: an extended portion 152 that extends from the rear edge of the openable-and-closable side 2Ab toward the heater attachment base 31B; and an insertion protrusion 153 that protrudes rearward from the back surface of the front end of the extended portion 152.

The upper face 153a of the external surface of the insertion protrusion 153 is an inclined surface that lowers as approaching the rear (the left side in the drawing).

The control wall 151 is placed upright at the rear edge of the heater attachment base 31B, and a receiving recess 155 that can receive the insertion protrusion 153 is formed on the front surface 151a thereof.

The upper face 155a of the inner surface of the receiving recess 155 is an inclined surface that lowers as approaching the rear (the left side in the drawing).

In an initial state of the control wall 151 (refer to FIG. 34), the front surface 151a is in contact with the insertion protrusion 153 and thereby restricts a backward movement of the clamp 2A.

The reinforcing heating device shown as this example is provided with a force-applying mechanism 41 (first force-applying member) that applies a tension to the optical fiber 11.

The force-applying mechanism 41 includes a forward force-applying mechanism 41A and a rearward force-applying mechanism 41B.

The forward force-applying mechanism 41A includes force-applying members 41a and 41b which are provided at a front-edge face of a fixed-side 2Aa of the clamp 2A and the attachment base 31Ba of the heater attachment base 31B, respectively.

The force-applying members 41a and 41b are magnetic members such as a permanent magnet or an electromagnet and have the same magnetic pole as each other.

In the drawing shown as an example, both the force-applying members 41a and 41b have a north polarity.

The rearward force-applying mechanism 41B includes force-applying members 41c and 41d which are provided at the rear-edge face of the fixed-side 2Aa of the clamp 2A and the back wall 31Bb of the heater attachment base 31B, respectively.

The force-applying members 41c and 41d are magnetic members having magnetic poles different from each other.

In the drawing shown as an example, the force-applying member 41c has a north polarity and the force-applying member 41d has a south polarity.

Due to the repulsive force between the force-applying members 41a and 41b and the attractive force between the force-applying members 41c and 41d, a force is applied backward to the clamp 2A, and a tension is applied to the optical fiber 11.

The protrusion 150 and the control wall 151 that includes the receiving recess 155 and the front surface 151a constitute a mechanism (a tension mechanism or a tensile control device) that controls the pulling of the optical fiber 11 (and the stopping thereof) by the force-applying mechanism 41 based on an operation of grasping the optical fiber 11 by the clamp 2A.

In the reinforcing heating device shown as this example, the motor 6 controls the clamp 2A by the first cam mechanism 71 and by a force of the fifth force-applying member 45 and the tension mechanism is controlled by the operation of the clamp 2A.

Figure 35:
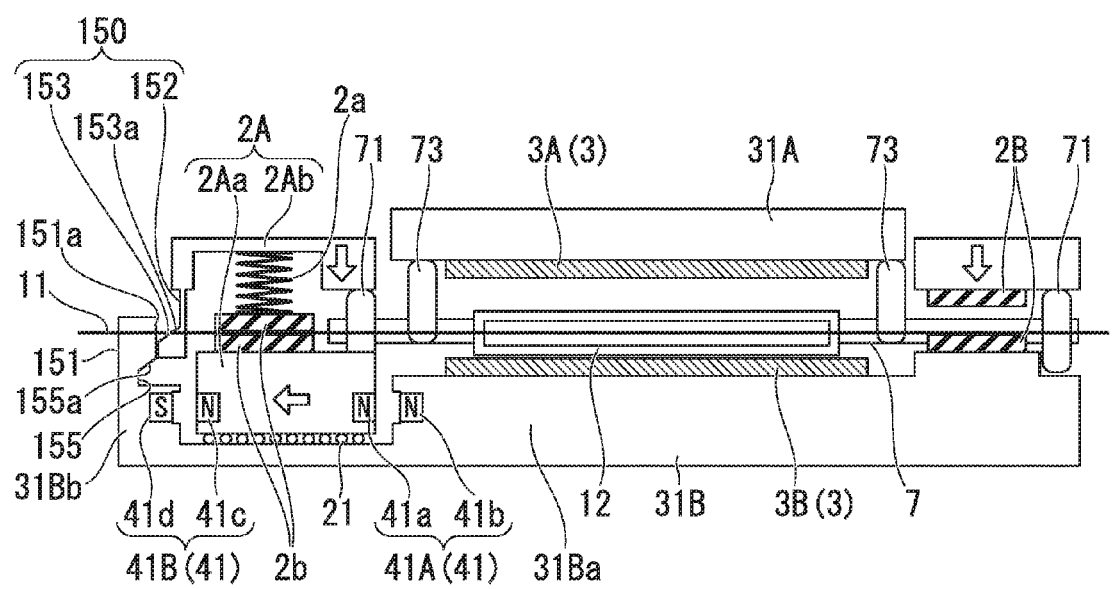
FIG. 35 is a schematic view illustrating an operation of the optical-fiber-spliced portion reinforcing heating device shown in the previous figure.

As shown in FIG. 35, when the camshaft 7 rotates, the openable-and-closable side 2Ab of the clamp 2A moves in a direction of approaching the fixed-side 2Aa thereof, and clamping bodies 2b and 2b grasp the optical fiber 11.

Figure 36:
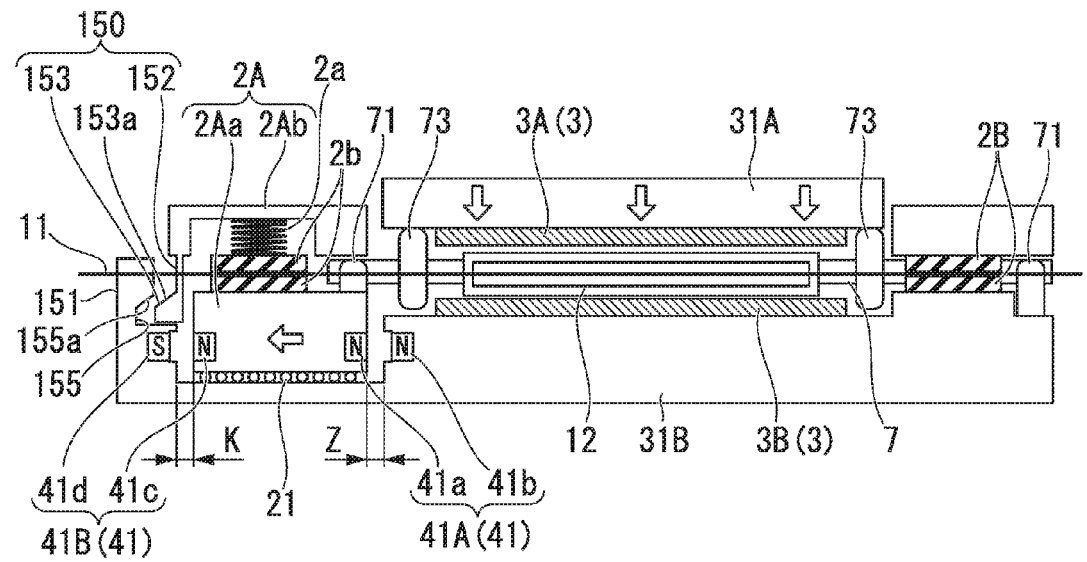
FIG. 36 is a schematic view continuous with the previous figure, illustrating an operation of the optical-fiber-spliced portion reinforcing heating device.

As shown in FIG. 36, in accordance with the movement of the openable-and-closable side 2Ab, the protrusion 150 lowers, the insertion protrusion 153 reaches at the position at which is can enter the receiving recess 155, therefore, the clamp 2A is in a state of capable of moving back and forth while the forward movable range Z in addition to the backward movable range K is ensured, and a tension is applied to the optical fiber 11 by the force-applying mechanism 41.

Figure 37:
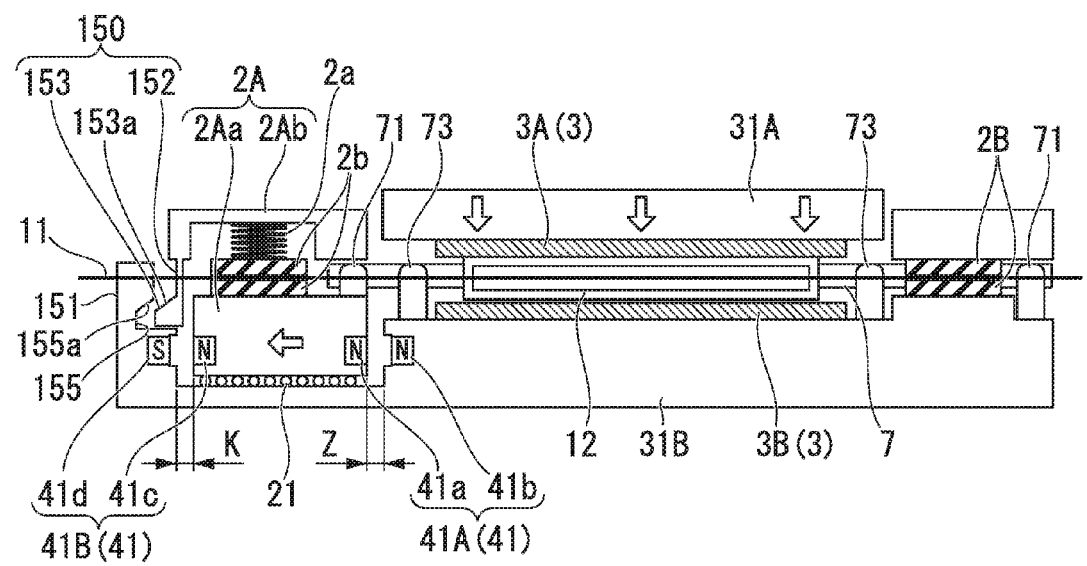
FIG. 37 is a schematic view continuous with the previous figure, illustrating an operation of the optical-fiber-spliced portion reinforcing heating device.

As shown in FIG. 37, in accordance with the displacement of the third cam mechanism 73, the heater attachment base 31A approaches the heater attachment base 31B, the sleeve 12 is sandwiched between the heaters 3A and 3B, and the sleeve 12 is thereby heat-shrunk.

Figure 38:
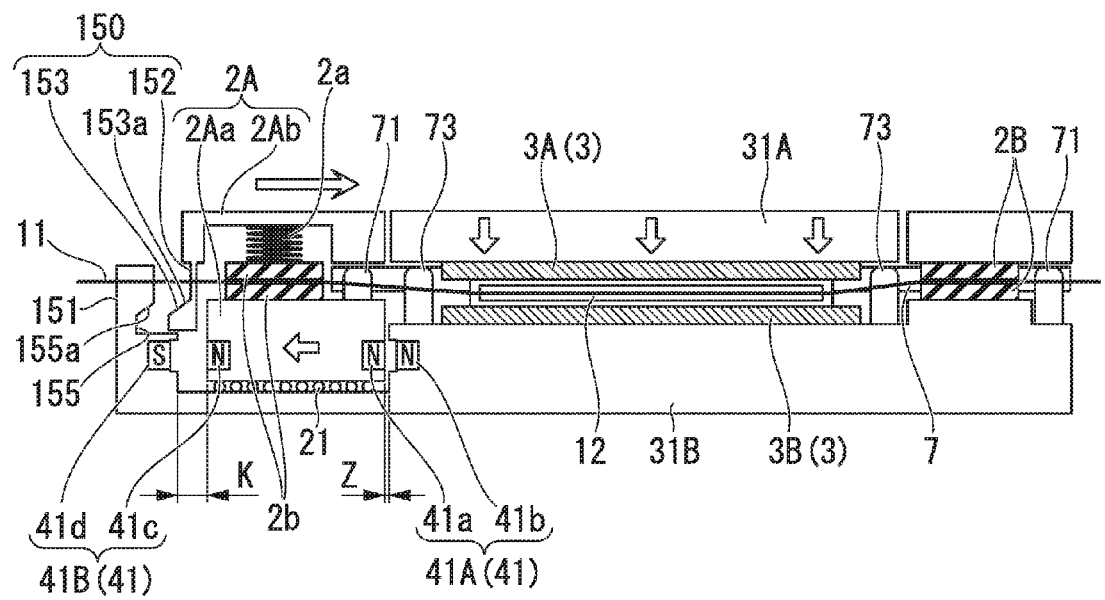
FIG. 38 is a schematic view continuous with the previous figure, illustrating an operation of the optical-fiber-spliced portion reinforcing heating device.

As shown in FIG. 38, the sleeve 12 and the optical fiber 11 move toward the heater 3B in accordance with the shrinkage of the sleeve 12; however, since the clamp 2A slidably moves in the forward movement direction (the right side in the drawing), a tension that is to be applied to the optical fiber 11 is not in large excess.

Figure 39:
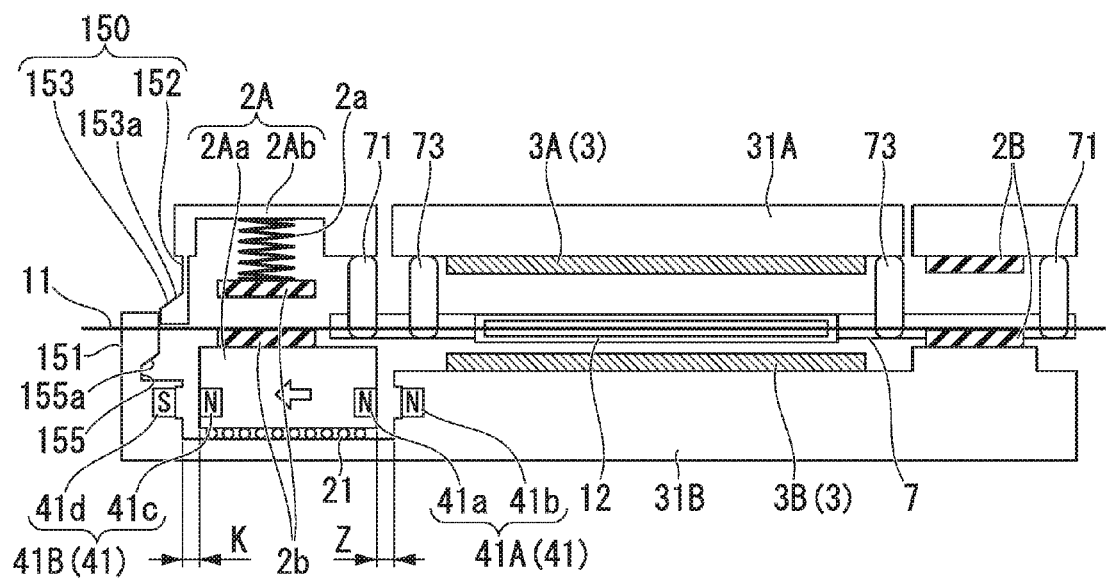
FIG. 39 is a schematic view continuous with the previous figure, illustrating an operation of the optical-fiber-spliced portion reinforcing heating device.

As shown in FIG. 39, when the heater attachment base 31A moves in a direction away from the heater attachment base 31B by the third cam mechanism 73, the sleeve 12 is released, the openable-and-closable side 2Ab of the clamp 2A moves in a direction away from the fixed-side 2Aa by the first cam mechanism 71, and gripping of the optical fiber 11 is released.

The protrusion 150 moves upward in accordance with the movement of the openable-and-closable side 2Ab, and the insertion protrusion 153 returns to the position at which the backward movement thereof is restricted by the control wall 151.

At this time, in the insertion protrusion 153, since the upper face 153a moves upward along the inclination of the upper face 155a of the receiving recess 155, it is smoothly displaced from the receiving recess 155.

In addition, not shown in FIGS. 6 to 11 or the like but as shown in FIG. 34 or the like, the openable-and-closable side 2Ab is provided with a force-applying member 2a that presses the clamping body 2b clamping the optical fiber 11 in a direction to the clamping body 2b of the fixed-side 2Aa.

A configuration described below may be adopted in the embodiment.

Figure 40:
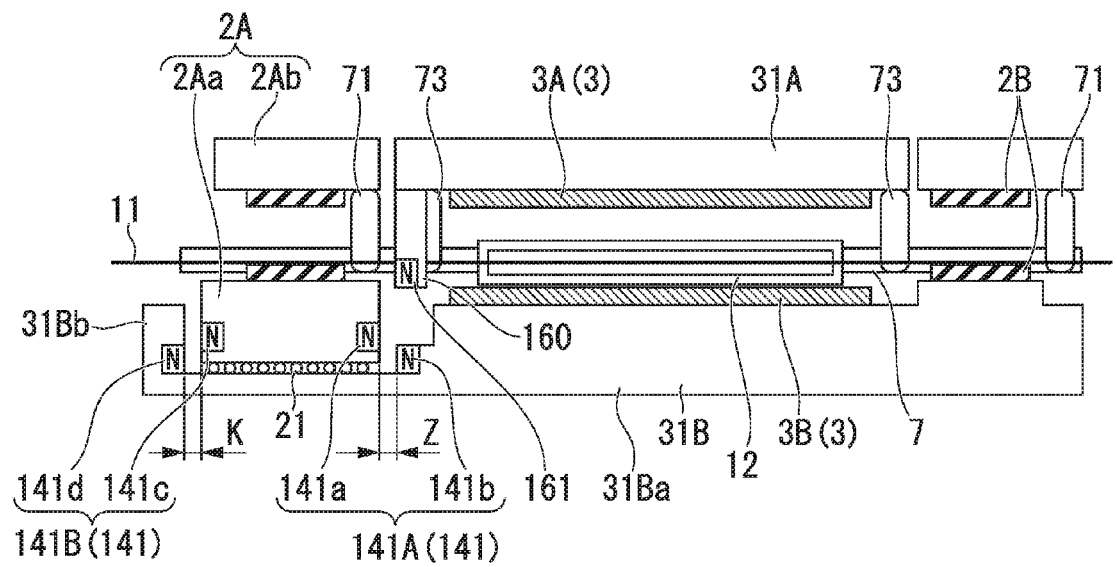
FIG. 40 is a schematic view illustrating the other example of the optical-fiber-spliced portion reinforcing heating device according to the embodiment of the invention.

A reinforcing heating device shown in FIG. 40 is different from the reinforcing heating device shown in FIGS. 6 to 11 in that the second cam mechanism 72 is not present, in that a force-applying mechanism 141 (first force-applying member) is provided, and in that a protrusion 160 that protrudes in a direction of approaching the heater attachment base 31B is formed on the heater attachment base 31A.

The force-applying mechanism 141 is used to apply to a tension to the optical fiber 11 and includes a forward force-applying mechanism 141A and a rearward force-applying mechanism 141B.

The forward force-applying mechanism 141A includes force-applying members 141a and 141b which are provided at the front-edge face of the fixed-side 2Aa of the clamp 2A and the attachment base 31Ba of the heater attachment base 31B, respectively.

The force-applying members 141a and 141b are magnetic members such as a permanent magnet or an electromagnet and have the same magnetic pole as each other.

In the drawing shown as an example, the force-applying members 141a and 141b have a north polarity.

The rearward force-applying mechanism 141B includes force-applying members 141c and 141d which are provided at the rear-edge face of the fixed-side 2Aa of the clamp 2A and the back wall 31Bb of the heater attachment base 31B, respectively.

The force-applying members 141c and 141d are magnetic members having the same magnetic pole as each other.

In the drawing shown as an example, the force-applying members 141c and 141d have a north polarity.

In an initial state shown in FIG. 40, the forward movable range Z and the backward movable range K are ensured and the clamp 2A is in a state of capable of moving back and forth; however, the clamp 2A stays at this position due to the repulsive force between the force-applying members 141a and 141b and the repulsive force between the force-applying members 141c and 141d.

A force-applying member 161 is provided at the front end of the protrusion 160.

The force-applying member 161 is an magnetic member having the same magnetic pole as that of the force-applying member 141a.

In the drawing shown as an example, similar to the force-applying member 141a, the force-applying member 161 has a north polarity.

The protrusion 160 constitutes a mechanism (a tension mechanism or a tensile control device) that controls increase and decrease in a degree of the tension of the optical fiber 11 by the force-applying mechanism 41 based on an operation of pressing the optical fiber 11 by the heater 3A.

In the reinforcing heating device shown as this example, the motor 6 controls the heater 3A by the third cam mechanism 73 and by a force of the second force-applying member 42, the tension mechanism is controlled by the operation of the heater 3A.

Figure 41:
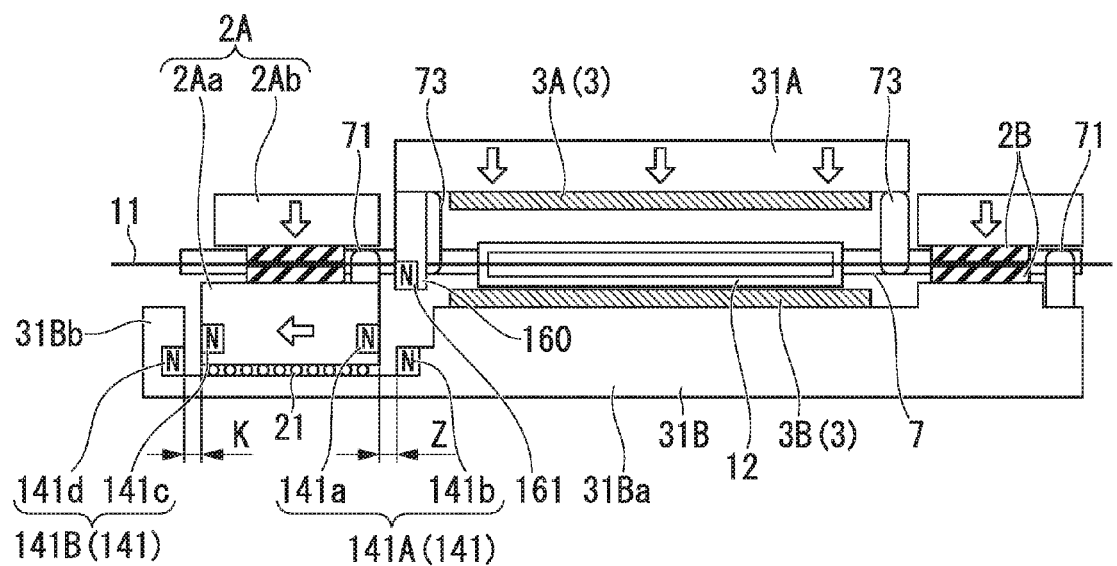
FIG. 41 is a schematic view illustrating an operation of the optical-fiber-spliced portion reinforcing heating device shown in FIG. 34.

As shown in FIG. 41, when the openable-and-closable side 2Ab of the clamp 2A moves in a direction of approaching the fixed-side 2Aa in accordance with rotation of the camshaft 7, the openable-and-closable side 2Ab and the fixed-side 2Aa grasp the optical fiber 11.

In the state shown in this drawing, since the heater attachment base 31A is separated from the heater attachment base 31B, the force-applying member 161 of the protrusion 160 is located at the position away from the force-applying member 141a of the clamp 2A.

In this state, a tension that is to be applied to the optical fiber 11 is small.

Figure 42:
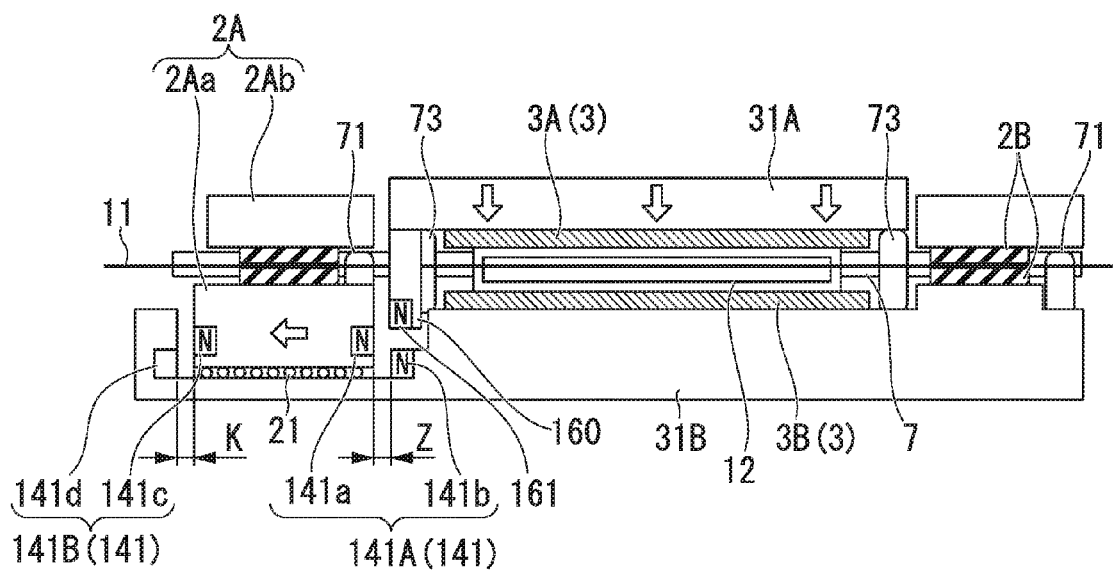
FIG. 42 is a schematic view continuous with the previous figure, illustrating an operation of the optical-fiber-spliced portion reinforcing heating device.

As shown in FIG. 42, the heater attachment base 31A approaches the heater attachment base 31B in accordance with displacement of the third cam mechanism 73 which is due to rotation of the camshaft 7, the force-applying member 161 of the protrusion 160 comes close to the force-applying member 141a of the clamp 2A.

Since the force-applying member 161 has the same magnetic pole as that of the force-applying member 141a, a repulsive force that is directed backward (the left side in the drawing) is applied to the force-applying member 141a.

Consequently, a tension that is applied to the optical fiber 11 increases.

Figure 43:
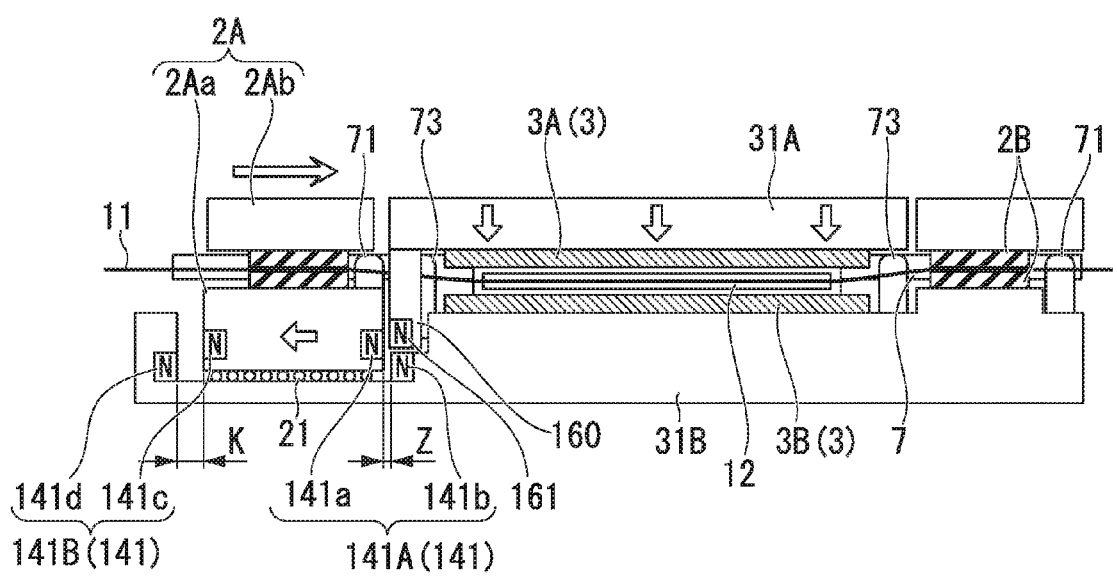
FIG. 43 is a schematic view continuous with the previous figure, illustrating an operation of the optical-fiber-spliced portion reinforcing heating device.

As shown in FIG. 43, the sleeve 12 is sandwiched between the heaters 3A and 3B, and the sleeve 12 is heat-shrunk.

The sleeve 12 and the optical fiber 11 move toward the heater 3B in accordance with the shrinkage of the sleeve 12; however, since the clamp 2A slidably moves in the forward movement direction (the right side in the drawing), a tension that is to be applied to the optical fiber 11 is not in large excess.

Figure 44:
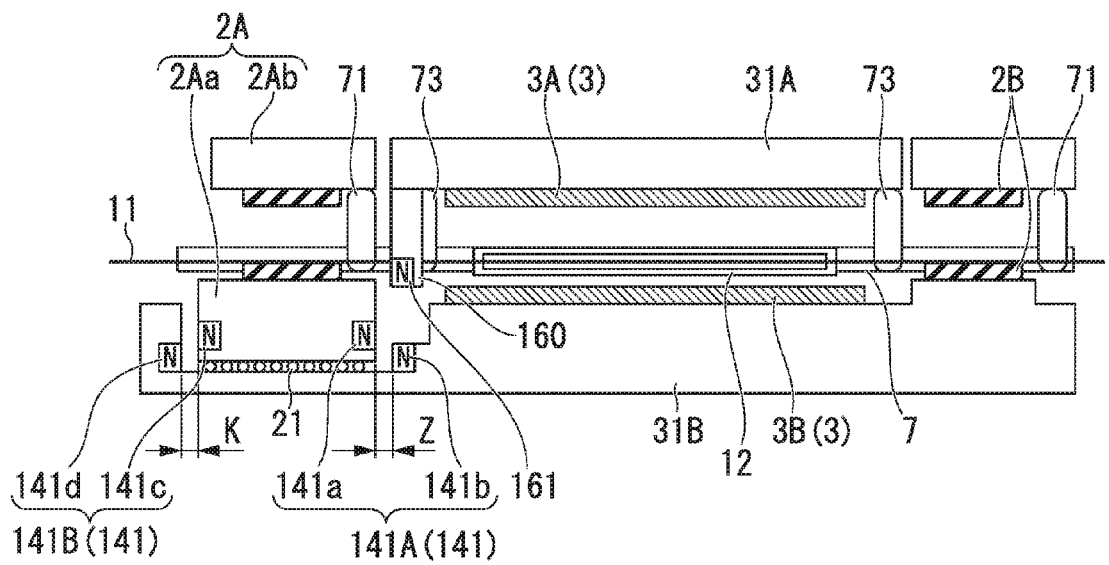
FIG. 44 is a schematic view continuous with the previous figure, illustrating an operation of the optical-fiber-spliced portion reinforcing heating device.

As shown in FIG. 44, the heater attachment base 31A moves in a direction away from the heater attachment base 31B by the third cam mechanism 73, the sleeve 12 is released, the openable-and-closable side 2Ab of the clamp 2A moves in a direction away from the fixed-side 2Aa by the first cam mechanism 71, and gripping of the optical fiber 11 is released.

(Action and Effect)

According to the optical-fiber-spliced portion reinforcing heating device 1 of the first embodiment of the invention described above, when the sleeve 12 is sandwiched between two heaters 3A and 3B and is heat shrunk, breaking of the optical fiber 11 or degradation in long-term reliability thereof is prevented by releasing an excessive tension that is to be applied to the optical fiber 11, and a device is prevented from being larger in size.

Consequently, it is possible to heat-shrink the sleeve 12 in a shorter amount of time with a high level of reliability, and an optical-fiber-spliced portion reinforcing heating device 1 having a high level of handleability can be realized.

Second Embodiment

Hereinbelow, a second embodiment of the invention will be described with reference to an example shown in each drawing.

Particularly, the embodiment will be partially described with reference to the same drawings shown in the aforementioned first embodiment, identical reference numerals are used for the common elements which are described above, for example, the paired right and left clamps 2A and 2B, two heaters 3A and 3B, or the like, and the detailed explanations thereof are omitted here.

In the embodiment, as shown in FIG. 4 (also refer to FIG. 6), the pair of right and left clamps 2 (2A, 2B) which grasp the optical fiber 11 and are the same as in the case of the first embodiment, two heaters 3 (3A, 3B) which press and heat the sleeve 12 that covers the coating-removed portion of the optical fiber 11, and the second force-applying member 42 that applies a pressing force to at least one or more of the two heaters 3A and 3B by use of one of an elastic member and a magnetic member with the sleeve 12 interposed therebetween in accordance with control of the motor 6 where the heaters are arranged opposite to each other with the sleeve 12 interposed therebetween are provided.

Specifically, in addition to the above-description, the reinforcing heating device 1 according to the embodiment is characterized to include: a first operation member 81 (a mechanism that operates to sandwich an optical fiber) that operates the first cam mechanism 71 rotationally driven by the motor 6 so as to operate the fifth force-applying member 45 (refer to FIG. 29) that is to be displaced in accordance with a motion of the first cam mechanism 71 and is formed of an elastic member or a magnetic member and so that the fifth force-applying member presses the optical fiber 11 in the direction in which the paired right and left clamps 2A and 2B sandwich and grasp the optical fiber by the displacement; and a third operation member 83 (a mechanism that operates to sandwich a sleeve) that operates the third cam mechanism 73 that is provided on the camshaft 7 on the same axis as that of the first cam mechanism 71 and is rotationally driven by control of the same motor 6 so as to operate the second force-applying member 42 that is to be displaced in accordance with a motion of the third cam mechanism 73 and so that the second force-applying member presses the sleeve 12 in the direction in which two heaters 3A and 3B sandwich and press by the displacement.

Furthermore, in the second embodiment, an example is adopted which is similar to the above-mentioned first embodiment and which includes: the first force-applying member 41 that presses at least one of the clamps 2 in the direction in which a tension is applied to the optical fiber 11; and a second operation member 82 that operates the second cam mechanism 72 that is provided on the camshaft 7 on the same axis as that of the first cam mechanism 71 and is rotationally driven by the motor 6 so as to operate a first force-applying member 71 that is to be displaced in accordance with a motion of the second cam mechanism 72 and so that the first force-applying member applies a tension to the optical fiber 11 by the displacement.

Additionally, similar to the first embodiment, the second embodiment will be described with reference to a constitution as an example in which the pressing force with respect to the sleeve 12 by the second force-applying member 42 is greater than the tension to the optical fiber 11 by the first force-applying member 41; in a state in which a tension is applied to the optical fiber 11 by the first force-applying member 41, the backward movable range K in a direction away from the heaters 3 in the longitudinal direction of the optical fiber 11 is ensured and the forward movable range Z in which one clamp 2A that applies a tension can move to the heater side 3 is ensured; and the clamp 2A moves in the direction in which the tension that is to be applied to the optical fiber 11 as a result of pressing the sleeve 12 by the heaters 3 and by the second force-applying member 42 is diminished.

Moreover, in the embodiment, each operation member (each operation mechanism) which will be described later in addition to the above-described first operation member 81 or the third operation member 83 will be explained with reference to an example configuration having a lever-shaped member.

Furthermore, in the explanation described below, a reinforcing heating device according to the second embodiment will be mainly explained in that it is different from the case of the aforementioned first embodiment.

(Camshaft and Each Cam Mechanism)

The reinforcing heating device 1 according to the embodiment is different from the above-mentioned first embodiment in that cam mechanisms, each of which will be particularly described later, are provided on the camshaft 7 rotationally driven by the motor 6 and in that each of operations of opening and closing the openable-and-closable side of the paired right and left clamps 2A and 2B, operations of opening and closing one heater 3A, a slide movement of one clamp 2A in the longitudinal direction of the optical fiber 11 (a direction in which a tension is adjusted), and operations of opening and closing the lid 10 is driven and carried out by a corresponding force-applying member by use of the operation member that is displaced in accordance with a motion of the above cam mechanism.

Hereinbelow, cam mechanisms which are adopted in the reinforcing heating device according to the embodiment will be described with reference to a breakaway view shown in FIG. 4, a front view shown in FIG. 23, and FIG. 24 views (a) and (b) to FIG. 28 views (a) and (b).

As shown in FIG. 4, four types and seven cam mechanisms are mounted on one camshaft 7 and are arranged in order from the left side in the drawing as follows.

Particularly, in the configuration shown in the drawing as an example, an auxiliary movement lever which will be described later is not provided, and a drive torque inversion mechanism is not provided is shown.

(1) fourth cam mechanism 74 (opening and closing the lid 10)
(2) first cam mechanism 71 (opening and closing the one clamp 2A)
(3) second cam mechanism 72 (backward movement stopper used to apply a tension of one clamp 2A)
(4) third cam mechanism 73 (opening and closing one heater 3A)
(5) third cam mechanism 73 (opening and closing one heater 3A)
(6) first cam mechanism 71 (opening and closing the other clamp 2B)
(7) fourth cam mechanism 74 (opening and closing the lid 10)

Here, each cam mechanism that is provided on the camshaft 7 of the reinforcing heating device 1 which is described in the embodiment is not limited to a rotation cam-shaped configuration formed shown as an example in the drawing and may include, for example, a so-called spiral-shaped configuration having a contact face that varies in the longitudinal direction of the camshaft.

Furthermore, the cam mechanism which is described in the invention is not limited to a mechanism shown as an example in the drawing and may include, for example, a structure in which a rotation lever-shaped member is provided on the camshaft.

Moreover, in a configuration of the embodiment, rotation of the motor 6 serving as a drive source is transmitted through a gear wheel mechanism 61 to the camshaft 7 and each cam mechanism.

(Two Heaters)

In the embodiment, similar to the first embodiment, it is only necessary that one of two heaters 3A and 3B is configured to be driven by the motor 6 so as to be openable and closable.

As long as the two heaters 3A and 3B are configured such that one thereof is movable and driven and the other thereof is fixed, the movable mechanism of the heater, or an elastic member or a magnetic member which presses the heater can be provided only on one of the heaters, and therefore, the device can be reduced in size.

Particularly, the other heater 3B (fixed-side) shown in FIG. 6 or the like is not shown in a breakaway view of FIG. 4, and one heater 3A serving as an openable-and-closable side is only shown therein. It is only necessary that, the back side or the front side in FIG. 4 is adequately selected and the positional relationship between the two heaters 3A and 3B is adopted in the selected side.

(Pair of Right and Left Clamps)

Figure 30:
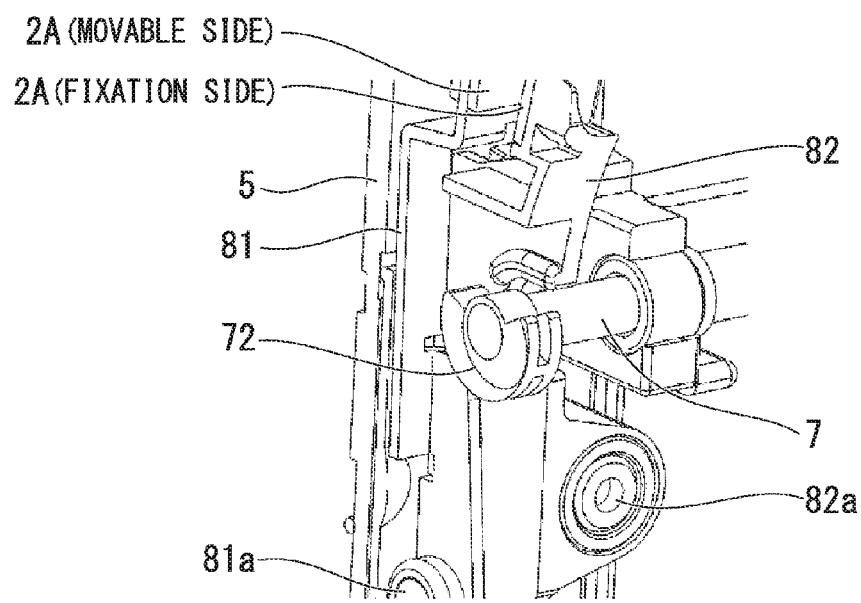
FIG. 30 is a breakaway view partially illustrating the relevant part of the optical-fiber-spliced portion reinforcing heating device according to the embodiment of the invention.
Figure 31:
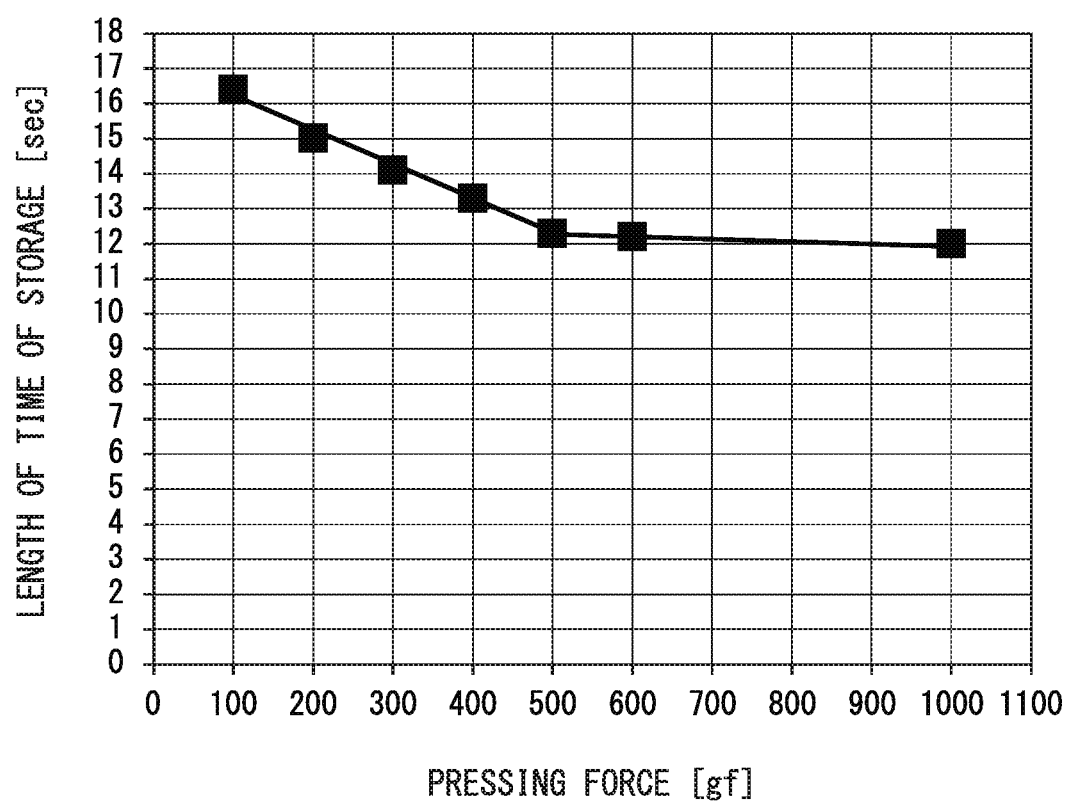
FIG. 31 is a chart illustrating the relationship between the pressing force and the shrinking time when a reinforcement sleeve of the optical fiber spliced portion is pressed while being heated by use of the optical-fiber-spliced portion reinforcing heating device.
Figure 32:
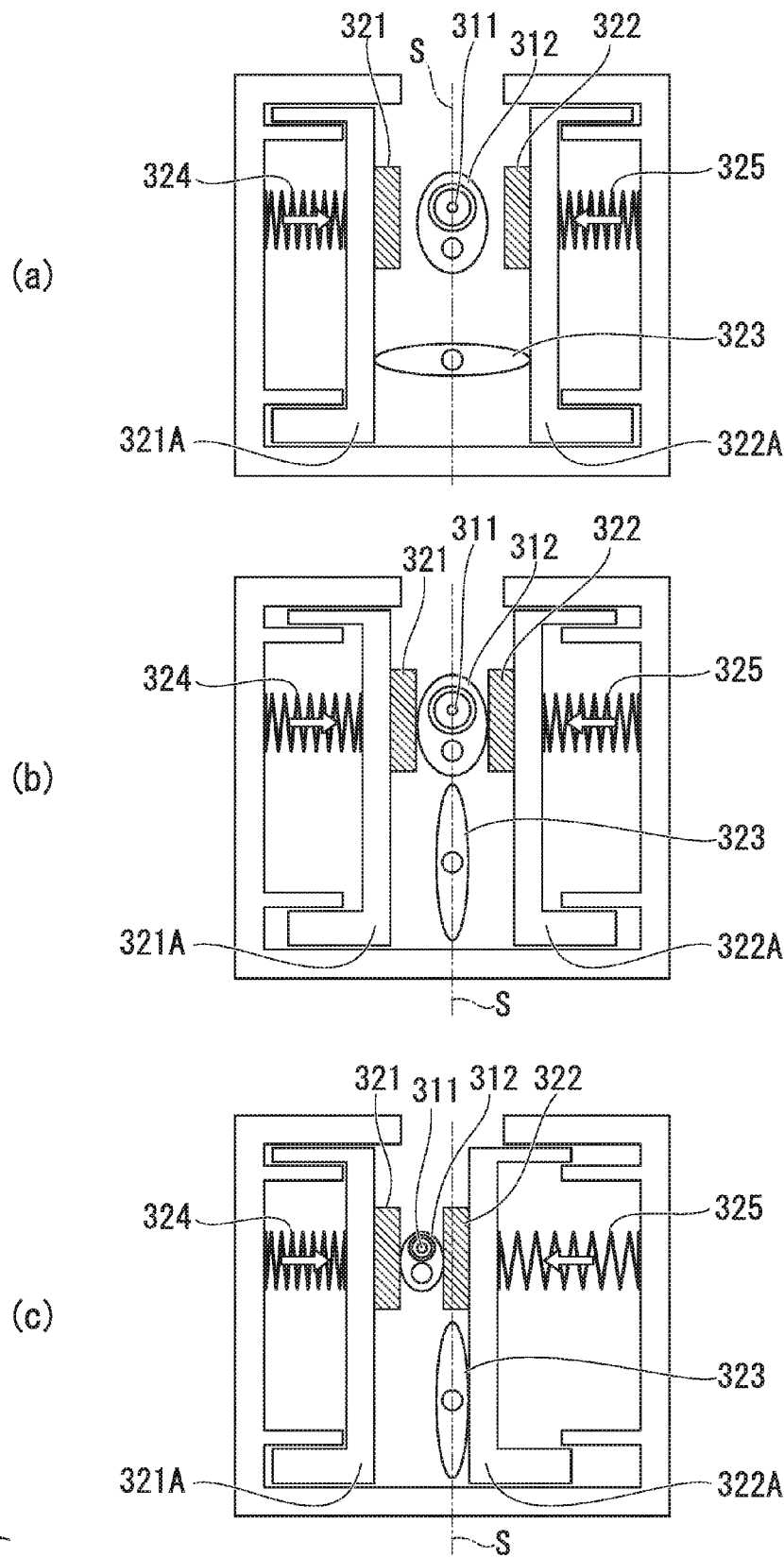
FIG. 32 is a cross-sectional view schematically illustrating a series of operations when the reinforcement sleeve of the optical fiber spliced portion is pressed while being heated by use of a conventional optical-fiber-spliced portion reinforcing heating device.
Figure 33:
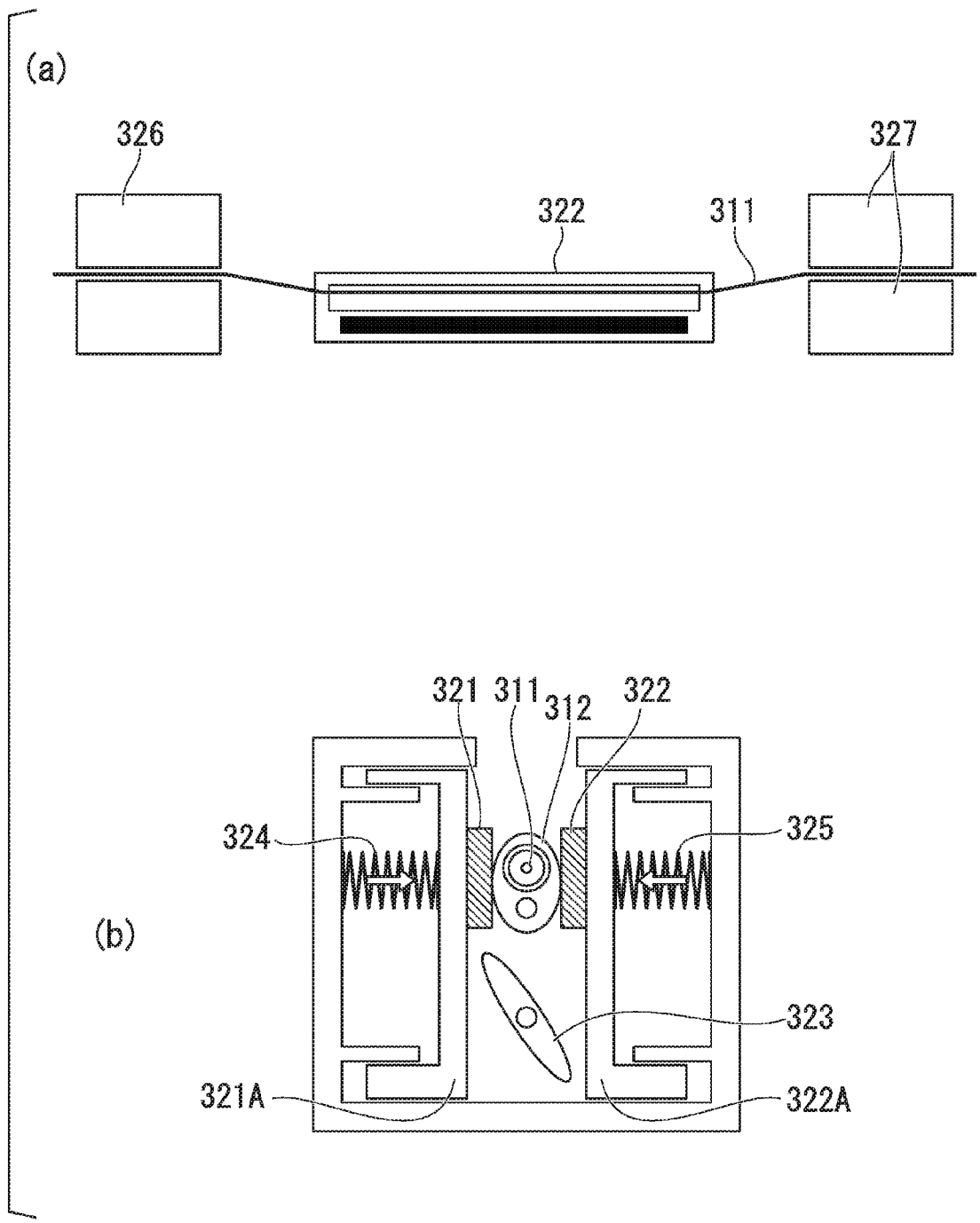
FIG. 33 is a schematic view showing illustrating the operations when the reinforcement sleeve of the optical fiber spliced portion is pressed while being heated by use of a conventional optical-fiber-spliced portion reinforcing heating device, (a) is a schematic view illustrating a slack state of an optical fiber, and (b) is a cross-sectional view showing a state in which a sleeve is sandwiched between heaters.

FIGS. 29 and 30 are partial breakaway views particularly showing one clamp 2A of the reinforcing heating device 1 shown in FIG. 4 and a surround mechanism thereof.

As shown in FIG. 29, the openable-and-closable side of one clamp 2A is attached to the first operation member 81 and the openable and closable fixed-side thereof is attached to the second operation member 82 serving as a clamp attachment base.

Moreover, the first operation member 81 carries out operations of opening and closing one clamp 2A around a rotation support 81a.

The first operation member 81 is driven by the first cam mechanism 71 and carries out operations of opening and closing one clamp 2A as a result of being pressed by the fifth force-applying member 45 formed by a torsion coil spring.

In addition, a grasping rubber 2b used to directly grasp the optical fiber 11 is provided on one clamp 2A and is also similarly applied to the other clamp 2B which is not shown in FIG. 29.

Furthermore, as shown in FIGS. 29 and 30, the paired right and left clamps 2A and 2B are configured to slidably move in the longitudinal direction of the optical fiber 11 around a slide support 82a.

Also, the first force-applying member 41 which is used to allow the paired right and left clamps 2A and 2B to move in the backward movement direction so as to apply a tension to the optical fiber 11 and which is formed of a compression coil spring (elastic member) is provided to press the second operation member 82 (and the first operation member 81).

Additionally, the backward movement stopper 51, that restricts a movement of the paired right and left clamps 2A and 2B in the backward movement direction thereof when the optical fiber 11 is grasped by the paired right and left clamps 2A and 2B, is provided at the first operation member 81.

When the optical fiber 11 is grasped by the operations of opening and closing the paired right and left clamps 2A and 2B, the backward movement stopper 51 restricts the movement of the paired right and left clamps 2A and 2B in the backward movement direction thereof by being in contact with the second cam mechanism 72 provided on the camshaft 7.

Consequently, in the constitution, after the optical fiber 11 is grasped, the contacting state between the second cam mechanism 72 and the backward movement stopper 51 is released, it is possible to apply a tension to the optical fiber 11 by the first force-applying member 41 as a result of releasing the paired right and left clamps 2A and 2B to be movable in the backward movement direction thereof.

(Other Configuration of Each Element and Operation Mode)

Figure 18:
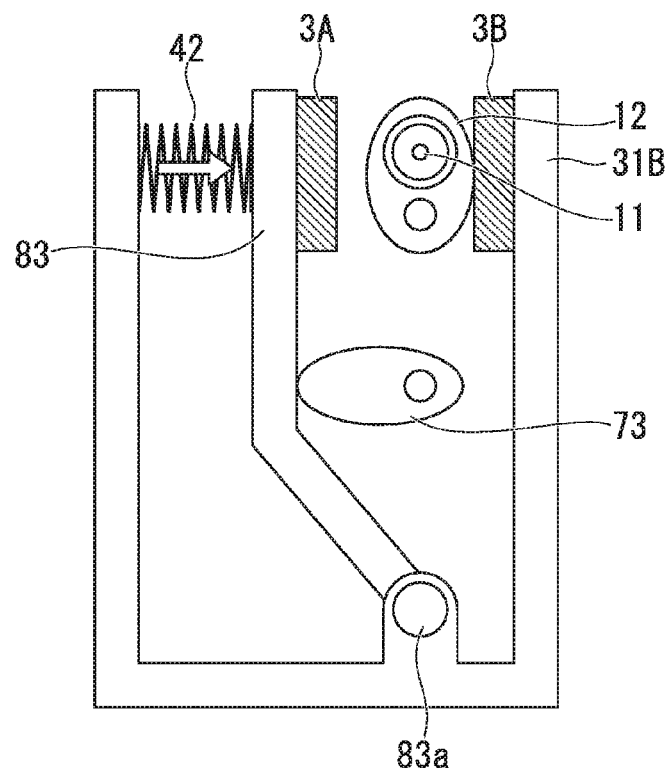
FIG. 18 is a schematic view illustrating the other example of an operation of the optical-fiber-spliced portion reinforcing heating device according to the embodiment of the invention.

In the embodiment, as shown in FIG. 18 as an example, the third operation member 83 can be configured to function as a heater attachment base on which the openable and closable heater 3A is provided and to be driven to rotate around the rotation support 83a.

In the first embodiment, the heater attachment base which is described with reference to FIG. 6 or the like uses a slide movable system. However, balance of the first point of action at which the heater 3 presses the sleeve 12, the second point of action at which the heater 3A (heater attachment base) presses a driving body (third cam mechanism), and the point of effort at which the second force-applying member 42 presses the heater 3A (heater attachment base) varies with conditions.

Because of this, a force is easy to work in a direction (torsion) in which the heater attachment base is inclined in the slide movable system. If a slide guide mechanism having a resistance to torsion or a member such as a linear bearing is not provided on a heater movable mechanism, the movement of the heater attachment base does not become smooth. In the case of using the above-described mechanism or the member, there is a problem in that the reinforcing heating device becomes larger in size.

In the embodiment, as a result of configuring the third operation member 83, on which one heater 3A is provided, by the lever-shaped member that is driven to rotate around the rotation support 83a, it is possible to reduce the entire device in size.

Figure 24:
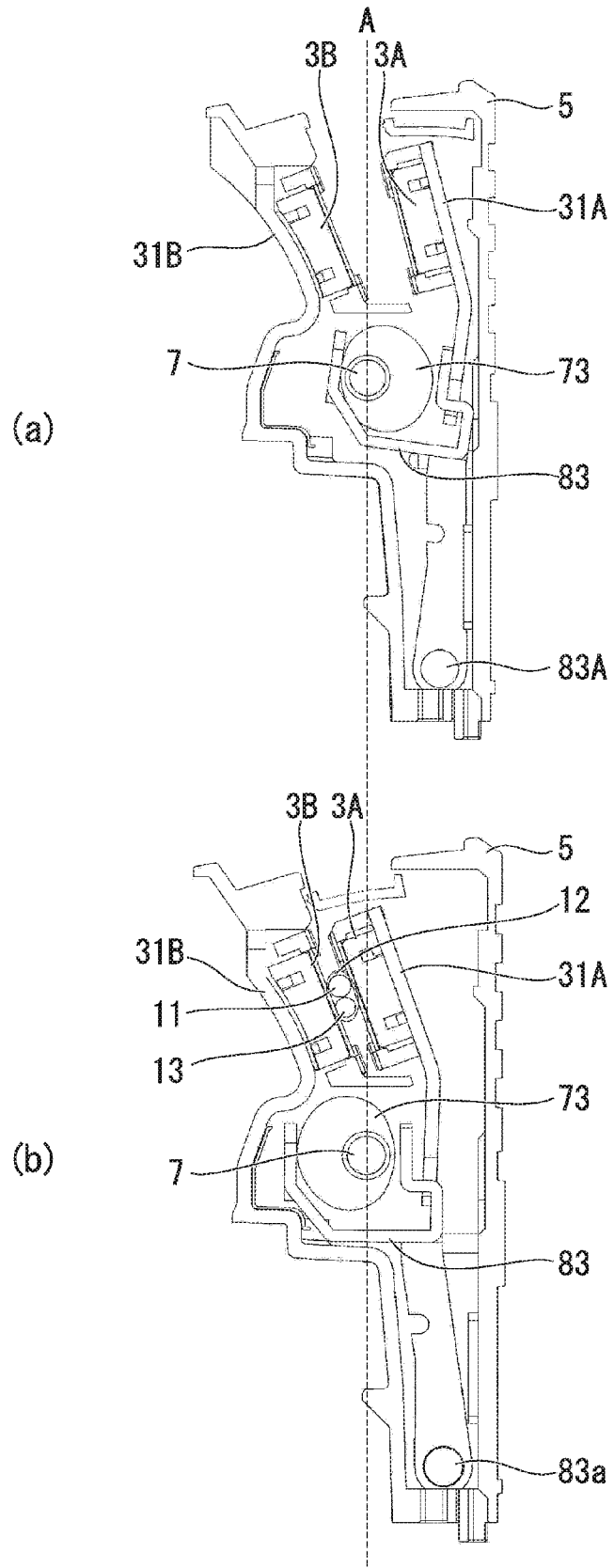
FIG. 24 is a schematic view showing an example of an operation of the optical-fiber-spliced portion reinforcing heating device according to the embodiment of the invention and is a cross-sectional view taken along the cross-section line A-A shown in FIG. 23.

In the embodiment, for example, as shown in FIG. 4, FIG. 24 views (a) and (b) to FIG. 28 views (a) and (b) or the like which will be described later, at least any of operation members can be configured by a lever-shaped member that rotationally moves around each of the rotation supports parallel to the optical fiber 11 and the rotation shafts of the sleeve 12, and each cam mechanism (the camshaft 7), and it is preferable in that the aforementioned effect is easily obtained.

Figure 28:
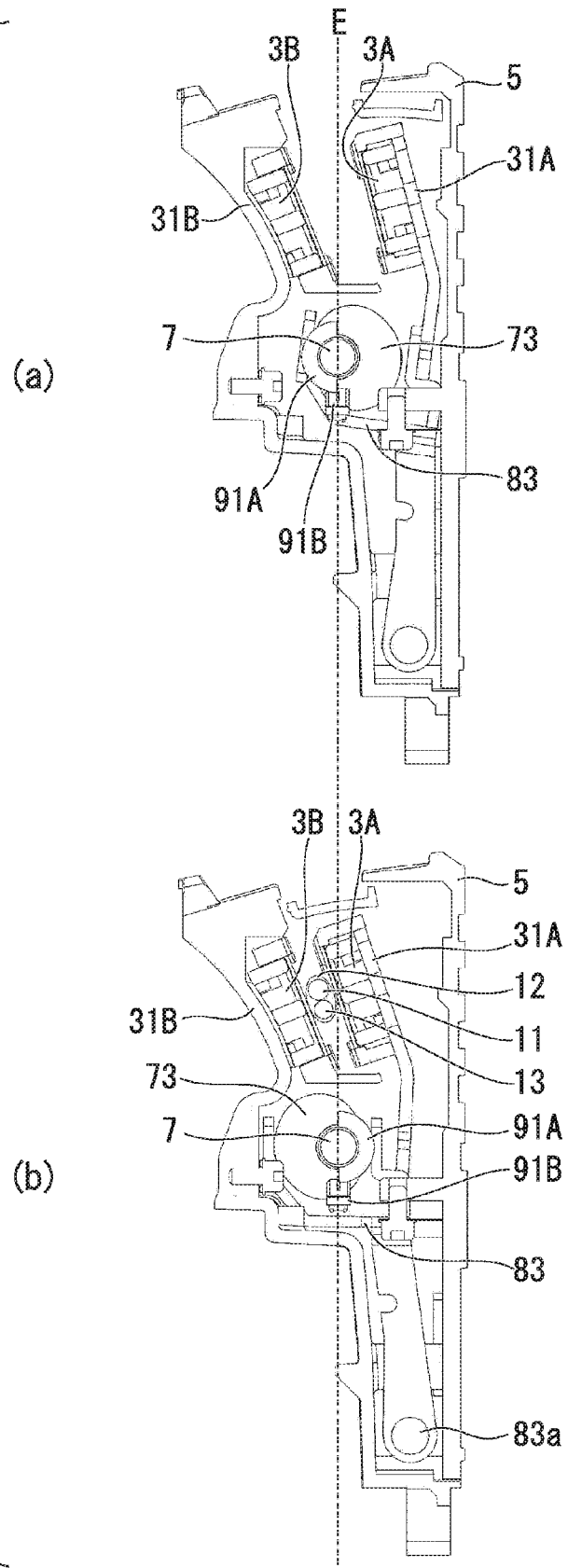
FIG. 28 is a schematic view showing an example of an operation of the optical-fiber-spliced portion reinforcing heating device according to the embodiment of the invention and is a cross-sectional view taken along the cross-section line E-E shown in FIG. 23.

In the examples shown in FIG. 24 views (a) and (b) to FIG. 28 views (a) and (b), the first, the third, and the fourth operation members 81, 83, and 84 are configured by the lever-shaped member that rotationally moves around the rotation supports parallel to the rotation shafts of the first, the third, and the fourth cam mechanisms 71, 73, and 74, respectively.

Furthermore, as shown in FIG. 4 as an example, it is preferable that the camshaft 7 be configured to be arranged among each rotation support that is mentioned that is disposed and is disposed under the device, the paired right and left clamps 2A and 2B that are disposed above the device, the two heaters 3A and 3B, and the lid 10 in that it is possible to further reduce the entire device in size.

In addition, the second force-applying member 42 that is used to press one heater 3A can be configured by a coil spring that is provided on the rotation support 83a of the third operation member 83 which serves as a heater attachment base shown in FIG. 18.

The third operation member 83 according to the embodiment is pressed by the second force-applying member 42 formed of an elastic member or a magnetic member; however, in order to obtain a state in which a variation in a pressing force depending on the third operation member 83 is low, a compression coil spring having an overall length longer than the movable stroke as described above is necessary.

However, in the case of using a compression coil spring having a long overall length, there is a problem in that the entire device becomes larger in size.

In contrast, as a result of providing the second force-applying member 42 formed of a coil spring on the rotation support 83a as described above and utilizing a rotational operation around the rotation support 83a, it is possible to obtain a constant pressing force in a wide movable range, and it is possible to reduce a reinforcing heating device in size.

Additionally, in the embodiment, it is preferable that a coil spring be used as the second force-applying member 42 pressing two heater units 3A and 3B, the mechanism grasping the optical fiber 11 in the paired right and left clamps 2A and 2B, and the force-applying member of the lid 10 (not shown in the figure) as described above and that the above-mentioned rotation support be on the same axis as that of the coil spring in that it is possible to further reduce the entire device in size.

Moreover, similar to the above-mentioned first embodiment, one clamp 2A may also be driven by the same mechanism as in the case of the above-described one heater 3A.

That is, in the configuration as shown in FIG. 4, by use of the first cam mechanism 71 in accordance with the rotational drive of the camshaft 7 by the motor 6, the fifth force-applying member 45 formed of an elastic member or a magnetic member (refer to FIG. 29) can be operated to press the optical fiber in the direction in which the paired right and left clamps 2A and 2B sandwich and grasp the optical fiber 11 via the first operation member 81.

As a result of allowing the openable-and-closable side of the paired right and left clamps 2A and 2B to move by use of the motor 6 serving as a power source as mentioned above, effects as described below can be obtained.

(1) Since the operations of opening and closing that were conventionally and manually carried out by an operator are automatically carried out, it is possible to speed up an operation of heat shrinking the sleeve 12 using the reinforcing heating device.

(2) Since it is not necessary for an operator to operate a clamp with their finger, it is not necessary to design a clamp to be a shape suitable for opening and closing the clamp with human finger.

Conventionally, for example, protrusions which are not shown in the figure and easily allow finger to pick them are provided on clamps that are disposed at respective right and left sides in the longitudinal direction of the optical fiber, and a space for finger is provided close thereto. Therefore, the clamp was larger in size and the configuration thereof was complicated.

According to the embodiment, as a result of automating the operations of grasping, opening, and closing the paired right and left clamps 2A and 2B, it is possible to reduce each clamp in size.

(3) In order to carry out the operation using the reinforcing heating device, it is necessary to perform operations in the sequence such that the clamp is closed after setting the optical fiber, a tension is applied to the optical fiber, the forward movable range and the backward movable range are ensured, and the heat shrinkage is carried out by pressing the heaters.

However, there is a possibility that an operator having a low level of proficiency causes error in operation.

As described in the embodiment, as a result of automating the pressing operation of one heater 3A and the operations of grasping, opening, and closing the paired right and left clamps 2A and 2B, it is possible to prevent such error in operation.

Furthermore, as described in detail in the embodiment, at least any two or more of the cam mechanisms that are provided on the same axis as that of the camshaft 7 and are rotationally driven, particularly, the first cam mechanism 71 and the third cam mechanism 73 are preferably configured so that a rotating drive force by the motor 6 is reduced by determining a timing of combining a positive driving that needs a drive torque and a negative driving that receives a torque.

As described above, several hundreds of gf is required as a pressing force for pressing one heater 3A and a pressing force of several hundreds of gf is also required to grasp the optical fiber 11 by driving the openable-and-closable side of the paired right and left clamps 2A and 2B.

In the case where, for example, the peaks of the above driving and pressing timings (peak of the pressing force) overlap, a force of a compression coil spring such as represented by the following formula (heater of 500 gf+one of the clamps of 250 gf+the other of the clamps of 250 gf=1000 gf) works.

Furthermore, as mentioned above, in a case of driving each operation member by the rotary motion around each rotation support, the required driving power further increases.

In addition, in the case where, for example, a distance from each rotation support to a compression coil spring forming each force-applying member is twice the distance from the rotation support to each cam mechanism, it is necessary for a force of each cam mechanism to be twice the force of the compression coil spring under the principle of leverage.

As a result, the total of the force to drive the camshaft increases to be 2000 gf, and there is a problem in that the drive mechanism therefor becomes larger in size.

Figure 19:
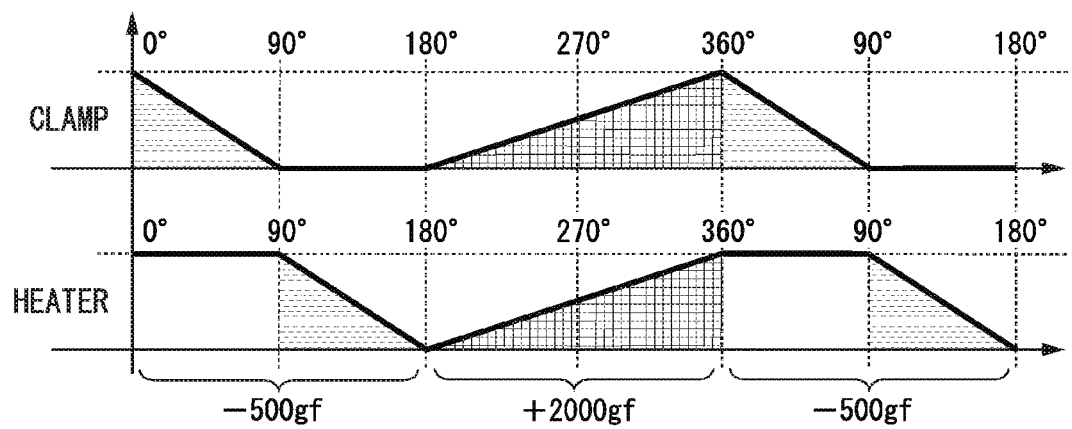
FIG. 19 is a timing chart illustrating a series of operation timings in the optical-fiber-spliced portion reinforcing heating device.
Figure 20:
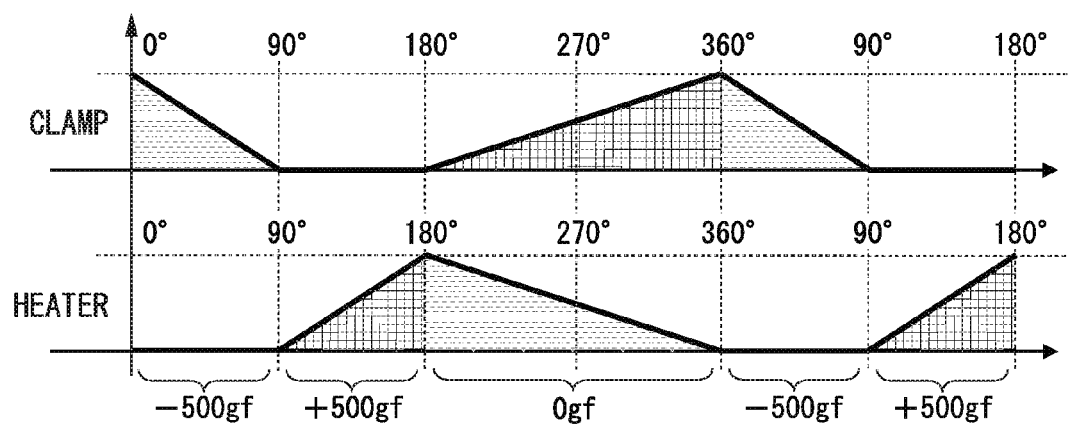
FIG. 20 is a timing chart illustrating a series of operation timings in the optical-fiber-spliced portion reinforcing heating device.

In the embodiment, FIGS. 19 and 20 are timing charts (graph) that shows timings of operating the first cam mechanism 71 that grasps and drives the openable-and-closable side of the paired right and left clamps 2A and 2B and the third cam mechanism 73 that drives one heater 3A, and the charts describe an action and an effect which compensate a positive driving and a negative driving.

In FIGS. 19 and 20, the x-axis represents an angle of each cam mechanism and the y-axis represents an amount of extrusion in the direction of each force-applying member (compression coil spring) from the rotational center of each cam mechanism.

This means that, FIGS. 19 and 20 graphically illustrates the case where, for example, each operation member carries out the above-mentioned rotary motion around each rotation support.

As shown in FIG. 19, in the case where the rotation of the first cam mechanism that drives the clamps is in the range of 0 to 90°, an amount of extrusion of the cam mechanism decreases.

Such operation means the process in which the clamps are closed and the grasping operation is carried out.

In this section, a driving power is not necessary for the cam mechanism, rather than, the force-applying member formed of a compression coil spring facilitates the rotation of the cam mechanism.

In this case, the force by which the compression coil spring facilitates the rotation of the cam mechanism is 500 gf that is twice the clamping force of 250 gf (the principle of leverage).

When the clamps are closed and thereby grasp the optical fiber, next, one of the heaters is closed.

In the chart shown in FIG. 19, the section in which the rotation of the second cam mechanism allowing one of the heaters to be driven is 90 to 180° represents the operation.

Thereafter, the second cam mechanism is stopped at the second position of 180°, and heating with respect to the sleeve by two heaters is started.

When shrinkage of the sleeve is completed, the heating is stopped.

Subsequently, in the range of 180 to 360° of the chart shown in FIG. 19, one of the heaters and the openable-and-closable side of the paired right and left clamps are simultaneously carry out a release operation; however, a driving power of 2000 gf is required for the camshaft.

Additionally, an open operation is slowly carried out in consideration of reduction in the load to the drive mechanism in the reinforcing heating device; however, if the operation is excessively slow, there are problems in that the sleeve (optical fiber) cannot be removed from the reinforcing heating device and time for removal thereof becomes longer.

The chart shown in FIG. 20 illustrates that a timing (driving power) in the configuration in which the driving power of the heater is inverted in order to reduce an excessive driving power as shown in FIG. 19.

As shown in FIG. 20, in the range of 180 to 360° which is the problematic section in FIG. 19, the total driving powers of one heater 3A (third cam mechanism 73) and the openable-and-closable side of the paired right and left clamps 2A and 2B are cancelled each other, a torque is not necessary at least under the theoretical concept (practically, the drive torque is not zero due to a friction between members or the like).

As a result of adopting the constitution that allows the torques of the mechanisms to be cancelled and to compensate each other by partially inverting them as described above, it is possible to reduce the drive mechanism in size while reducing the drive torque, and therefore, it is possible to reduce a reinforcing heating device in size.

Figure 21:
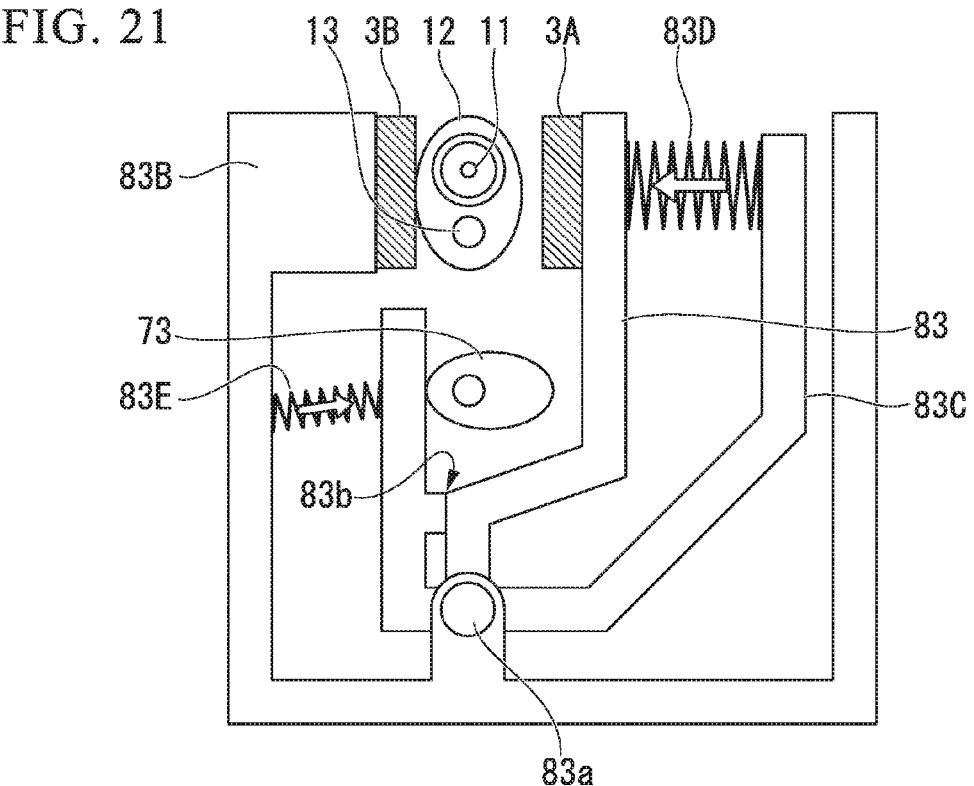
FIG. 21 is a schematic view illustrating the other example of an operation of the optical-fiber-spliced portion reinforcing heating device according to the embodiment of the invention.
Figure 22:
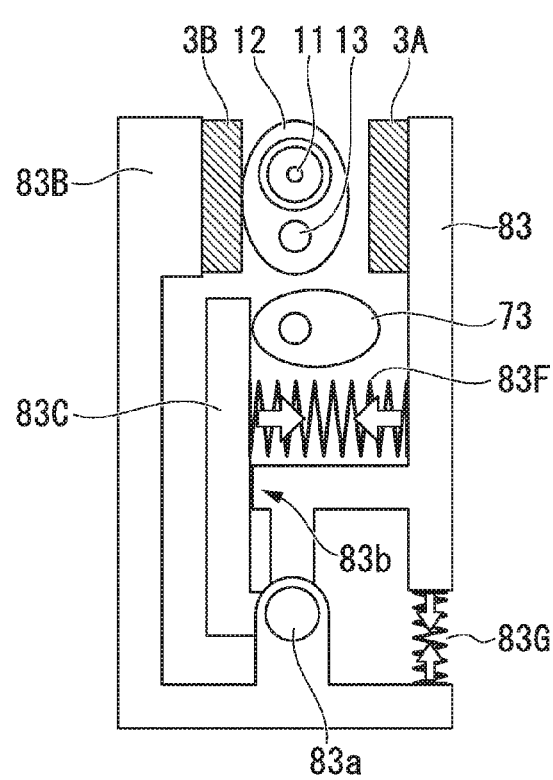
FIG. 22 is a schematic view illustrating the other example of an operation of the optical-fiber-spliced portion reinforcing heating device according to the embodiment of the invention.

Moreover, as shown in FIGS. 21 and 22 as an example in the embodiment, a constitution that uses an auxiliary movable lever may be adopted in order to invert the drive torque.

Particularly, for example, each operation member that carries out the rotary motion around the rotation support as mentioned above will be described below; however, it is not limited to this, it may be applied to a slide drive system.

Hereinafter, a configuration shown in FIG. 21 will be described.

(1) A compression coil spring 83D that is in a state of being compressed is inserted between the third operation member 83 serving as a heater attachment base and an auxiliary movement lever 83C.

The compression coil spring 83D creates a force so as to separate the third operation member 83 from the auxiliary movement lever 83C; however, since a contact portion 83b functions as a stopper, they are configured not to be separated from each other over a set distance by the contact.

(2) That is, the third operation member 83 and the auxiliary movement lever 83C are configured to coordinately move.

(3) Particularly, two springs serving as the compression coil spring 83D and an auxiliary compression coil spring 83E are provided in the drawing shown as an example. The spring force of the auxiliary compression coil spring 83E is sufficiently weaker than that of the compression coil spring 83D and only functions to press the auxiliary movement lever 83C onto the third cam mechanism 73.

(4) When the auxiliary movement lever 83C is driven by the third cam mechanism 73, the third operation member 83 serving as a heater attachment base is coordinately driven.

(5) On the other hand, after the two heaters 3A and 3B comes into contact with the sleeve 12, the third operation member 83 cannot move any more.

As a result, the third operation member 83 produces an action of contracting the compression coil spring 83D, the force of the spring at this time creates the pressing force with respect to the sleeve 12.

According to the above-described operation, when the operation of closing one heater 3A is carried out, a drive torque used to press them is necessary. When one heater 3A is opened, since the drive torque is not necessary (released), it is possible to create a drive torque that is opposite to the paired right and left clamps 2A and 2B.

More specifically, in the embodiment, in the constitution including each cam mechanism as shown in FIG. 4, in at least any of the cam mechanisms, particularly, in the first cam mechanism 71 and the third cam mechanism 73, the configuration shown in a schematic view (diagram) of FIG. 21 may be applied to each of the first operation member 81 and the third operation member 83.

That is, a configuration can be adopted in which an auxiliary movable member (refer to reference numeral 83C in FIG. 21) is disposed on the opposite side of the first operation member 81 and the third operation member 83 with the camshaft 7 interposed therebetween, each operation member is coupled to the auxiliary movable member via an elastic member or a magnetic member, a positive driving of the rotary drive torque of each cam mechanism is inverted to a negative driving as a result of displacing the auxiliary movable member instead of each operation member in accordance with a motion of each cam mechanism, and therefore, the positive driving and the negative driving are combined and thereby diminished between the first cam mechanism 71 and the third cam mechanism 73.

Because of this, there is no need to increase the driving force of the motor 6, and it is possible to reduce the entire device in size.

Additionally, for example, as shown in FIG. 22, even in the case of using tension coil springs 83F and 83G as each coil spring, the same effect as the aforementioned effect is obtained, and it is possible to further reduce the reinforcing heating device in size.

Moreover, in the embodiment, as also described in the first embodiment, it is preferable that a cam mechanism be used to drive one heater 3A serving as an openable-and-closable side and that a structure be driven by the third cam mechanism 73 as shown in FIG. 4, 6, or the like.

Furthermore, in this configuration, it is possible to further reduce the entire device in size by arranging the third cam mechanism 73 at the position between the rotation support and one heater 3A.

In addition, in the embodiment, similar to the case of the aforementioned one heater 3A, a configuration may be adopted which allows the openable-and-closable side of the paired right and left clamps 2A and 2B to be driven to rotate around the rotation support.

In the first embodiment, the paired right and left clamps 2A and 2B which are described with reference to FIG. 6 or the like uses a slide movable system. However, balance of the first point of action at which the clamps 2 presses the optical fiber 11, the second point of action at which the clamps 2 presses the driving body (the first cam mechanism 71), and the point of effort at which the fifth force-applying member (refer to reference numeral 45 in FIG. 29) presses the clamps varies with conditions.

Because of this, a force is easy to work in a direction (torsion) in which the clamp attachment base is inclined. If a slide guide function having a resistance to torsion or a member such as a linear bearing is not provided on a clamp movable mechanism, the movement of the attachment base does not become smooth. In the case of using the above-described mechanism or the member, there is a problem in that the reinforcing heating device becomes larger in size.

In the embodiment, as a result of configuring the openable-and-closable side of the paired right and left clamps 2A and 2B by a lever-shaped member that rotationally moves around the rotation support, it is possible to reduce the entire device in size.

Moreover, in the embodiment, as also described in the first embodiment, it is preferable that a cam mechanism be used to drive the openable-and-closable side of the paired right and left clamps 2A and 2B and that a structure be driven by the first cam mechanism 71 as shown in FIG. 4, 29, or the like.

Furthermore, in this configuration, it is possible to further reduce the entire device in size by arranging the first cam mechanism 71 at the position between the rotation support and the paired right and left clamps 2A and 2B.

Additionally, as shown in FIG. 29, the fifth force-applying member 45 that is used to grasp the optical fiber 11 by use of the paired right and left clamps 2A and 2B may also be configured by an elastic member such as a coil spring that is provided at the rotation support 81a of the first operation member 81 serving as a clamp attachment base.

The first operation member 81 (clamp attachment base) to which the openable-and-closable side of the paired right and left clamps 2A and 2B is attached as shown in FIG. 4 or 29 is pressed by the fifth force-applying member 45 formed of an elastic member or a magnetic member; however, in order to obtain a state in which a variation in a pressing force depending on the first operation member 81 serving as a clamp attachment base is low, a compression coil spring having an overall length longer than the movable stroke as described above is necessary.

However, in the case of using a compression coil spring having a long overall length, there is a problem in that the entire device becomes larger in size.

In contrast, as a result of providing the fifth force-applying member 45 formed of a coil spring on the rotation support 81a as described above and utilizing a rotational operation around the rotation support 81a, it is possible to obtain a constant pressing force in a wide movable range, and it is possible to reduce a reinforcing heating device in size.

Also, in the embodiment, a structure can be adopted which allows the openable-and-closable side of the paired right and left clamps 2A and 2B and one heater 3A to be driven by the motor 6 that is the same drive source.

As mentioned above, as each clamp which is the openable-and-closable side is operated by utilizing the motor 6 that serves as a drive source common to one heater 3A, one drive source mounted thereon as a device is only required, and therefore, it is possible to reduce a reinforcing heating device in size.

Furthermore, in the embodiment, a structure can be adopted in which, as a result of driving the first to third cam mechanisms 71, 72, and 73 by the motor 6 serving as the same drive source, one clamp 2A is operated to apply a tension to the optical fiber 11.

Moreover, in the embodiment, as shown in FIG. 4 as an example, a structure can be adopted which allows the openable-and-closable side of the paired right and left clamps 2A and 2B and one heater 3A to be driven by the respective cam mechanisms that are provided on the common camshaft 7 and on the same axis.

In such case, as shown as an example in the drawing, as a result of arranging two first cam mechanisms 71 that are used to drive the openable-and-closable side of the paired right and left clamps 2A and 2B and two third cam mechanisms 73 that are used to drive one heater 3A on one camshaft 7, effects as described below can be obtained.

(1) Since one camshaft can drives all of movable bodies, a driving member that is disposed inside each drive unit or a connection member that links the driving members of the units is not necessary.

Accordingly, it is possible to reduce a reinforcing heating device in size.

(2) As a result of varying the phases of the cam mechanisms, it is possible to control the sequence of opening and closing the clamp by use of slight one member.

Accordingly, it is possible to reduce a reinforcing heating device in size.

Additionally, in the embodiment, the forward movement stopper or the backward movement stopper of one clamp 2A can be driven by the motor 6 serving as a drive source.

As described above, as a result of allowing at least one of the paired right and left clamps 2A and 2B to be movable in the longitudinal direction of the optical fiber 11 and as a result of driving the second cam mechanism 72 serving as a backward movement stopper via the camshaft 7 by the motor 6, effects as described below can be obtained.

(1) Since it is not necessary for an operator to operate the forward movement stopper or the backward movement stopper to be retracted with their finger, it is not necessary to design them to be a shape suitable for opening and closing them with human finger.

That is, since the retraction mechanism can be accommodated in the device without necessary to expose it to the surface thereof, it is possible to reduce a reinforcing heating device in size.

(2) In order to carry out the operation using the reinforcing heating device, it is necessary to perform operations in the sequence such that the clamp is closed after setting the optical fiber, a tension is applied to the optical fiber, the forward movable range and the backward movable range are ensured, and the heat shrinkage is carried out by pressing the heaters.

However, there is a possibility that an operator having a low level of proficiency causes error in operation.

As described in the embodiment, as a result of automating the operation of retracting the forward movement stopper or the backward movement stopper, it is possible to prevent such error in operation.

Furthermore, in the embodiment, in addition to the openable-and-closable side of the above-mentioned paired right and left clamps 2A and 2B and one heater 3A, the second cam mechanism 72 serving as the aforementioned backward movement stopper or a forward movement stopper which is not shown in the figure may be configured to be movable by the motor 6 that is the same drive source.

As stated above, as each clamp is operated by utilizing the openable-and-closable side of the paired right and left clamps 2A and 2B or the motor 6 that serves as a drive source common to one heater 3A, one drive source mounted thereon as a device is only required, and therefore, it is possible to reduce a reinforcing heating device in size.

Moreover, as shown in FIG. 4 as an example, a structure can be adopted which allows the openable-and-closable side of the paired right and left clamps 2A and 2B, one heater 3A, and each stopper to be driven by the respective cam mechanisms that are provided on the common camshaft 7 and on the same axis.

In the drawing shown as an example, as a result of arranging two first cam mechanisms 71 that are used to drive the openable-and-closable side of the paired right and left clamps 2A and 2B, two third cam mechanisms 73 that are used to drive one heater 3A, and the second cam mechanism 72 serving as a backward movement stopper on one camshaft 7, effects as described below can be obtained.

(1) Since one camshaft can drives all of movable bodies, a driving member that is disposed inside each drive unit or a connection member that links the driving members of the units is not necessary.

Accordingly, it is possible to reduce a reinforcing heating device in size.

(2) As a result of varying the phases of the cam mechanisms, it is possible to control the sequence of opening and closing the clamp by use of slight one member.

Accordingly, it is possible to reduce a reinforcing heating device in size.

As remarked above, according to the reinforcing heating device of the embodiment, since it is only necessary that one camshaft 7 that is properly adjusted to the reinforcing heating device is designed, improvements in reduction in the reinforcing heating device in size can be achieved, it is possible to reduce the size of the reinforcing heating device.

Furthermore, in the embodiment, a constitution may also be adopted which includes: the lid 10 that is used to open and close the reinforcing heating device; the sixth force-applying member 46 that applies a force of closing the lid 10 by use of one of an elastic member and a magnetic member thereto; the fourth cam mechanism 74 that is provided on the camshaft 7 on the same axis as those of the first to third cam mechanisms 71 to 73 or is disposed on the other camshaft (not shown in the figure) parallel to the camshaft 7; and a fourth operation member 84 that serves as a mechanism operating the applied force of the sixth force-applying member 46 to close the lid 10 in accordance with the displacement of the fourth cam mechanism 74.

Consequently, the same motor 6 can be configured to allow the aforementioned each force-applying member to operate the paired clamps 2A and 2B, the heater 3, and the lid 10 by the first to fourth cam mechanisms 71 to 74.

In this case, a configuration may also be adopted which carries out operations of opening and closing the lid 10 by displacing the fourth cam mechanism 74 with respect to the fourth operation member 84 via an elastic member such as a spring, a rubber, or a sponge, or a magnetic member such as a permanent magnet, or an electromagnet.

The effect described below is obtained by adopting the above-described configuration.

(1) Even in the case where the reinforcing heating device is not in use for a predetermined time, as a result of closing the lid, there is no possibility that rain water or the like does not enter the inside of the device.

(2) Even in the case where the reinforcing heating device is not in use for a predetermined time, as a result of closing the lid, there is no possibility that dust, powder or the like do not enter the inside of the device.

(3) As the lid is closed with the start of the heating, it is possible to prevent an operator finger from being erroneously in contact with the inner heater and from being burn.

Particularly, the above-described the lid 10 is preferably made of a transparent material so that it is possible to visually check a progress of shrinkage of the sleeve 12 during heating.

Moreover, different from the case of the camshaft 7, it is not necessary for the rotation support axis of each operation member in the above-description to be common (on the same axis) to all operation members.

Furthermore, it is not necessary for all operation members to rotationally move around the rotation support, and one of them is adequately selected and can be operated.

Additionally, in the embodiment, the paired right and left clamps 2A and 2B, the aforementioned one heater 3A, the backward movement stopper or the forward movement stopper, the lid 10, or the like can be driven by use of the motor 6 as a common drive source and by the respective cam mechanisms that is provided on one camshaft 7.

That is, the configuration can be adopted in which, the paired right and left clamps 2A and 2B is driven by the motor 6 serving as a common drive source so as to grasp the optical fiber 11, one clamp 2A is driven so as to apply a tension to the optical fiber 11, furthermore, one heater 3A is driven so as to sandwich and press the sleeve 12, and additionally, the operations of opening and closing the lid 10 are carried out.

As mentioned above, as a result of causing one motor 6 to carry out all functions, it is possible to reduce the entire reinforcing heating device in size.

In addition, as the above-mentioned mechanism is driving by one camshaft 7, a driving member that is disposed inside each drive mechanism or a connection member that links the mechanisms is not necessary, and therefore, it is possible to reduce the entire device in size.

Furthermore, as shown in FIG. 28 views (a) and (b), a semidisc 91A and a photo sensor 91B that are used to detect a rotational position of the camshaft 7 is provided near the third cam mechanism 73.

Moreover, in the example shown in FIG. 4, all operation members are configured of a lever-shaped member that is driven to rotate around each rotation support.

Moreover, a torsion coil spring is used as an elastic member 46 that is used to open and close the lid 10 or the fifth force-applying member 45 (refer to FIG. 29) that is used to open and close the paired right and left clamps 2A and 2B, a double torsion spring is used as the second force-applying member 42 that is used to open and close one heater 3A, and additionally, a compression coil spring is used as the first force-applying member 41 that applies a tension to the optical fiber 11 of one clamp 2A in the longitudinal direction thereof.

Figure 23:
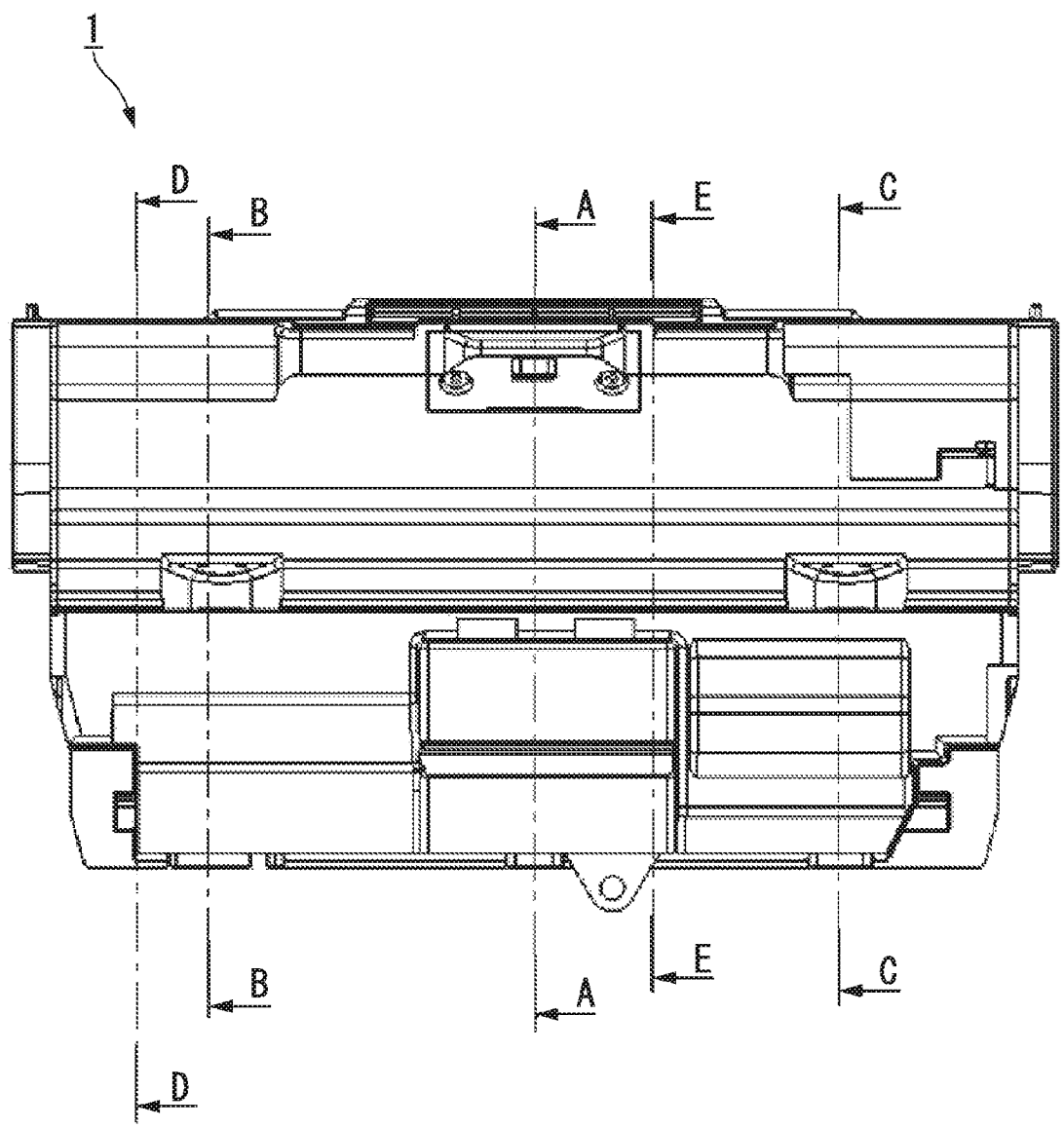
FIG. 23 is a front view illustrating an external appearance of an example of the optical-fiber-spliced portion reinforcing heating device according to the embodiment of the invention.

Here, FIG. 23 is a front view showing the reinforcing heating device 1 according to the embodiment, cross-section lines A-A to E-E shown in FIG. 23 shows cross-sectional positions of cross-sectional views shown in FIG. 24 views (a) and (b) to FIG. 28 views (a) and (b), respectively.

Consequently, FIG. 24 to FIG. 28 shows states in which each operation is carried out at the position of each portion described below.
(1) A-A (FIG. 24 views (a) and (b)): operation of opening and closing one heater 3A by use of the third cam mechanism 73.
(2) B-B (FIG. 25 views (a) and (b)): operation of opening and closing one clamp 2A by use of the first cam mechanism 71.

Figure 25:
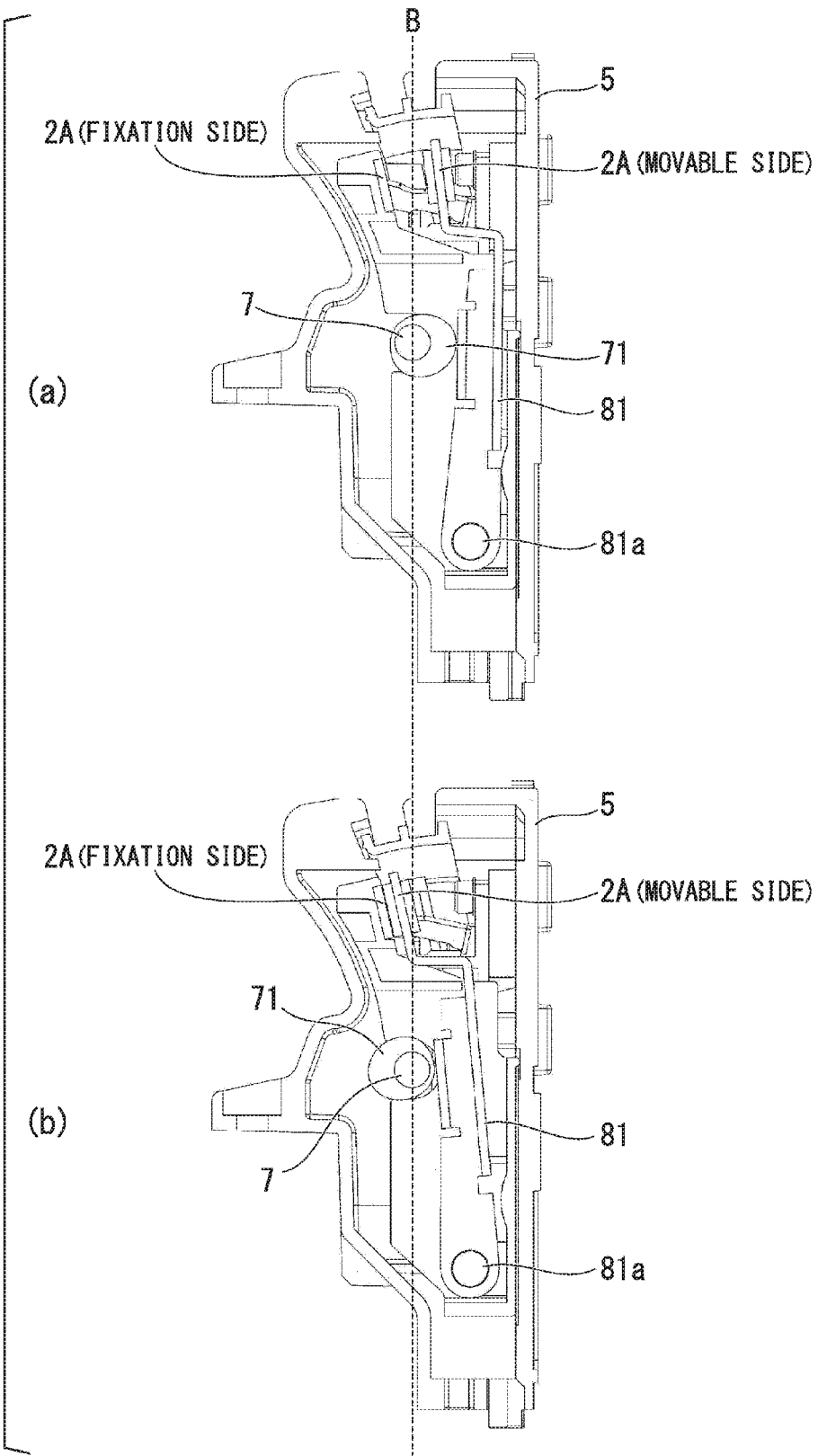
FIG. 25 is a schematic view showing an example of an operation of the optical-fiber-spliced portion reinforcing heating device according to the embodiment of the invention and is a cross-sectional view taken along the cross-section line B-B shown in FIG. 23.
Figure 26:
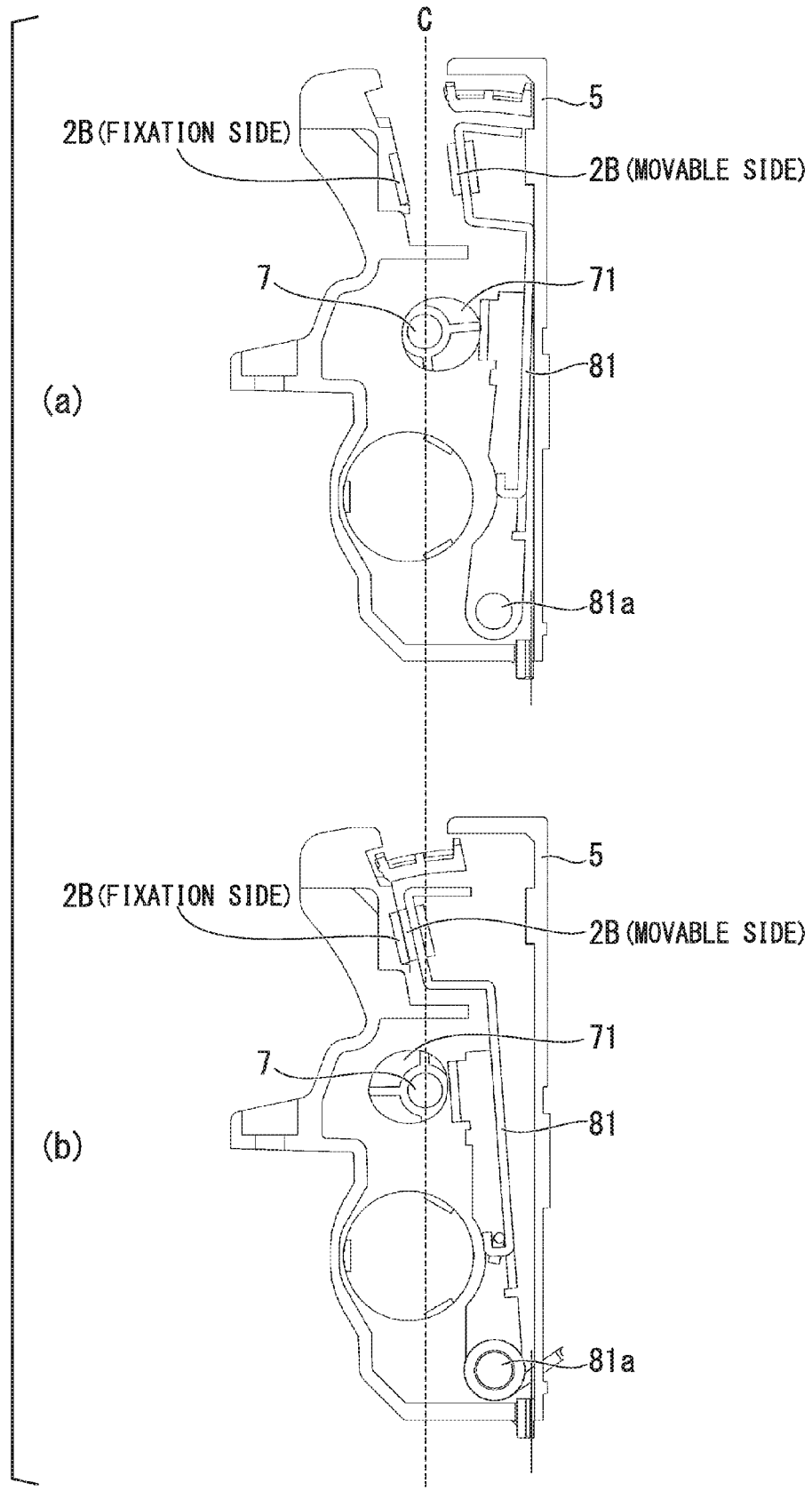
FIG. 26 is a schematic view showing an example of an operation of the optical-fiber-spliced portion reinforcing heating device according to the embodiment of the invention and is a cross-sectional view taken along the cross-section line C-C shown in FIG. 23.
Figure 27:
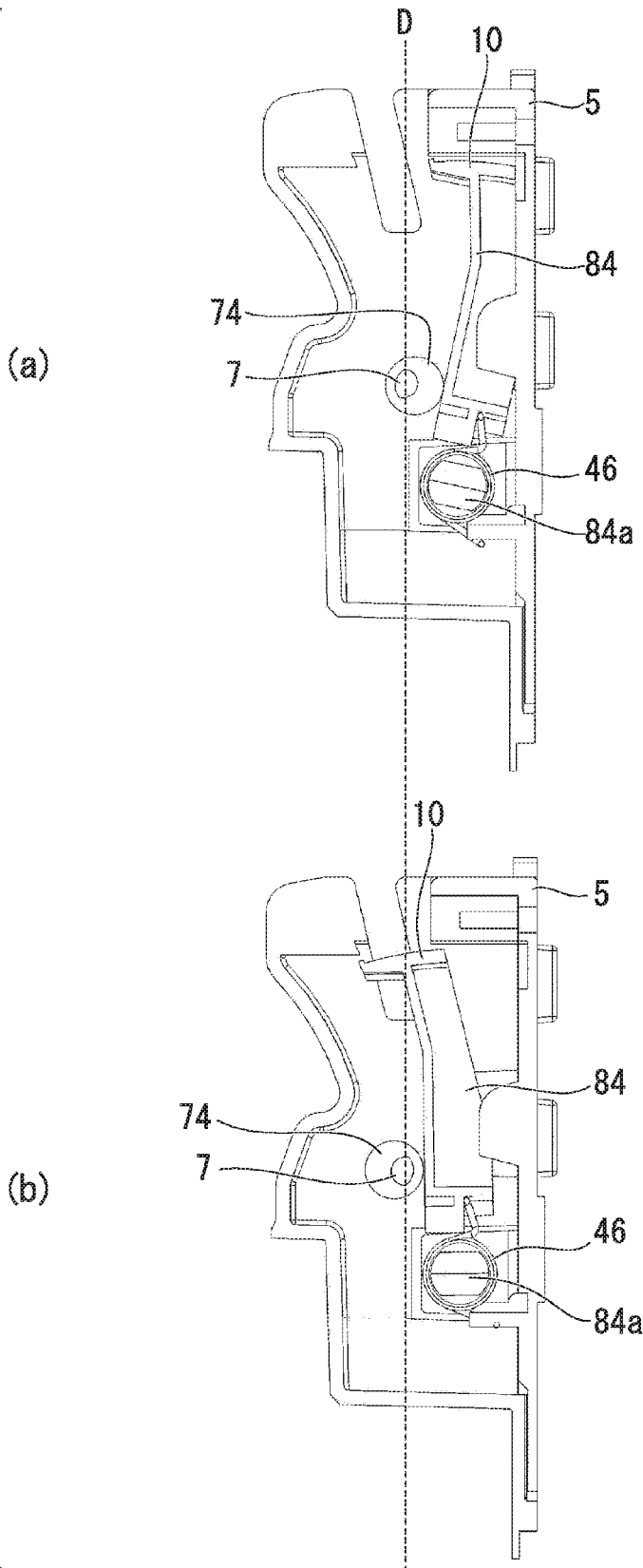
FIG. 27 is a schematic view showing an example of an operation of the optical-fiber-spliced portion reinforcing heating device according to the embodiment of the invention and is a cross-sectional view taken along the cross-section line D-D shown in FIG. 23.

Since one clamp 2A is configured to be able to slide in the longitudinal direction of the optical fiber 11, the position of the rotation support 81a is at a high level in the example shown in FIG. 25 views (a) and (b).
(3) C-C (FIG. 26 views (a) and (b)): operation of opening and closing the other clamp 2B by use of the first cam mechanism 71.
(4) D-D (FIG. 27 views (a) and (b)): operation of opening and closing the lid 10 by use of the fourth cam mechanism 74.
(5) E-E (FIG. 28 views (a) and (b)): operation of opening and closing one heater 3A by use of the third cam mechanism 73.

In FIG. 28 views (a) and (b), a semidisc 91A and a photo sensor 91B that are used to detect a rotational position of the camshaft 7 is provided in front of the third cam mechanism 73.

As shown in FIG. 24 views (a) and (b) to FIG. 28 views (a) and (b), it is understood that since each operation member is driven by each cam mechanism that is provided on the camshaft 7, each of the openable-and-closable side of the paired right and left clamps 2A and 2B, one heater 3A, the lid 10, or the like is driven at a predetermined timing.

Other Modified Example

Hereinbelow, the other modified example of the embodiment will be described.

In the embodiment, in the aforementioned configuration shown in FIG. 4 or the like, constitution may be adopted which includes a position limiting member that is used to limit the forward movable range Z of (refer to FIG. 6) or the backward movable range K (refer to FIG. 6) of at least one of the paired right and left clamps 2A and 2B and is configured by a forward movement stopper or a backward movement stopper.

This position limiting member limits, for example, the forward movable range or the backward movable range of the fixed-side clamp.

This position limiting member has a function of adjusting a tension that is applied to the optical fiber 11 to be in an adequate range.

Furthermore, a constitution may also be adopted which includes: the fifth cam mechanism (not shown in the figure) that is disposed on the camshaft 7 on the same axis as those of the first to third cam mechanisms 71 to 73 or is disposed on the other camshaft (not shown in the figure) parallel to the camshaft 7 and is rotationally driven by control of the motor 6; and a mechanism that controls the displacement of the fifth cam mechanism so as to cause the position limiting member configured by the above-described forward movement stopper or the backward movement stopper to move, wherein the same motor 6 drives the clamps 2A and 2B (including a mechanism operates to pull them), the heater 3, and the aforementioned position limiting member by use of the first to third cam mechanisms 71 to 73 and the fifth cam mechanism (not shown in the figure).

In the embodiment, a constitution may also be adopted which includes: a second cam mechanism that is disposed on the camshaft 7 on the same axis as those of the first and third cam mechanisms 71 and 73 or is disposed on the other camshaft parallel to the camshaft 7; and a mechanism that controls the displacement of the second cam mechanism so as to cause the position limiting member configured by the above-described forward movement stopper or the backward movement stopper to move.

The second cam mechanism is rotationally driven by, for example, control of the motor 6.

In the embodiment, a constitution may also be adopted in which the same motor 6 controls movement of the clamps 2A and 2B and the heater 3 by use of the first cam mechanism 71, the third cam mechanism 73, and the second cam mechanism and by the fifth and second force-applying member, and furthermore, the same motor controls movement of a tension mechanism (a mechanism applies a tension to an optical fiber) by use of the second cam mechanism and by the above-mentioned position limiting member.

Additionally, in the aforementioned configuration, a constitution may also be adopted which further includes: the first force-applying member 41 that is used to limit the forward movable range Z or the backward movable range K of at least one of the paired right and left clamps 2A and 2B or a third force-applying member (not shown in the figure) that applies a tension in an opposite direction relative to the first force-applying member; the sixth cam mechanism (not shown in the figure) that is disposed on the camshaft 7 on the same axis as those of the first to third cam mechanisms 71 to 73 or is disposed on the other camshaft (not shown in the figure) parallel to the camshaft 7 and is rotationally driven by control of the motor 6; and a mechanism (applied force controller) in which the displacement of the sixth cam mechanism controls the applied force of the first force-applying member 41 or the third force-applying member to be stronger or to be weaker, wherein the same motor 6 controls a mechanism (applied force controller) that controls the clamps 2A and 2B (including a mechanism pulls them), the heater 3, and the first or third force-applying member 41 or 43 by use of the first to third cam mechanisms 71 to 73 and the sixth cam mechanism (not shown in the figure).

Moreover, in the aforementioned configuration, a constitution may also be adopted which includes: the first force-applying member 41 or the third force-applying member (not shown in the figure) which applies a tension to the optical fiber 11; the above-mentioned second cam mechanism (not shown in the figure); the above-described sixth cam mechanism (not shown in the figure); a mechanism in which the displacement of the second cam mechanism controls a tensile of the optical fiber 11 which is due to a pulling force of the first force-applying member 41; and an applied force controller that controls the displacement of the sixth cam mechanism to make the applied force of the first force-applying member or the third force-applying member stronger or an applied force controller that controls them to make it weaker.

In this case, it is preferable that the same motor 6 control the clamps, the tension mechanism, the heaters, and the applied force controller by use of the first to third cam mechanisms and the sixth cam mechanism.

Figure 45:
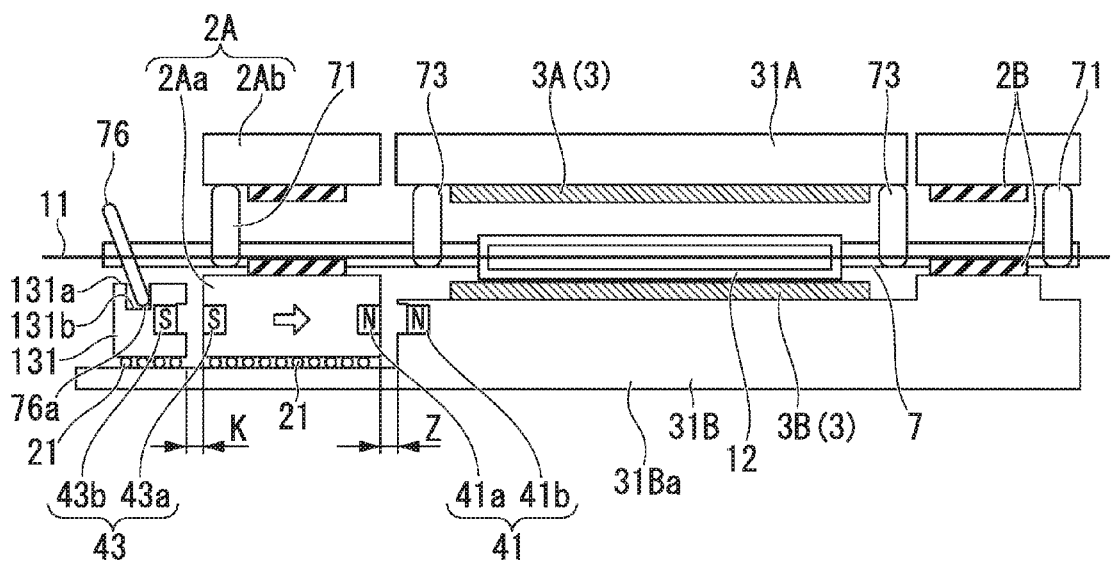
FIG. 45 is a schematic view illustrating the other example of the optical-fiber-spliced portion reinforcing heating device according to the embodiment of the invention.

The reinforcing heating device shown in FIG. 45 is different from the reinforcing heating device shown in FIGS. 6 to 11 in that the sixth cam mechanism 76 is provided, the force-applying mechanism 41 (first force-applying member) and force-applying mechanism 43 (third force-applying member) are provided, and a movable rear wall 131 is provided.

The sixth cam mechanism 76 is formed in a disk-shape so as to be inclined with respect to the surface perpendicular to the camshaft 7.

The sixth cam mechanism 76 is inclined with respect to the surface perpendicular to the camshaft 7, for example, at an angle greater than 0° and less than 90°.

The movable rear wall 131 is provided at the position opposed to the rear surface of the clamp 2A (fixed-side) and is movable in the front-back direction (horizontal direction in the drawing).

The movable rear wall 131 may be configured to be movable by the slide mechanism 21 or the like.

A recess 131b into which a bottom 76a of the sixth cam mechanism 76 is inserted is formed on the upper face 131a of the movable rear wall 131.

For this reason, the movable rear wall 131 is located at the position depending on the position in the front-back direction (horizontal direction in the drawing) of the bottom 76a of the sixth cam mechanism 76.

For example, in the case where the bottom 76a of the sixth cam mechanism 76 is close to the clamp 2A, the movable rear wall 131 also comes close to the clamp 2A (refer to FIG. 45). In the case where the bottom 76a of the sixth cam mechanism 76 is far from the clamp 2A, the movable rear wall 131 is also located far from the clamp 2A at a large distance (refer to FIG. 46).

The force-applying mechanism 43 (third force-applying member) includes force-applying members 43a and 43b which are provided at the rear-edge face of the fixed-side 2Aa of the clamp 2A and the front surface of the movable rear wall 131, respectively.

The force-applying members 43a and 43b are magnetic members such as a permanent magnet or an electromagnet and have the same magnetic pole as each other.

In the drawing shown as an example, both the force-applying members 43a and 43b have a south polarity.

The force-applying mechanism 43 presses the clamp 2A by a repulsive force between the force-applying members 43a and 43b and adjusts a tension to be applied to the optical fiber 11.

The force-applying mechanism 41 (first force-applying member) includes force-applying members 41a and 41b which are provided at a front-edge face of a fixed-side 2Aa of the clamp 2A and the heater attachment base 31B, respectively.

The force-applying members 41a and 41b have the same magnetic pole as each other.

Both the force-applying members 41a and 41b shown in the drawing as an example have a north polarity.

In the state shown in FIG. 45, the clamps 2A and 2B and the heaters 3A and 3B are opened by pressure of the first cam mechanism 71 and the third cam mechanism 73, respectively.

Since the sixth cam mechanism 76 is inclined so as to have an orientation such that, as it approaches the movable rear wall 131, it approaches the clamp 2A, the bottom 76a is located near the clamp 2A.

Accordingly, the movable rear wall 131 is located adjacent to the clamp 2A.

Since the movable rear wall 131 is close to the clamp 2A, a force in a direction of approaching the heater attachment base 31B (the right direction in the drawing) is applied to the clamp 2A due to a repulsive force between the force-applying members 43a and 43b.

Also, a force in a direction away from the heater attachment base 31B (the left direction in the drawing) is applied to the clamp 2A due to a repulsive force between the force-applying members 41a and 41b.

Figure 46:
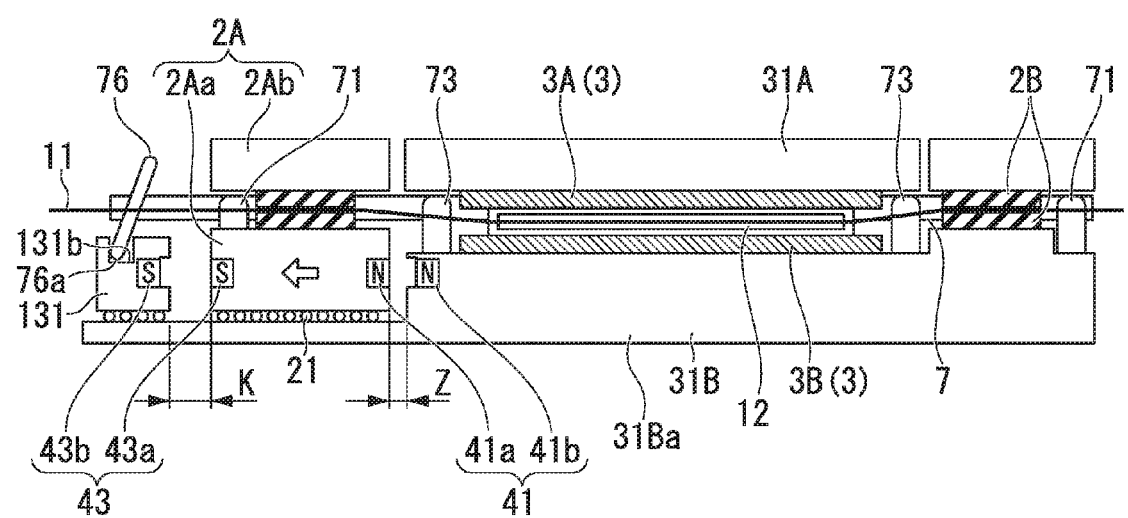
FIG. 46 is a schematic view illustrating an operation of the optical-fiber-spliced portion reinforcing heating device shown in the previous figure.

As shown in FIG. 46, the first cam mechanism 71 is displaced in accordance with the rotation of the camshaft 7, the openable-and-closable side 2Ab of the clamp 2A moves in a direction of approaching the fixed-side 2Aa, and the openable-and-closable side 2Ab and the fixed-side 2Aa thereby grasps the optical fiber 11.

Furthermore, the heater attachment base 31A comes close to the heater attachment base 31B in accordance with the displacement of the third cam mechanism 73, the sleeve 12 is sandwiched between the heaters 3A and 3B, and the sleeve 12 is heat-shrunk.

At this time, since the sixth cam mechanism 76 is inclined so as to have an orientation such that, as it approaches the movable rear wall 131, it is farther from the clamp 2A, the movable rear wall 131 moves to the position far from the clamp 2A at a large distance.

Consequently, the repulsive force between the force-applying members 43a and 43b becomes weaker; however, the repulsive force between the force-applying members 41a and 41b does not significantly change, and therefore, a tension that is applied to the optical fiber 11 increases by the clamp 2A.

As shown in FIG. 45, when the camshaft 7 further rotates, the heater attachment base 31A moves in a direction away from the heater attachment base 31B by the third cam mechanism 73, the sleeve 12 is released, the openable-and-closable side 2Ab of the clamp 2A moves in a direction away from the fixed-side 2Aa by the first cam mechanism 71, and the grasping of the optical fiber 11 is released.

The first force-applying member 41 may have a function of limiting, for example, the forward movable range Z or the backward movable range K the clamp of the fixed-side (or openable-and-closable side) of at least one of the paired right and left clamps 2A and 2B.

The second cam mechanism may be disposed on, for example, the camshaft 7 on the same axis as those of the first and third cam mechanisms 71 and 73 or is disposed on the other camshaft (not shown in the figure) parallel to the camshaft 7.

The second cam mechanism may have a structure that is rotationally driven by control of the motor 6.

In the embodiment, a constitution may also be adopted in which the same motor 6 controls movement of the clamps 2A and 2B and the heater 3 by use of the first and third cam mechanisms 71 and 73, and the second cam mechanism and by the fifth and second force-applying member, and furthermore, the same motor controls movement of a tension mechanism (a mechanism applies a tension to an optical fiber) by use of the second cam mechanism and by the first force-applying member or the third force-applying member.

As described above, as a result of adopting the configuration that can move each force-applying member for adjusting a tension to be applied to the optical fiber 11, it is possible to properly adjust the tension with a downsized configuration.

Moreover, in the aforementioned configuration, a constitution may also be adopted which further limits a forward movable range or a backward movable range of at least one of the paired right and left clamps.

Even in the case of adopting the above-described any configurations, an effect that it is possible to reduce the entire reinforcing heating device in size is conspicuously obtained.

(Action and Effect)

According to the optical-fiber-spliced portion reinforcing heating device of the second embodiment according to the invention in the above description, since a constitution is provided which utilizes the motor 6 that is the same drive source and drives the paired right and left clamps 2A and 2B, one heater 3A, the lid 10, or the like by each cam mechanism that is provided on the same axis, it is possible to reduce the entire reinforcing heating device in size.

Moreover, similar to the aforementioned first embodiment, when the sleeve 12 is sandwiched between two heaters 3A and 3B and is heat shrunk, breaking of the optical fiber 11 or degradation in long-term reliability thereof is prevented by releasing an excessive tension that is to be applied to the optical fiber 11, and a device is prevented from being larger in size.

Consequently, it is possible to heat-shrink the sleeve 12 in a shorter amount of time with a high level of reliability, and an optical-fiber-spliced portion reinforcing heating device 1 having a high level of handleability can be realized.

In addition, the technical scope of the invention is not limited to the above embodiments, and various modifications may be made without departing from the scope of the invention.

For example, in the aforementioned embodiments, the fifth force-applying member 45 is used in both the paired clamps 2A and 2B; however, the fifth force-applying member 45 may be used in only one of the clamps 2A and 2B (that is, one side).

Additionally, in the above-mentioned embodiments, two heaters 3 (3A, 3B) are used; however, the number of heaters may be three or more.

What is claimed is:

1. An optical-fiber-spliced portion reinforcing heating device comprising:
   paired clamps that respectively grasp one portion and the other portion of a coated portion of an optical fiber, the optical fiber including a fusion-spliced portion, the fusion-spliced portion being coated with a sleeve, the coated portion being exposed from the sleeve;
   at least two or more heaters that are arranged to face each other so as to sandwich the sleeve;
   a first force-applying member that presses at least one of the paired clamps so as to apply a tension to the optical fiber; and
   a second force-applying member that applies a pressing force to at least one or more of the heaters via the sleeve by use of one of an elastic member and a magnetic member in accordance with control of a drive source, the heaters being arranged to face each other with the sleeve interposed therebetween, wherein
   a pressing force that is to be applied to the sleeve by the second force-applying member is set to be greater than a tension that is to be applied to the optical fiber by the first force-applying member,
   before the optical fiber is grasped, in a state in which one of the paired clamps is separated from heaters by the first force-applying member and in a state in which the paired clamps grasp the optical fiber and a tension is not applied to the optical fiber,
   the heaters press the sleeve by a pressing force by the second force-applying member, as a result of moving the optical fiber in a pressing direction which is due to movement of the sleeve or deformation of the sleeve after starting of the press, one of the paired clamps is drawn to a forward movement direction by a tension due to movement of the optical fiber, one of the paired clamps is configured so as to be stopped at a position away from an end of a movable range,
   therefore, in a state in which a tension is applied to the optical fiber, in one of the paired clamps, a backward movable range in a direction away from the heaters in the longitudinal direction of the optical fiber is ensured and a forward movable range that allows movement to the heater side is ensured, and one of the paired clamps is thereby configured to move in a direction in which a tension that is applied to the optical fiber as a result of pressing the sleeve by the heaters and by the second force-applying member is diminished.

2. The optical-fiber-spliced portion reinforcing heating device according to claim 1, wherein
   both the paired clamps are movable back and forth in the longitudinal direction of the optical fiber.

3. The optical-fiber-spliced portion reinforcing heating device according to claim 1, wherein
   one of the heaters that are arranged so as to face each other with the sleeve interposed therebetween is movable and the other of the heaters is fixed.

4. The optical-fiber-spliced portion reinforcing heating device according to claim 1, wherein
   a pressing force that is to be applied to the sleeve by the heaters exceeds the tension of the fusion-spliced portion of the optical fiber under a rupture evaluation test.

5. The optical-fiber-spliced portion reinforcing heating device according to claim 1, wherein
   pressing faces of the heaters which face each other with the sleeve interposed therebetween are arranged in a substantially vertical direction, a tensile strength member is consistently arranged in a substantially downward direction by utilizing a weight of the tensile strength member that is inserted into the inside of the sleeve, and the direction of the sleeve is thereby constant.

6. The optical-fiber-spliced portion reinforcing heating device according to claim 1, wherein
   after heating of the sleeve is completed, the heaters are immediately separated from the sleeve, heat-transfer to the sleeve is interrupted, and the sleeve is thereby rapidly cooled by introduction of external air into the periphery of the sleeve.

* * * * *